United States Patent
Zhou et al.

(10) Patent No.: US 6,278,724 B1
(45) Date of Patent: Aug. 21, 2001

(54) RECEIVER IN A SPREAD SPECTRUM COMMUNICATION SYSTEM HAVING LOW POWER ANALOG MULTIPLIERS AND ADDERS

(75) Inventors: Changming Zhou; Guoliang Shou; Kunihiko Suzuki; Xuping Zhou, all of Tokyo (JP); Xiaoling Qin, San Jose, CA (US); Jie Chen, Tokyo (JP); Mamoru Sawahashi; Fumiyuki Adachi, both of Yokohama (JP)

(73) Assignees: Yozan, Inc.; NTT Mobile Communications Network, Inc., both of Tokyo (JP)

( * ) Notice: Subject to any disclaimer, the term of this patent is extended or adjusted under 35 U.S.C. 154(b) by 0 days.

(21) Appl. No.: 09/032,776

(22) Filed: Mar. 6, 1998

(30) Foreign Application Priority Data

May 30, 1997 (JP) .................................................. 9-156073

(51) Int. Cl.[7] .............................. H04L 27/32; H04L 27/30
(52) U.S. Cl. .......................... 375/147; 375/148; 375/150; 375/152; 327/361; 327/75; 708/7; 708/320; 370/335; 370/342
(58) Field of Search .................................... 375/147, 148, 375/150, 152

(56) References Cited

U.S. PATENT DOCUMENTS

| | | | |
|---|---|---|---|
| 5,381,352 | * 1/1995 | Shou et al. ................................ | 708/7 |
| 5,388,063 | * 2/1995 | Takatori et al. ......................... | 708/320 |
| 5,396,442 | * 3/1995 | Shou et al. ................................ | 708/7 |
| 5,416,370 | * 5/1995 | Takatori et al. ......................... | 327/356 |
| 5,420,807 | * 5/1995 | Shou et al. ................................ | 708/7 |
| 5,424,973 | * 6/1995 | Shou et al. ............................ | 708/801 |
| 5,465,064 | * 11/1995 | Shou et al. ............................ | 327/361 |
| 5,469,102 | * 11/1995 | Shou et al. ............................ | 327/361 |
| 5,490,099 | * 2/1996 | Shou et al. ................................ | 708/7 |
| 5,600,270 | * 2/1997 | Shou et al. ............................... | 327/75 |
| 5,737,368 | * 4/1998 | Shou et al. ............................ | 375/343 |
| 5,748,510 | * 5/1998 | Shou et al. ................................ | 708/7 |
| 5,751,624 | * 5/1998 | Zhou et al. ............................ | 708/835 |
| 5,811,859 | * 9/1998 | Shou et al. ............................ | 257/369 |
| 5,812,546 | * 9/1998 | Zhou et al. ............................ | 370/342 |
| 5,835,387 | * 11/1998 | Shou et al. ................................ | 708/7 |
| 5,910,948 | * 6/1999 | Shou et al. ............................ | 370/335 |
| 5,930,157 | * 7/1999 | Matsumoto et al. .................... | 708/5 |
| 5,930,290 | * 7/1999 | Zhou et al. ............................ | 375/143 |
| 5,936,463 | * 8/1999 | Shou et al. ................................ | 330/9 |
| 5,974,038 | * 10/1999 | Shou et al. ............................ | 370/335 |
| 6,025,752 | * 2/2000 | Zhou et al. ............................. | 330/51 |

* cited by examiner

Primary Examiner—Stephen Chin
Assistant Examiner—Paul N Rupert
(74) Attorney, Agent, or Firm—Pillsbury Winthrop LLP

(57) ABSTRACT

A signal reception apparatus in the spread spectrum communication system requires only a small amount of circuitry and consumes a small amount of electric power. A quadrature detector decomposes received signals into in-phase components and quadrature components, and supplies them to a complex-type matched filter. The complex-type matched filter de-spreads the in-phase components and the quadrature components and sends them to a multi-path selector. The multi-path selector selects, from among the received de-spread signals, multiple paths having high levels of signal electric powers and sends the received signals of the selected paths to multiple phase correction blocks. Analog operation circuits calculate phase errors of the received signals of two successive pilot symbol blocks for each path. An analog operation circuit corrects the phases of the received signals of the information symbol block that has been received between the two successive pilot symbol blocks. A rake combiner synchronously combines the phase-corrected de-spread received signals of each path.

27 Claims, 24 Drawing Sheets

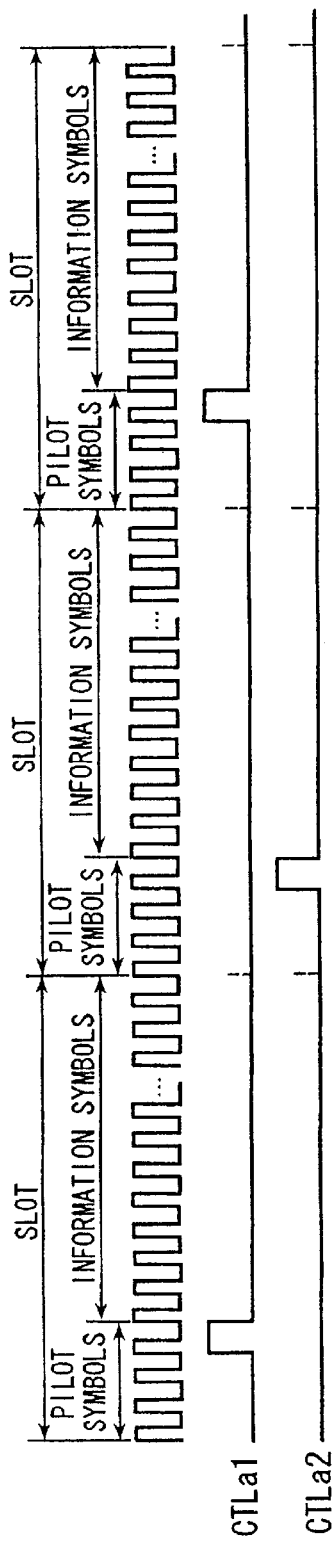
FIG. 10a
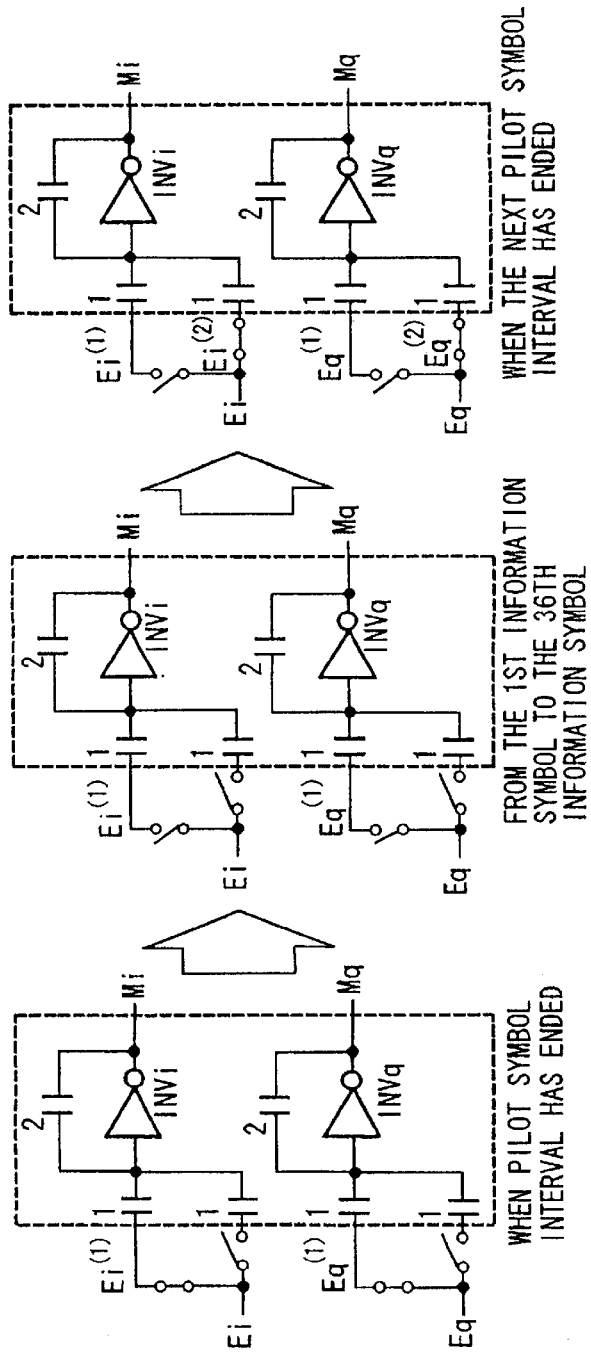
FIG. 10b
FIG. 10c
FIG. 10d

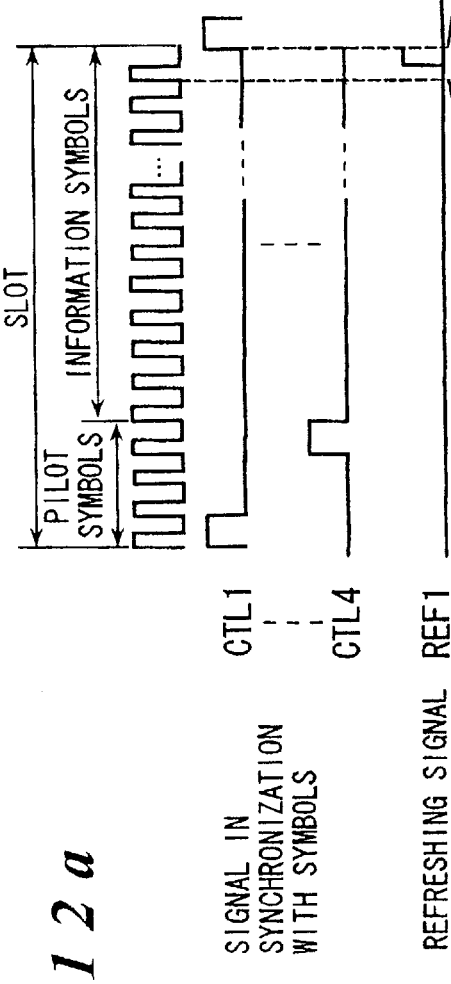
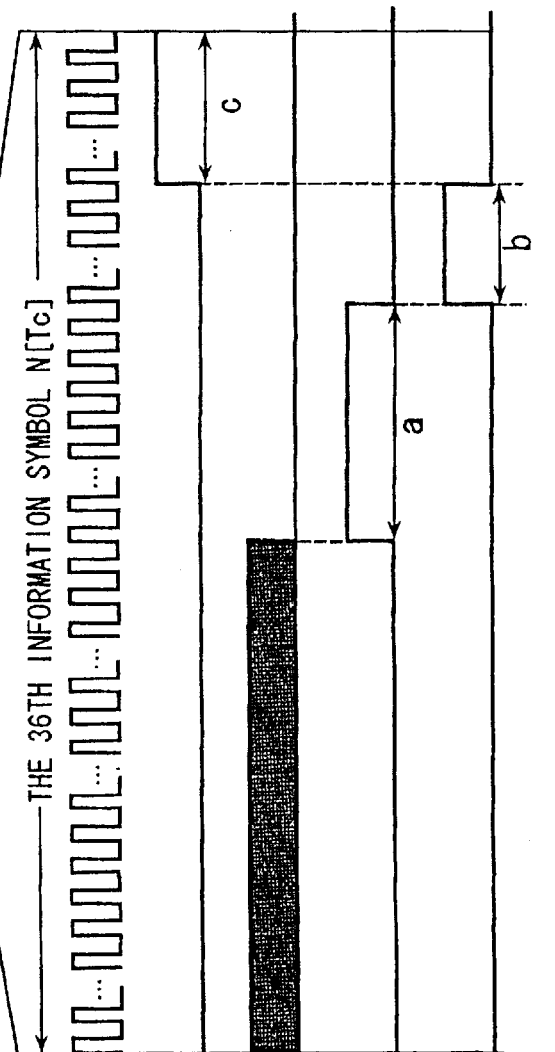
FIG. 12a
FIG. 12b

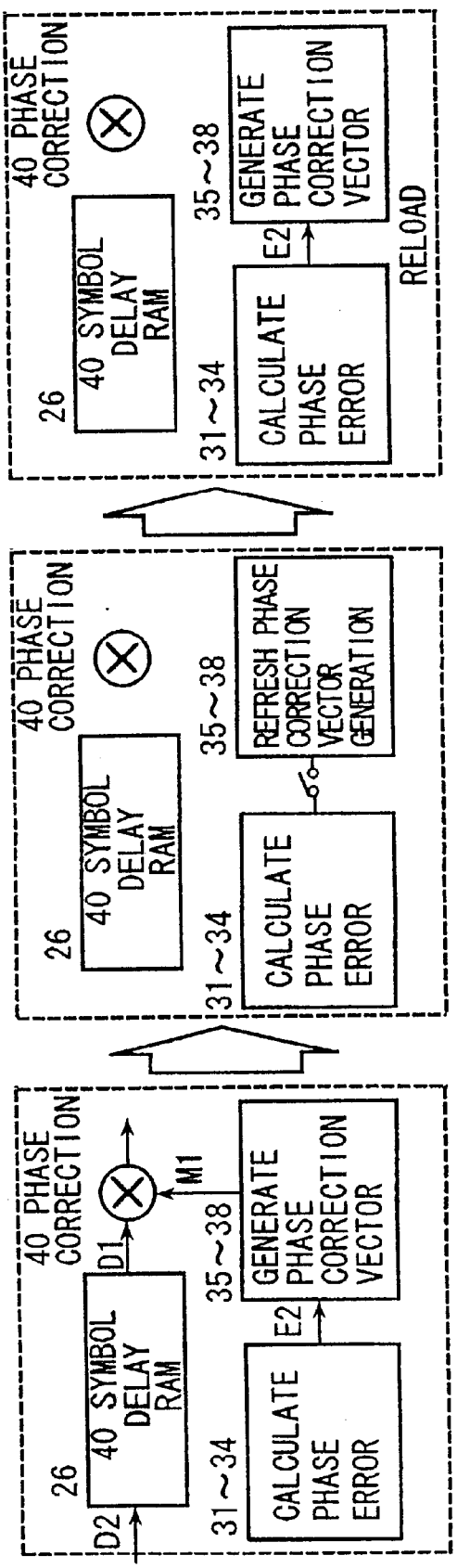

| VOLTAGE | DIGITAL VALUE | A/D CONVERSION OUTPUT | VALUES USABLE IN MULTIPLIER |
|---|---|---|---|
| Vdd | 3 | 111 | 011 |
|  | 2 | 110 | 010 |
|  | 1 | 101 | 001 |
| Vdd/2 | 0 | 100 | 000 |
| Vdd/2 | 0 | — | 100 |
|  | −1 | 011 | 101 |
|  | −2 | 010 | 110 |
|  | −3 | 001 | 111 |
| GND | −4 | 000 | — |

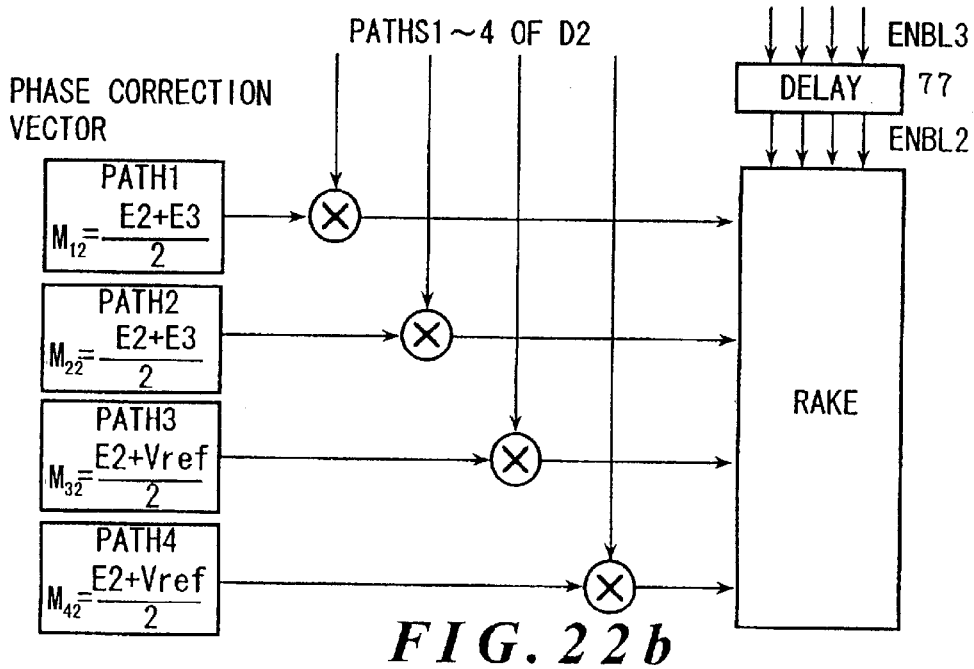
*FIG. 22a*
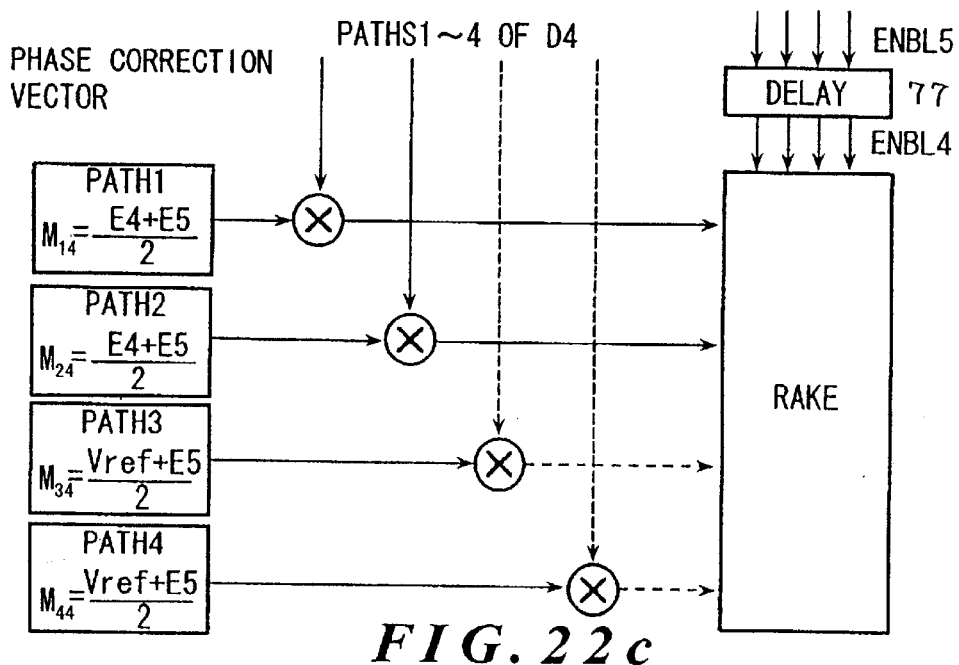
*FIG. 22b*
*FIG. 22c*

RECEIVER IN A SPREAD SPECTRUM COMMUNICATION SYSTEM HAVING LOW POWER ANALOG MULTIPLIERS AND ADDERS

The present invention claims priority based on a Japanese patent application, H9-156073, the contents of which are incorporated herein by reference.

FIELD OF THE INVENTION

The present invention relates to a signal reception apparatus suitable for use in the DS-CDMA communication system, in particular, to a signal reception apparatus for correcting the phase error of a signal received through each path in the multi-paths environment and performing a RAKE synthesis.

DESCRIPTION OF RELATED ART

In recent years, in the field of wireless communication systems such as mobile wireless communication systems and wireless local area network (LAN), the spread spectrum communication system, in particular, the the Direct Sequence-Code Division Multiple Access (DS-CDMA) communication system has been receiving attention. Generally in a mobile wireless communication system, multiple signals that have been transmitted from the transmitter pass through multiple transmission paths (multi-paths) having different path lengths and reach the receiver. Since these signals are not coherently added at the receiver, so-called multi-fading is generated. However, by employing the rake reception system in the spread spectrum communication system, these multi-paths can be effectively utilized for receiving the multiple signals. The rake reception system in the spread spectrum communication system is referred to as a Radio Activated Keyed Entry (RAKE) reception system throughout the specification.

FIG. 26a shows an example of the frame structure of transmission data according to the DS-CDMA communication system. In the example shown in this drawing, each frame has multiple (for example, six) slots. Each of the slots is comprised of a pilot symbol block and an information symbol block. As shown in the drawing, each frame is comprised of pilot symbol blocks P1, P2, . . . , Pn, and information symbol blocks D1 D2 . . . , Dn so that a pilot symbol block and an information symbol block appear alternately. A prescribed number (for example, four symbols) of pilot symbols are arranged in each of the pilot symbol blocks P1, P2, . . . , Pn. A prescribed symbol sequence is transmitted as the transmission data. Similarly, a prescribed number (for example, 36) of information symbols are arranged in each of the information symbol blocks D1, D2, . . . , Dn. Before this transmission data is transmitted, the information contained in this transmission data is modulated by, for example, the Quadrature Phase Shift Keying (QPSK) system, and the spread of this transmission data is modulated by the Biphase Shift Keying (BPSK) or QPSK system using prescribed spread codes.

FIG. 26b is a block diagram showing the key components of a RAKE receiver for receiving the above-mentioned signals. In this diagram, the high frequency wave receiver 102 converts each of the spread spectrum signals that have been received by the reception antenna 101 into a signal lying in an intermediate frequency band. The distributor 103 divides the converted signal into two signals. The two divided signals are supplied to the multipliers 106 and 107. The oscillator 104 generates local frequencies. The output of the oscillator 104 is supplied directly to the multiplier 106 and to the multiplier 107 via the phase shift circuit 105, which shifts the phase of the output by $\pi/2$. The multiplier 106 multiplies the intermediate frequency signal that has been received from the distributor 103 by the output signal of the oscillator 104. The multiplier 106 then sends the result of the multiplication to the low-pass filter 108. The low-pass filter 108 outputs an in-phase (I-component) component base band signal Ri. In addition, the multiplier 107 multiplies the intermediate frequency signal that has been received from the distributor 103 by the output signal of the phase shift circuit 105. The multiplier 107 then sends the result of the multiplication to the low-pass filter 109. The low-pass filter 109 outputs a quadrature-phase (Q-component) component base band signal Rq. In this way, the quadrature component of the spread spectrum signal that has been received by the reception antenna 101 is detected.

The base band signals Ri and Rq, which have been obtained in this way, are supplied to the complex-type matched filter 110. The Pseudo Noise (PN) code generation circuit 111 generates a sequence of reference PN codes, and supplies the sequence of reference PN codes to the complex-type matched filter 110. The complex-type matched filter 110 multiplies the base band signal Ri by a sequence of the I-components of the reference PN codes, and de-spreads the product of the multiplication. Then, the complex-type matched filter 110 outputs the in-phase component Di of the de-spread product of the multiplication to the signal level detector 112, the frame synchronization circuit 114, and the phase correction block 115. Similarly, the complex-type matched filter 110 multiplies the base band signal Rq by a sequence of the Q-components of the reference PN codes, and de-spreads the product of the multiplication. Then, the complex-type matched filter 110 outputs the quadrature-phase component Dq of the de-spread product of the multiplication to the signal level detector 112, the frame synchronization circuit 114, and the phase correction block 115.

The signal level detector 112 calculates the electric (power level of each of the received spread spectrum signals based on the I-component de-spread output Di and the Q-component de-spread output Dq, and sends the result of the calculation for each of the received spread spectrum signals to the multi-paths selector 113. The multi-paths selector 113 selects multiple (for example, up to four) peaks as the multiple paths in the order of decreasing electric power levels of the received spread spectrum signals from the highest electric power level. The frame synchronization circuit 114 receives from the multi-paths selector 113 information indicating the path that corresponds to the received spread spectrum signal having the maximum electric power level. Then the frame synchronization circuit 114 detects the symbol pattern of the pilot symbol block of the received spread spectrum signal having the maximum electric power level. In this way, the frame synchronization circuit 114 detects the frame timing.

The outputs of the multi-paths selector 113 are supplied to the phase correction block 115. As will be explained later, the phase correction block 115 corrects the phases of those received spread spectrum signals that correspond to the multiple (for example, up to four) selected paths, and outputs the phase-corrected received spread spectrum signals to the RAKE combiner 116. The RAKE combiner 116 combines the phase-corrected received spread spectrum signals at a synchronized timing, and the resultant combined signal is supplied to the data decision circuit 117. The decision circuit 117 judges the data of the combined signal, and demodulates the information contained in the combined signal. In order to detect a synchronized signal, the absolute phase of the received signal needs to be known. The phase correction block 115 detects the amount of phase rotation (error vector) of the received signal of the afore-mentioned pilot symbol (the transmission signal vector of the pilot symbol is known), calculates the correction signal (correction vector) from the error vector, and corrects the phase of the received signal vector.

FIG. 27a shows the schematic configuration of the phase correction block 115. In this diagram, the delay means 120 holds the de-spread signals Di and Dq of the base band signals Ri and Rq that correspond to the information symbol blocks that are supplied from the complex-type matched filter 110 until the calculation of the correction vector is completed, and then outputs the de-spread signals Di and Dq to the RAKE combiner 116. The pilot symbol phase error extracting-averaging means 130 extracts the phase error of each of the received spread spectrum signals from the de-spread signals Di and Dq of the base band signals Ri and Rq that correspond to the pilot symbols that are supplied from the complex-type matched filter 110. In addition, the pilot symbol phase error extracting-averaging means 130 calculates the average phase error, that is, the average of the phase errors of the received spread spectrum signals, and supplies an error signal of the average phase error to the information symbol phase corrector 140. The information symbol phase corrector 140 corrects the phases of the information symbol block by multiplying the received signal of the information symbol block, supplied from the delay means 120, by the error signal (error vector) which consists of the average phase error supplied from the pilot symbol phase error extracting-averaging means 130. Although the Radio Activated Keyed Entry (RAKE) combiner is referred to as a RAKE combiner throughout the specification, it may also be referred to as a rake combiner.

In this DS-CDMA communication system, pilot symbol blocks are inserted before and after each information symbol block. There are two methods for extracting the above-mentioned error vector. FIG. 27b shows the first method. In this method, the correction vector for a given information symbol block is calculated from the received signals of the pilot symbol blocks that are positioned before and after the information symbol block, as shown. The phase errors of the received signals of the information symbols contained in the information symbol block are corrected using this correction vector. As shown in FIG. 27b, the phase errors of the eight symbols, that is, the four phase errors of the four pilot block symbols contained in the pilot symbol block that is positioned to the left of the information symbol block containing 36 information symbols and the four phase errors of the four pilot block symbols contained in the pilot symbol block that is positioned to the right of the information symbol block, are averaged to obtain the correction vector. Then, the correction vector is used to correct the phases of the 36 information symbols contained in the information symbol block that is positioned between the two pilot symbol blocks.

In the second method for extracting the correction vector, the phases of the received signals of the information symbols contained in a given information symbol block are corrected using the correction vector obtained from the four pilot symbols contained in the pilot symbol block that is positioned to the left of the information symbol block. In this method, as compared with the first method, the pilot symbol phase error extracting averaging means 130 outputs the correction vector (error signal) faster. Therefore, the length of the delay in the delay means 120 can be shortened.

However, in this second method, the accuracy of the correction vector is reduced when compared with the first method since the average taken over four phase errors is less accurate than that taken over eight phase errors. Hence, in what follows, the phase correction process will be explained assuming that the correction vector (the average phase error) is extracted using the first method.

A pilot symbol that has been transmitted from a transmitter, not shown in the drawing, is denoted by a complex number I ([=]Ii+j·Iq) Here, the real-valued quantities Ii and Iq represent the real and imaginary parts of the complex number I, and j denotes the complex unit satisfying j2=−1. After the pilot symbol has been received and de-spread, the received pilot symbol is denoted by a complex number P (Pi+j·Pq). Here, the real-valued quantities Pi and Pq represent the real and imaginary parts of the complex number P. The complex number P differs from the complex number I only in its phase since the transmitted signal I becomes the signal P when the transmitted signal I is received. Therefore, as will be shown in the following equation (1), the phase error vector e contained in the received pilot symbol P can be extracted by multiplying the received signal P by the complex conjugate of the transmitted signal I.

$$e=(Pi+j\cdot Pq)(Ii-j\cdot Iq)$$

$$=(Pi\cdot Ii+Pq\cdot I_q)+j\cdot(Pq\cdot Ii-Pi\cdot Iq) \quad (1)$$

Therefore, the average E of the phase errors of all the pilot symbols contained in the pilot symbol block can be expressed by the following equation (2).

$$E = \frac{1}{L}\sum_{k=1}^{L}(P_i^k + j\cdot P_q^k)\cdot(I_i^k - j\cdot I_q^k) \quad (2)$$

Here, L indicates the number of symbols in the pilot symbol block (in this case, L=4), and the superscript k indicates the position number of the respective pilot symbol in the pilot symbol block.

The pilot symbol phase error extracting-averaging means 130 outputs the error vector indicating the average of the four phase errors of the four pilot symbols contained in each of the pilot symbol blocks (slots) positioned before and after the information symbol block as shown in equations (3) and (4). Here, $E^{(t)}$ denotes the average error vector corresponding to the average of the four phase errors of the four pilot symbols contained in the pilot symbol block positioned before the given information symbol block. $E^{(t+1)}$ denotes the average complex-valued error vector corresponding to the average of the four phase errors of the four pilot symbols contained in the pilot symbol block positioned after the given information symbol block. The real valued quantities $E_I^{(t)}$ and $E_q^{(t)}$ represent the real and imaginary part of the complex number $E^{(t)}$, respectively, and the real valued quantities $E_I^{(t+1)}$ and $E_q^{(t+1)}$ represent the real and imaginary parts of the complex number $E_I^{(t+1)}$, respectively.

$$E^{(t)}=E_i^{(t)}+j\cdot E_q^{(t)} \quad (3)$$

$$E^{(t+1)}=E_I^{(t+1)}+j\cdot E_q^{(t+1)}) \quad (4)$$

Next, the complex-valued correction vector for correcting the phase error of each information symbol will be defined by the following equations (5) through (7).

$$M=M_i+j\cdot M_q \quad (5)$$

$$M_i = (E_i^{(l)} + E_i^{(l+1)})/2 \qquad (6)$$

$$M_q = (E_q^{(l)} + E_q^{(l+1)})/2 \qquad (7)$$

The average of the two complex-valued average error vectors $E^{(l)}$ and $E^{(l+1)}$ is used as the complex-valued correction vector M. The complex conjugate of the correction vector M is multiplied by the received vector D (Di+j·Dq) of the information symbol block. Then, the phase errors of the received signals of the information symbols contained in the information symbol block that is held between the two pilot symbol blocks are corrected. In this way, the corrected received signal vector D-hat (the symbol shown below obtained by placing a mountain-shaped symbol over the letter D is called D-hat) in the following equation (8) is obtained.

$$\hat{D} = (Di+j·Dq)(Mi - j·Mq) = (DiMi+DqMq) + j·(DqMi - DiMq) \qquad (8)$$

The equations (1) through (8) shown above indicate an operation for a given path. The other paths are associated with the received signals contained in the set of those received spread spectrum signals that have been de-spread in the complex-type matched filter 110 and selected by the multi-paths selector 113. The phase correction block 115 carries out the same operation for each of the received signals associated with the remaining paths, and corrects the phase errors of the received signals associated with the remaining paths.

After this, the phase correction block 115 sends the corrected received signals associated with the selected paths to the RAKE combiner 116. The RAKE combiner 116 RAKE combines the corrected received signals by summing up the corrected received signals at a synchronized timing. Thus, the complex-valued combined output D-bar whose real part and imaginary part are shown by the following equations (9) and (10), respectively, is obtained (hereafter the symbol obtained by attaching a horizontal bar on the letter D will be called D-bar).

$$\overline{D}_i = \sum_{n=1}^{N} \hat{D}_i^{(n)} \qquad (9)$$

$$\overline{D}_q = \sum_{n=1}^{N} \hat{D}_q^{(n)} \qquad (10)$$

Here, the superscript (n) denotes the path number of each path, n=1, 2, . . . , N. In the diagram shown in FIG. 27b, N is set to 4.

In this way, the phase correction block 115 corrects the phase of each of the information symbols contained in a given information symbol block with a high degree of accuracy, since the respective phase is corrected based on the average of the phase errors of the received signals of the pilot symbols contained in the two pilot symbol blocks positioned before and after the information symbol block.

In the above-explained conventional RAKE receiver, a matched filter having a digital operation circuit such as a DSP (digital signal processor), or a matched filter having a SAW (surface acoustic wave) device or the like is used as the complex-type matched filter for de-spreading the received spread spectrum signals. When such a digital operation circuit is used, the outputs of the afore-mentioned low-pass filters 108 and 109 are converted from analog signals to digital signals, and the converted outputs are supplied to the matched filter. In using any of these conventional matched filters, the following problems occur. When a digital-type matched filter is used, a large number of digital multiplication operations need to be performed. As a result, a large amount of circuitry is needed, and a large amount of electric power needs to be consumed. When a matched filter having a SAW device is used, the size of the matched filter becomes large. As a result, the matched filter cannot be installed together with the other constitutive circuit elements on the same chip.

Under these circumstances, the present applicants have proposed to use an analog-type matched filter (Japanese Patent Application Laid-Open No. HEI09-83486). An analog-type matched filter can be installed together with the other constitutive circuit elements on the same chip, and consumes only a small amount of electric power. However, the afore-mentioned phase correction block 115 and RAKE combiner 116 still contain a digital-type circuit. Of the outputs of the complex-type matched filter 110, those outputs associated with the selected paths are converted into digital signals and are supplied to the phase correction block 115.

In addition, when an analog-type delay means, such as an analog shift register or the like, is used as the delay means 120 in order to correct the phase errors of the received spectrum spread signals with a high degree of accuracy in the above-described manner, the delay time becomes long and the circuitry becomes large, which is problematic.

SUMMARY OF THE INVENTION

Given these circumstances, it is an object of the present invention to provide a low power consumption signal reception apparatus having a small amount of circuitry in the spread spectrum communication system.

In order to achieve the above-stated object, the signal reception apparatus in the spread spectrum communication system according to the present invention, which receives spread spectrum signals in each of which a pilot symbol block and an information symbol block appear alternately, has a matched filter for de-spreading the received signals after the quadrature components of the received signals are detected, a multi-path selector for selecting from the de-spread outputs of the matched filter multiple paths in a descending order of the magnitudes of the electric power of the received signals, a phase corrector for receiving from the multi-path selector the de-spread signals that correspond to the selected paths and correcting the phases of the de-spread signals, and a RAKE combiner for receiving the phase-corrected de-spread signals from the phase corrector and combining the phase-corrected de-spread signals at a synchronized timing. The phase corrector has an analog-digital converter for converting the de-spread analog signals of the selected paths that are supplied from the matched filter into digital signals, a delay means for storing the outputs of the analog-digital converter and reading out the outputs after a prescribed length of time, phase error calculators, which are installed in correspondence with the respective selected paths, each of which is comprised of an analog operation circuit for calculating the phase errors of the received signals consisting of the pilot symbols contained in the pilot symbol block of the respective path, phase correction vector generators, which are installed in correspondence with the selected paths, each of which is comprised of an analog operation circuit for calculating, based on the received signals of two successive pilot symbol blocks, the average of the phase errors, which the corresponding error calculators have calculated and phase error correctors, each of which multiplies the phase correction vectors, which are output from the corresponding phase correction vector generator, by the received signals that the delay means has read out.

The analog operation circuits of the phase error calculators and the phase correction vector generators are refreshable. During the time interval of the last information symbol of the information symbol block, the phase error calculators and the phase correction vector generators are refreshed. After the phase correction vector generators have been refreshed, the phase correction vector generators re-load the outputs of the phase error calculators. After the outputs of the phase error calculators have been re-loaded to the phase correction vector generators, the phase error calculators are refreshed. The refreshable time interval of the phase correction vector generators and the phase error calculators is variable in response to the spread factors of the transmission signals. The analog-digital converter of the phase corrector converts the de-spread signals of the selected paths into digital signals by time-sharing.

When each of the phase correction vector generators outputs phase correction vectors, and the delay-means reads out the de-spread signals of the selected paths that have been converted into digital signals, the phase error correctors of the phase corrector multiply by time-sharing, the phase correction vectors by the de-spread signals of the selected paths. In addition, the phase corrector has a conversion means. When the delay means has read out the digital data and supplies the digital data to the conversion means, the conversion means converts the digital data into new digital data so that the most significant bit of the new digital data indicates the sign (positive or negative) of the original digital data and the other bits of the new digital data represent the absolute value of the original digital data. The conversion means has an inversion means and an addition means. The addition means is attached to the multiplier of the phase error corrector, which multiplies the phase correction vectors by the digital data. If the original digital data corresponds to a positive signal, the inversion means inverts the most significant bit of the original digital data that has been read out by the delay means. If the original digital data corresponds to a negative signal, the inversion means inverts all the bits of the original digital data, and the addition means adds 1 to the inverted bits. In addition, if the number of the selected paths is smaller than the maximum number of paths, the phase correction vector generator calculates the average of the phase errors by using the reference voltage in place of the phase errors that correspond to the unselected paths.

The analog operation circuits of the phase correction vector generators calculate the phase errors contained in the received signals of the pilot symbol blocks and generate phase correction vectors. After the analog-digital converter has converted the received information symbol signals into digital signals, and the delay means has delayed the digital signals, the analog-type operation circuits of the phase corrector multiplies the received delayed digital information symbol signals by the phase correction vectors. Therefore, the conventionally required additional A/D converter for converting the received signals into digital signals in order to calculate the phase errors becomes unnecessary. As a result, the phase error correction blocks operate at a higher speed and with a higher degree of accuracy, and consume a smaller amount of electric power, in comparison with the conventional technology. In addition, according to the present invention, the refreshing operation is performed in synchronization with the frame (structure of the received signals. As a result, the lengthy substitute operation circuit conventionally required for performing the operation of the circuits being refreshed is rendered unnecessary. Hence, the operation of the signal reception apparatus, according to the present invention, can be carried out with a high degree of accuracy without increasing the circuitry. Moreover, in the present invention, the analog-digital converter and the phase error corrector operate by time-sharing. Therefore, the number of analog-digital converters and the number of phase error correctors can be less than the number of paths. Thus, the circuitry can be reduced.

BRIEF DESCRIPTION OF THE DRAWINGS

FIGS. 10a, 10b, 10c, and 10d explain the operation of the phase correction vector generation block of the embodiment of the signal reception apparatus according to the present invention.

FIGS. 12a and 12b are timing charts showing the refreshing signals for the phase error calculation block and the phase correction vector generation block of the signal reception apparatus according to the present invention.

FIGS. 13a through 13d explain the refreshing operation of the phase correction vector generation block of the signal reception apparatus according to the present invention.

FIGS. 22a through 22c explain the operation of the signal reception apparatus according to the present invention when the number of selected paths change.

PREFERRED EMBODIMENT OF THE PRESENT INVENTION

[1. The Overall structure of the Signal Reception Apparatus According to the Present Invention]

Figure 1:
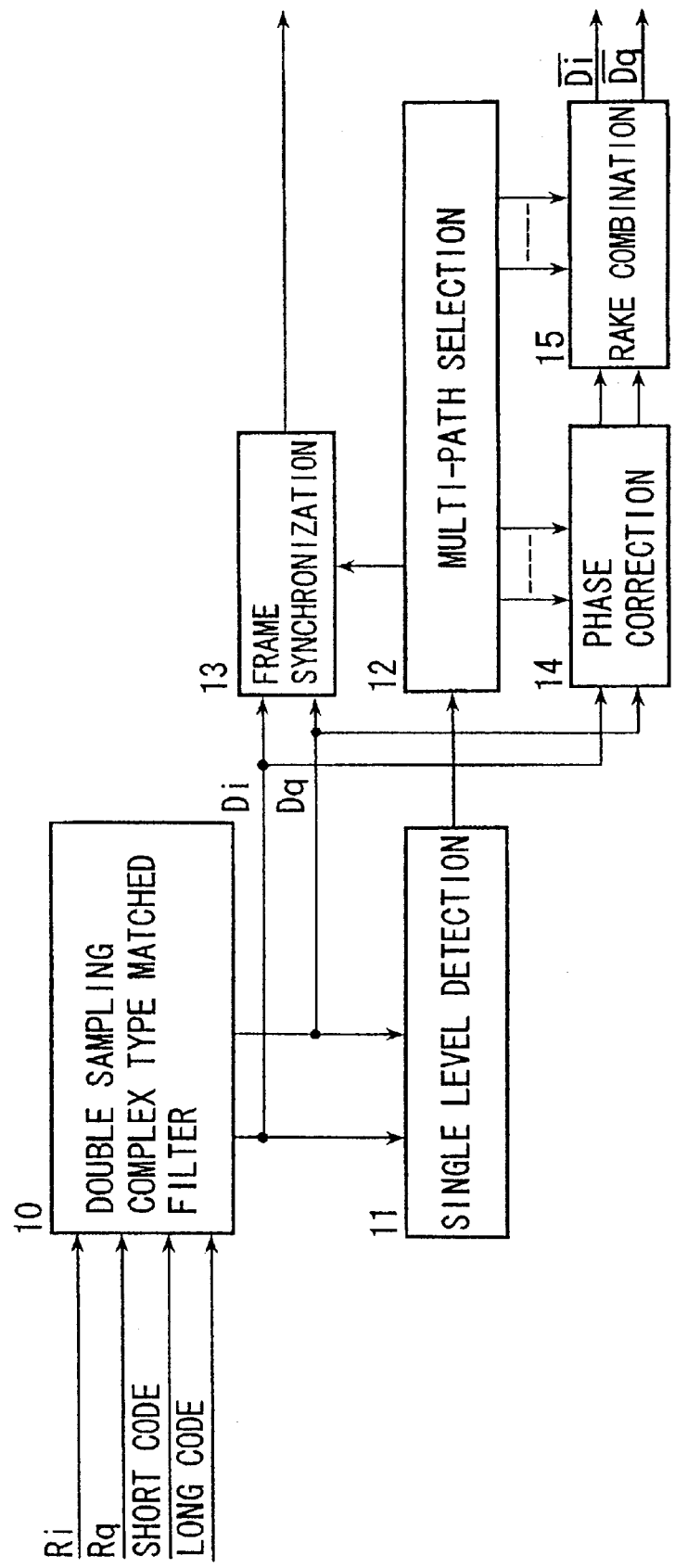
FIG. 1 is a block diagram showing the configuration of an embodiment of the signal reception apparatus according to the present invention.

FIG. 1 is a block diagram showing the configuration of an embodiment of the signal reception apparatus according to the present invention. What is shown in this drawing corresponds to those components of the RAKE receiver shown in FIG. 26b that are surrounded by a broken line. In FIG. 1, the complex-type matched filter 10 corresponds to the complex-type matched filter 110 of the RAKE receiver shown in FIG. 26b. In this embodiment, the complex-type matched filter 10 has 128 taps. However, the number of taps can be changed as needed. This complex-type matched filter 10 samples the quadrature-detected received signals Ri and Rq at a clock frequency that is twice as high as the symbol rate, and calculates by analog operations the correlation between these signals Ri and Rq and a replica of the prescribed spread codes (long code PN and short code PN). The effective tap number (number of taps) of the complex-type matched filter 10 can be changed in accordance with the spread factor, that is, the number of chips per symbol of the transmitted signal. For example, if the spread of the transmitted signal is modulated by spread codes having 64 chips per symbol, the tap number of the complex-type matched filter 10 is set to 64. The tap number of the complex-type matched filter 10 is controlled and changed by an externally supplied control signal.

The signal level detector 11 calculates the electric power levels of the correlation output signals Di and Dq that are supplied from the complex-type matched filter 10. The multi-path selector 12 detects the peaks of the signal levels that are supplied from the signal level detector 11, and selects the positions of multiple (for example, four) peaks having electric power levels whose magnitudes exceed a prescribed value in the descending order of the magnitudes of the electric power levels of the peaks. In this embodiment, the number of symbols per pilot symbol block is set to four, the number of symbols per information symbol block per slot is set to 36, and the number of paths selected by the multi-path selector 12 is set to at most four. However, these numbers may be changed in order to achieve other embodiments of the present invention using other numbers without changing the fundamental configuration.

The frame synchronization circuit 13 detects frame synchronization using the received signal of the path having the highest electric power level that is supplied from the complex-type matched filter 10. Specifically, the frame synchronization circuit 13 receives a signal from the multi-path selector 12 indicating the received signal of the path having the highest electric power level, and detects a predetermined pattern in the received signals of the pilot symbols contained in the received signal of this path. In this way, the frame synchronization circuit 13 detects frame synchronization.

The phase correction block 14 receives from the multi-path selector 12 the signals of the multiple paths (for example, four paths), which have been selected out of the outputs of the complex-type matched filter 10 by the multi-path selector 12, calculates a phase error vector based on the received signals of the pilot symbols, and corrects the phase of each of the signals of the multiple paths using the phase error vector. This phase correction block 14 will be explained in detail later.

The RAKE combiner 15 receives the phase-corrected received signals of the multiple paths from the phase correction block 14, and combines these phase-corrected received signals at a synchronized timing. The outputs Di-bar and Dq-bar of the RAKE combiner 15 are de-modulated in a subsequent circuit.

Figure 26A:
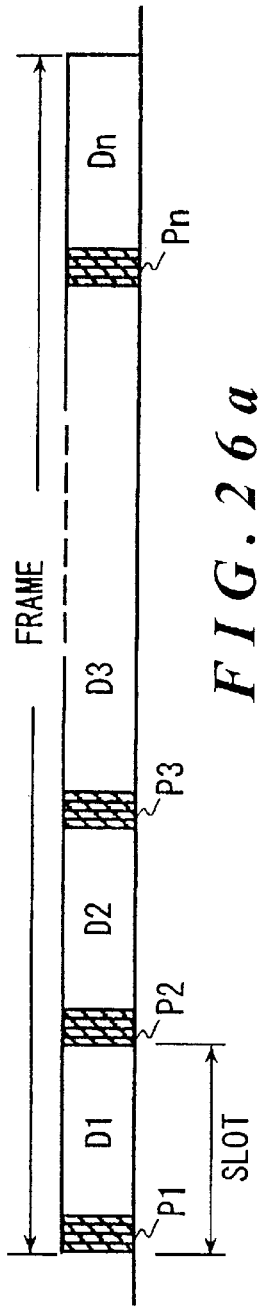
FIGS. 26a and 26b explain the frame structure of the transmission data and the RAKE receiver of the DS-CDMA communication system.
Figure 26B:
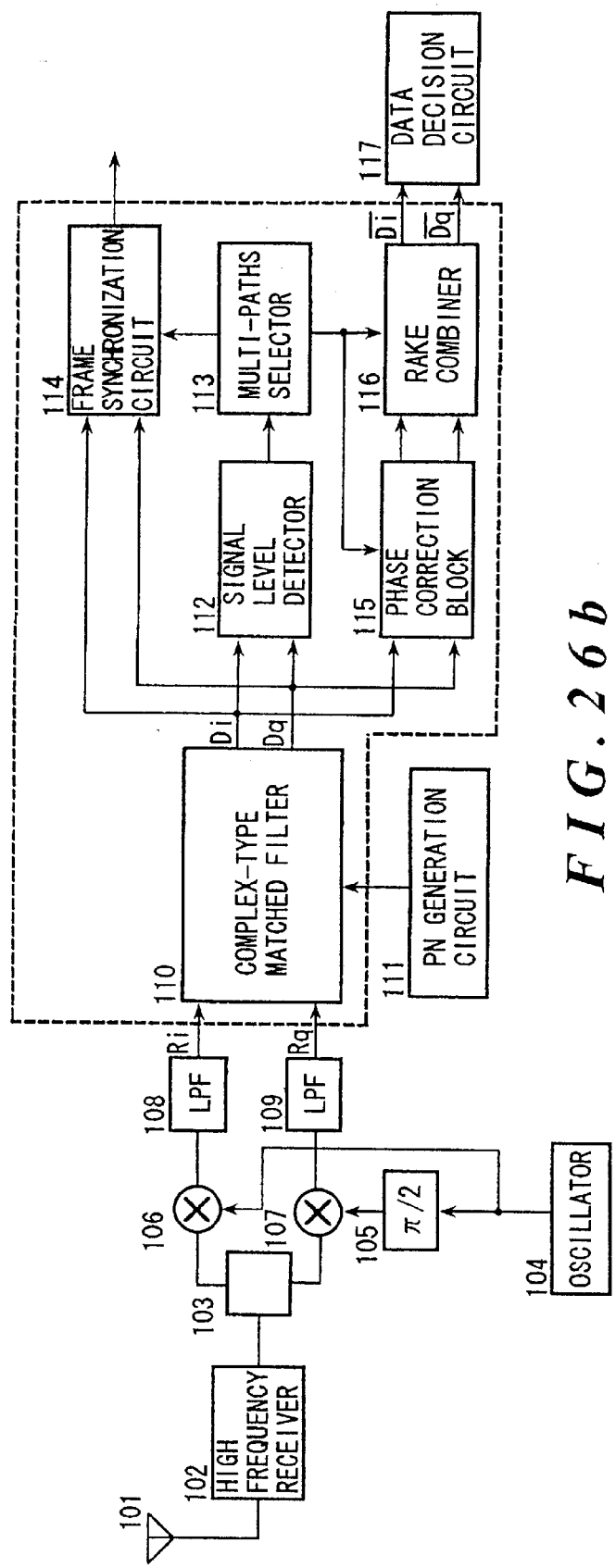

The above-explained configuration is almost identical to the configuration of the conventional RAKE receiver shown in FIG. 26b. However, the signal reception apparatus according to the present invention differs from the conventional RAKE receiver shown in FIG. 26b in that the phase correction block 14 contains both digital circuits and analog circuits. Therefore, compared with the afore-mentioned conventional signal reception apparatus which corrects the phases of the received signals using only digital circuits, the circuitry of the signal reception apparatus according to the present invention is smaller, and consumes a smaller amount of electric power. In what follows, the phase correction block 14 of the signal reception apparatus according to the present invention will be explained in detail.

[2. Phase Correction Block 14]

Figure 2:
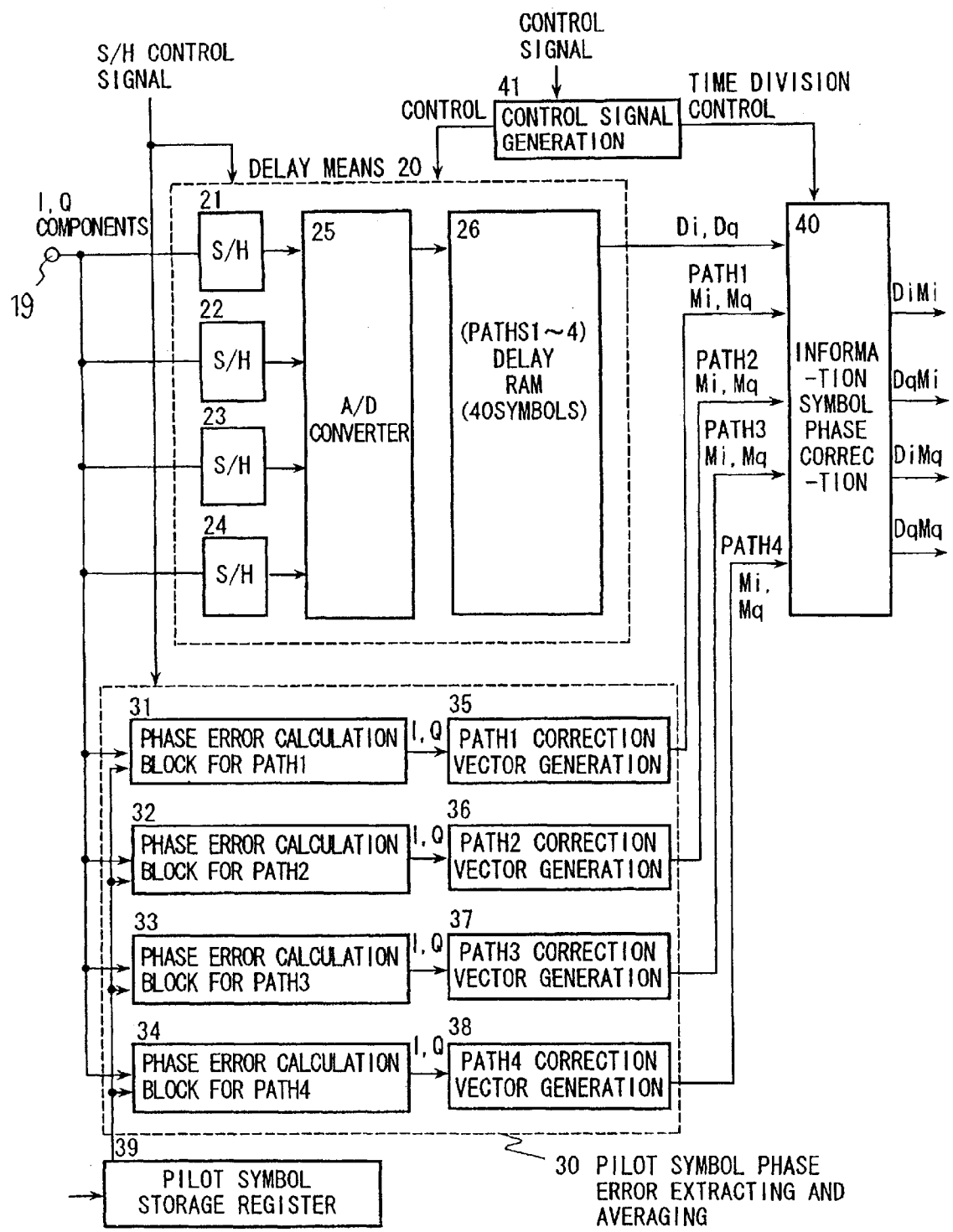
FIG. 2 is a block diagram showing the configuration of the phase correction block of the embodiment of the signal reception apparatus according to the present invention.
Figure 27A:
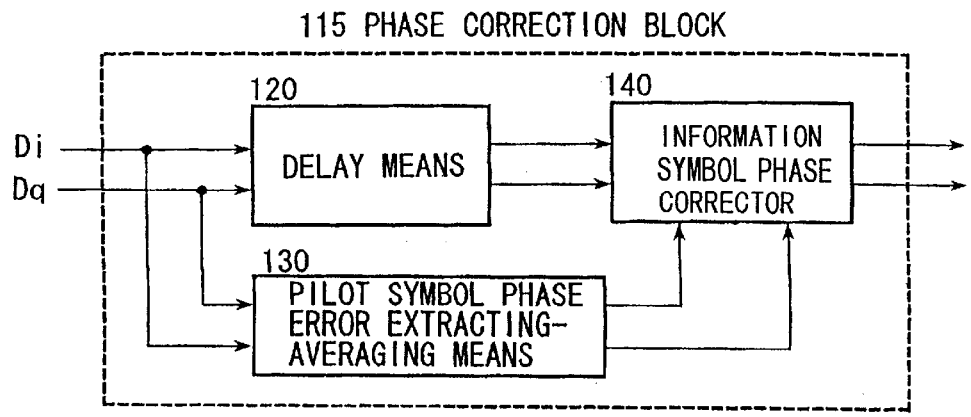
FIG. 27 shows an example of the phase correction process and the configuration of the phase correction block of the RAKE receiver.
Figure 27B:
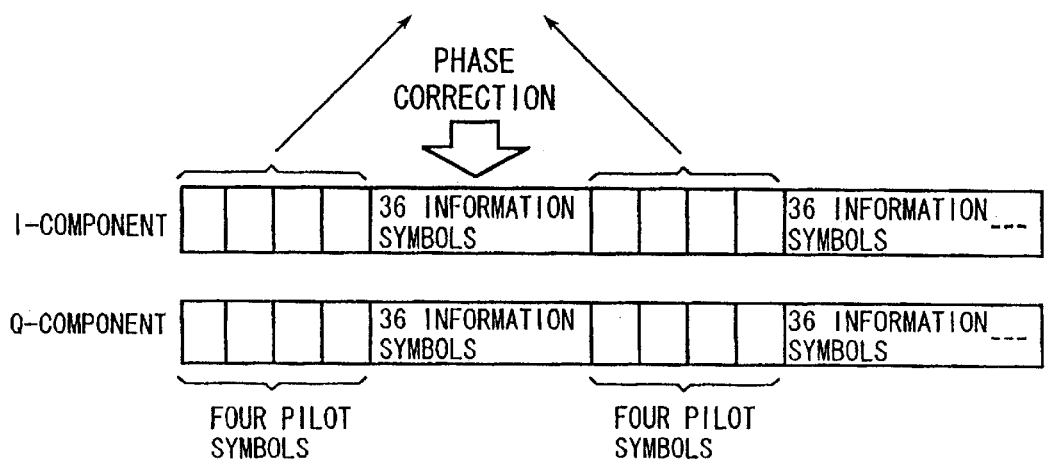

FIG. 2 is a block diagram showing the configuration of the phase correction block 14 according to the present invention. As has been explained with reference to FIG. 27a, the phase correction block 115 is comprised of the delay means 120, the pilot symbol phase error extracting-averaging means 130, and the information symbol phase correction means 140. The phase correction block 115 corrects the phases of the received signals of an information symbol block using the phase error vector that has been calculated from the received signals of the pilot symbol blocks that are positioned before and after the information symbol block. The phase correction block 14 of the present invention is similarly structured. In FIG. 2, the delay means 20, the phase error extracting-averaging means 30, and the phase corrector 40 correspond to the information symbol delay means 120, the pilot symbol phase error extracting- averaging means 130, and the information symbol phase corrector 140, respectively, of FIG. 27a.

The signal input terminal 19 is connected to the output terminal of the complex-type matched filter 10. As has been explained before, the I-component Di and the Q-component Dq of the de-spread output of the complex-type matched filter 10 are supplied to this input terminal. The pilot symbol storage register 39 stores the transmitted data of prescribed pilot symbols that are externally set. The control signal generation circuit 41 generates control signals to be supplied to each unit of the phase correction block 14.

As shown in FIG. 2, the sample holders (S/H circuits) 21 through 24, the analog-digital converter (A/D converter) 25, for converting the outputs of the sample holders 21 through 24 into digital signals, and the information delay RAM 26, for recording the outputs of the A/D converter 25, comprise the information symbol delay means 20.

The sample holders (S/H circuits) 21 through 24 sample and hold the outputs of the complex-type matched filter 10 that are supplied from the input terminal 19 in response to sample-and-hold control signals (S/H control signals). As has been explained before, the multi-path selector 12 selects, for example, four paths through which signals are to be received. An S/H control signal is supplied to the sample holders (S/H circuits) 21 through 24 that correspond to each of the selected paths at a timing that corresponds to the information symbol block. Then, each of the sample holders (S/H circuits) 21 through 24 samples and holds the received signal of the information symbol block of the base band of the path to which the respective sample holder corresponds. The sample holders (S/H circuits) 21 through 24 also sample and hold the I-component Di and the Q-component Dq of each of the de-spread base band signals that are output from the complex-type matched filter 10.

The A/D converter 25 converts the I-component and Q-component base band output signals, which correspond to the selected paths and are sequentially output from each of the sample holders (S/H circuits) 21 through 24, into digital data (for example, 8-bit data for each of the I and Q-components). The information delay RAM 26 records the digital data to a prescribed address. In this case, a small number (for example, two) of A/D converters convert the analog signals of multiple paths (for example, the I-component signals and the Q-component signals through four paths) into digital signals by time-sharing. In this way, the circuitry and the electric power consumption of the phase correction block 14 can be reduced. The received signals of the information symbol blocks need to be stored until the reception of the signals of the subsequent plot symbol blocks is completed in order to perform the aforementioned phase correction process. The information delay RAM 26 has the capacity to store 40 information symbols that have been received from each of the paths #1 through #4 (160 information symbols in total). The control signal generation circuit 41 supplies control signals to each of the sample holders (S/H circuits) 21 through 24.

The information delay RAM 26 consumes a very small amount of electric power while it stores the data. Even if a data storage means is used as a delay means for storing the data that has been converted into digital data, the data storage means consumes a very small amount of electric power. However, if an analog delay means is used, the circuitry of the delay means becomes very large. But, the circuitry becomes small if such a RAM of the sort mentioned above is used, which is advantageous.

As shown in FIG. 2, the phase error calculation block 31 for path 1, the phase error calculation block 32 for path 2, the phase error calculation block 33 for path 3, the phase error calculation block 34 for path 4, the correction vector generator 35 for path 1, which receives the outputs of the phase error calculation block 31, the correction vector generator 36 for path 2, which receives the outputs of the phase error calculation block 32, the correction vector generator 37 for path 3, which receives the outputs of the phase error calculation block 33, and the correction vector generator 38 for path 4, which receives the outputs of the phase error calculation block 34, comprise the phase error extracting-averaging means 30. It should be noted that the four phase correction calculation blocks 31 through 34 are identically structured and are installed in parallel. The four correction vector generators 35 through 38 are also identically structured and are installed in parallel.

Each of the phase error calculation blocks 31 through 34 is installed in correspondence with one of the paths which the multi-path selector 12 selects. In accordance with equation (1), based on the transmission signal vector of the pilot symbols stored in the pilot symbol storage register 39 and the received signal vector of the pilot symbols that correspond to each path, each of the phase error calculation blocks 31 through 34 calculates a phase error vector E(x) (where x represents the path number: x=1, 2, 3, 4) that is contained in the received signal vector of the respective pilot symbols. Then, each of the phase error calculation blocks 31 through 34 calculates the average E of the phase errors, which the respective error calculation block calculated from the received signals of the pilot symbol block contained in the slot.

Each of the phase error calculation blocks 31 through 34 that are installed in correspondence with the selected paths supplies the phase error vector to the respective one of the correction vector generators 35 through 38. Each of the correction vector generators 35 through 38 calculates a correction vector Mx (x=1, 2, 3, 4) corresponding to the respective path, which is defined by equations (5) through (7).

Each of the correction vector generators 35 through 38 supplies the respective correction vector Mx (x=1, 2, 3, 4) to the information symbol corrector 40. The information symbol corrector 40 sequentially reads out the information symbols that correspond to each path, which have been stored in the delay RAM 26. Then the information symbol corrector 40 corrects, by time-sharing, the phases of the correction vectors Mx (x=1, 2, 3, 4), supplied from the correction vector generators 35 through 38, and the phases of the information symbols represented by equation (8). Finally, the information symbol corrector 40 sequentially transmits signals DiMi, DqMi, DiMq, and DqMq, which correspond to paths 1, 2, 3, and 4, respectively, to the RAKE combiner 15. The RAKE combiner 15 sums up these signals DiMi, DqMi, DiMq, and DqMq at a synchronized timing, and calculates the combined output represented by equations (9) and (10). In this way, the selected paths are diversified.

In what follows, an example of the structure of each component of the phase correction block 14 will be explained in detail. However, before that, an analog-type operation circuit (neuro-operation circuit) that is used in the signal reception apparatus of the present invention will be explained. This, analog-type operation circuit speeds up the operation of the phase correction block 14 and reduces the electric power consumption of the phase correction block 14.

[2.1 Analog-type Operation Circuit]

Figure 3A:
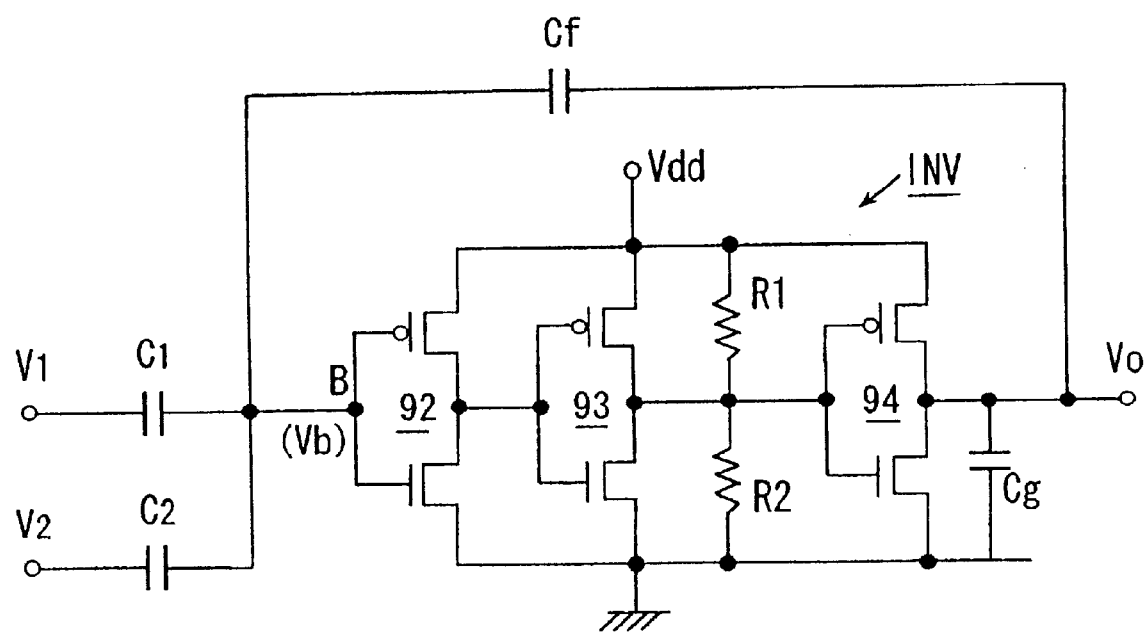
FIGS. 3a and 3b show configurations of the analog-type operation circuit.
Figure 3B:
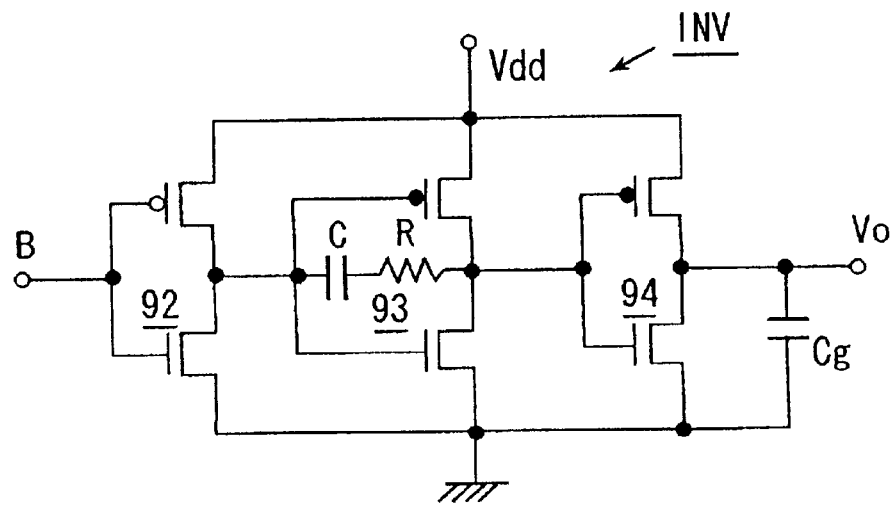

With reference to FIGS. 3a and 3b, this analog-type operation circuit will be explained. FIG. 3a shows the basic configuration of this analog-type operation circuit. In this diagram, $V_1$ and $V_2$ are input terminals (and the input voltages that are supplied to the input terminals). $V_0$ is an output terminal (and the output voltage of the output terminal). INV is an inversion amplifier. This inversion amplifier INV uses a CMOS inverter as an amplifier by using a portion through which the output of the CMOS inverter changes from a high level to a low level or from a low level to a high level. The inversion amplifier INV is comprised of an odd number of serially connected CMOS inverters, for example, three serially connected CMOS inverters 92, 93, and 94, as shown in the diagram. The resistors R1 and R2 (having resistance R1 and R2, respectively) control the gain of the amplifier. The capacitor Cg (having capacitance Cg) adjusts the phase of a signal supplied to this analog-type operation circuit. The capacitor Cg and the resistors R1 and R2 prevent the oscillation of this inversion amplifier INV.

The input capacitor $C_1$, having capacitance $C_1$, is serially installed between the input terminal $V_1$ and the input-side point B of the inversion amplifier INV. The input capacitor $C_2$, having capacitance $C_2$, is serially installed between the input terminal $V_2$ and the input-side point B of the inversion amplifier INV. In addition, the feedback capacitor Cf, having capacitance Cf, is connected between the output terminal $V_O$ and the input-side point B of the inversion amplifier INV.

In the circuit that is structured in this way, the voltage amplification factor of the inversion amplifier INV is very large. Therefore, the voltage at the input-side point B of the inversion amplifier INV is almost constant at a value of Vb. The point B is connected to the gate of the MOS transistor that comprises the capacitors $C_1$, $C_2$, and Cf, and the CMOS inverter 92. The point B is in a floating state with respect to all the power sources.

Therefore, if the amount of electric charge stored in each of the capacitors $C_1$, $C_2$, and Cf is zero in the initial state, the total amount of electric charge stored in each of the capacitors $C_1$, $C_2$, and Cf is zero with respect to this point B even after the input voltages $V_1$, and $V_2$ have been applied to the capacitors $C_1$, $C_2$, and Cf. Therefore, the following equation of conservation of electric charge holds.

$$C_1(V_1-Vb)+C_2(V_2-Vb)+Cf(V_0-Vb)=0 \quad (11)$$

Now, if the input voltages $V_1$ and $V_2$ are replaced by the voltages measured with respect to the voltage Vb at the point B denoted by $V(1)=V_1-Vb$, $V(2)=V_2-Vb$, and $Vout=V_0-Vb$, then the following equation (12) can be derived from equation (11).

$$Vout = -\left(\frac{C_1}{Cf}V(1) + \frac{C_2}{Cf}V(2)\right) \quad (12)$$

In other words, the analog-type operation circuit (neuro-operation circuit) outputs the voltage Vout that is obtained by adding the input voltage V(1) multiplied by the coefficient ($C_1$/Cf), which is the ratio of the input capacitance $C_1$, with respect to the feedback capacitance Cf and the input voltage V(2) multiplied by the coefficient ($C_2$/Cf), which is the ratio of the input capacitance $C_2$ with respect to the feedback capacitance Cf, and by inverting the polarity of the sum.

In the above, the case in which two input voltages are applied to the capacitors $C_1$, $C_2$, and Cf has been explained. However, the above-stated relation holds in the case in which any number of input voltages are applied to the same number of input capacitors $C_1$, . . . , $C_n$. The generalized relation can be expressed as follows.

$$Vout = -\left(\frac{C_1}{Cf}V(1) + \frac{C_2}{Cf}V(2) + \cdots + \frac{C_1}{Cf}V(i) + \cdots + \frac{C_n}{Cf}V(n)\right) \quad (13)$$

The voltage Vb at the point B is usually set to ½ of the source voltage Vdd, that is, Vb=Vdd/2 in order to maximize the dynamic range.

Oscillation of the inversion amplifier INV shown in FIG. 3a is prevented by suppressing the gain of the CMOS inverter 93 using the resistors R1 and R2. However, oscillation of the inversion amplifier INV can also be prevented using other configurations.

FIG. 3b shows an example of such an alternative configuration of an inversion amplifier INV. As shown in this diagram, a serial circuit having a resistor R and a capacitor C is installed between the input and output of the middle-stage CMOS inverter 93 of the inversion amplifier INV. The serial circuit having the resistor R and the capacitor C functions as a negative feedback circuit for the CMOS inverter 93. Since the serial circuit having the resistor R and the capacitor C serves as a load for the CMOS inverter 93, the serial circuit having the resistor R and the capacitor C suppresses the gain of the inversion amplifier INV. Therefore, this inversion amplifier INV constitutes an analog-type operation circuit (neuro-operation circuit), which consumes less electric power than the analog-type operation circuit (neuro-operation circuit) shown in FIG. 3a, in which a pass-through current due to the resistors R1 and R2 flows.

Figure 4A:
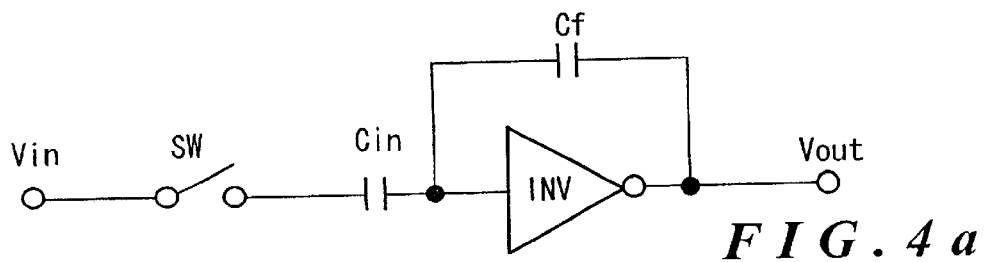
FIGS. 4a, 4b, and 4c show configurations of the sample holders, the multipliers, and the addition-subtraction circuit, respectively.

This type of analog-type operation circuit (neuro- operation circuit) is able to output the output voltage Vout shown by equation (13) with a high degree of accuracy. Therefore, this circuit can be used to realize various types of operation circuits or function circuits. Various types of circuits that are realized using this analog-type operation circuit (neuro-operation circuit) will now be explained with reference to FIGS. 4a, 4b, and 4c. FIG. 4a shows an example of the configuration of a sample holder in which this analog-type operation circuit (neuro-operation circuit) is used. By using the analog-type sample holders shown in FIG. 4a for the sample holders 21 through 24, the electric power consumption of the sample holders 21 through 24 can be reduced.

In FIG. 4a, Vin denotes the input voltage. SW denotes the sampling switch circuit. Cin denotes the input capacitor that is serially connected to the input terminal of the inversion amplifier INV. Cf is the feedback capacitor. Vout is the output voltage. Here, the input capacitor Cin and the feedback capacitor Cf have the same capacitance. The sampling switch circuit SW is comprised of, for example, an analog switch circuit using a MOS transistor, or a CMOS transmission gate.

As is evident from FIG. 4a, this sample holder corresponds to a special case of the neuro operation circuit shown in FIG. 3a in which the two input terminals are replaced by one input terminal. In addition, since the value of the input capacitor Cin and the value of the feedback capacitor Cf are the same, the output voltage Vout becomes Vout=−Vin, in accordance with equation (12). Therefore, when the sampling switch SW is closed, the sample holder shown in FIG. 4a functions as a high accuracy inversion amplifier.

By first closing the sampling switch SW and then opening the sampling switch SW at a sampling timing, the polarity of the input voltage at the time the sampling switch is opened is inverted. The sample holder outputs the inverted voltage from the output terminal, and holds the voltage level until the sampling switch is closed. A sample holder that is structured in this way operates with a high degree of accuracy and consumes a small amount of electric power.

Figure 4B:
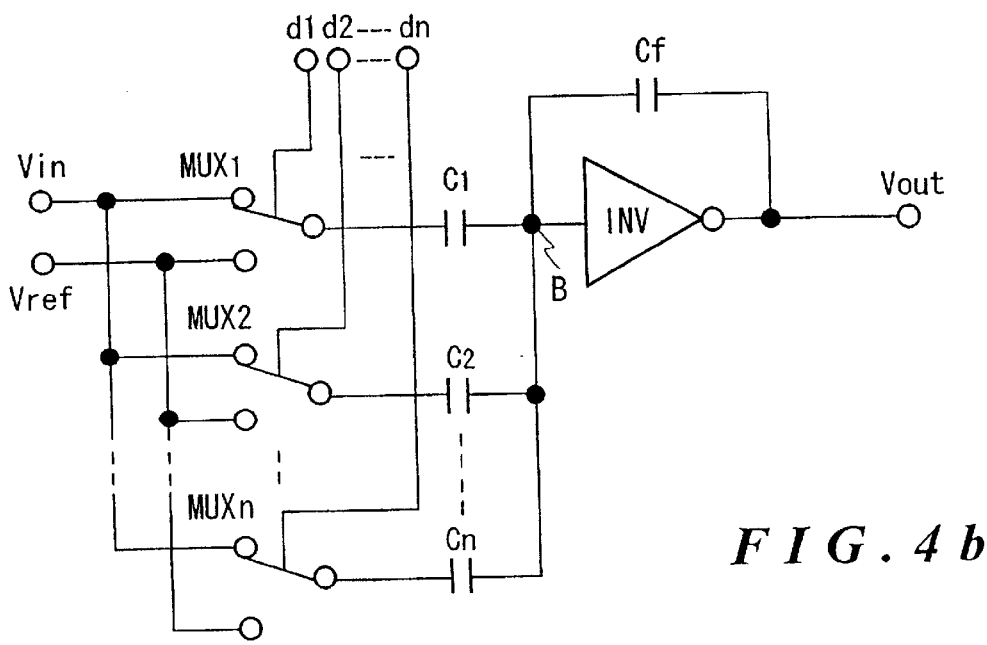

FIG. 4b shows the configuration of an example of a multiplier in which the neuro-operation circuit is used. In this diagram, Vin denotes the input voltage. Vref denotes the reference voltage satisfying the relation Vref=Vdd/2=Vb. The first input terminal of each of the capacitor switching multiplexers MUX1 through MUXn is connected to the input terminal Vin. The second input terminal of each of the capacitor switching multiplexers MUX1 through MUXn is connected to the reference voltage terminal Vref. The output terminals of the capacitor switching multiplexers MUX1 through MUXn are connected to the input capacitors C1, having capacitance $C_1$, through $C_n$, having capacitance $C_n$, respectively. The control signals $d_1$ through $d_n$ are supplied to the multiplexers MUX1 through MUXn, respectively. If the value of the control signal $d_i$ (i=1 through n) is 1, the input voltage Vin that is supplied to the first input terminal of the capacitor switching multiplexer MUXi is selected. Then, the selected input voltage Vin is supplied to the corresponding capacitor $C_i$. If the value of the control signal $d_i$ is 0, the reference voltage Vref (Vb) is selected. The ends of the input capacitors $C_1$ through $C_n$ not connected to the output terminals of the multiplexers MUX1 through MUXn are connected to the input side point B of the inversion amplifier INV. The feedback capacitor Cf is connected between the point B and the output side of the inversion amplifier INV.

The capacitance of the input capacitors $C_1$ through $C_n$ is set to satisfy the relation shown by the following equation (14).

$$C_n = 2C_{n-1} = \ldots = 2^i C_{n-i} = \ldots = 2^{n-1} C_1 \quad (14)$$

That is, the capacitance of the capacitor $C_{i+1}$ is set twice as large as that of the capacitor $C_i$, where i=1, ..., n-1.

Therefore, the equation of conservation of electric charge in this case is given by the following equation (15).

$$\sum_{i=1}^{n} C_i d_i (V_{in} - Vb) + \sum_{i=1}^{n} C_i (1-d_i)(V_{ref} - Vb) + Cf(Vout - Vb) = 0 \quad (15)$$

Since Vref=Vb, the output voltage Vout can be expressed by the following equation (16).

$$Vout - Vb = -\frac{1}{Cf} \sum_{i=1}^{n} C_i d_i (V_{in} - Vb) = -\frac{C_1}{Cf}(V_{in} - Vb) \sum_{i=1}^{n} 2^{i-1} d_i \quad (16)$$

In other words, the output voltage with respect to Vb (Vout–.Vb) is obtained as the result of multiplying the n-bit binary number, each bit of which corresponds to the control signals $d_i$ through $d_n$, respectively, by the product of the ratio $-C_1/Cf$ and the input voltage ($V_{in}$–Vb). Therefore, using this multiplier, an n-bit digital coefficient can be multiplied directly by the input analog signal voltage as shown by the right hand side of equation (16).

Figure 4C:
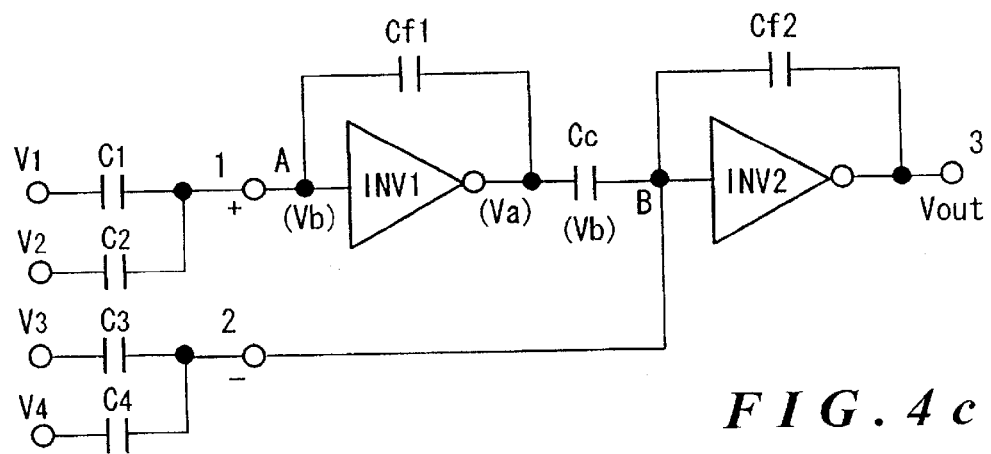

FIG. 4c shows an example of the configuration of an addition-subtraction circuit having the above-explained neuro- operation circuit. In this diagram, $V_1$ through $V_4$ are input terminals (and the input voltages supplied to these input terminals, respectively). C1 through C4 are input capacitors having the capacitance $C_1$ through $C_4$, respectively, and are connected to the input terminals $V_1$, through $V_4$, respectively. It should be noted that the number of input terminals is not restricted to four, and can be any number.

Further, INV1 denotes a first inversion amplifier, which is identical to the afore-mentioned inversion amplifier INV. INV2 denotes a second inversion amplifier, which is identical to the afore-mentioned inversion amplifier INV. "A" denotes an input side point of the first inversion amplifier INV1. "B" denotes an input side point of the second inversion amplifier INV2. $Cf_1$ denotes a feedback capacitor, having capacitance $Cf_1$, of the first inversion amplifier INV1. $Cf_2$ denotes a feedback capacitor, having capacitance $Cf_2$, of the second inversion amplifier INV2. Cc is a coupling capacitor, having capacitance Cc, that is installed between the output side of the first inversion amplifier INV1 and the input side point B of the second inversion amplifier INV2. The capacitors $C_1$ through $C_4$ have the capacitance $C_{in}$. In addition, the coupling capacitor Cc and the feedback capacitors $Cf_1$, and $Cf_2$ all have the same capacitance, that is, $Cc=Cf_1=Cf_2$.

In the above-explained configuration, in accordance with equation (12), the output side of the first inversion amplifier INV1 has the output voltage Va given by the following equation (17).

$$Va - Vb = -\left(\frac{C_1}{Cf_1}(V_1 - Vb) + \frac{C_2}{Cf_1}(V_2 - Vb)\right) \quad (17)$$

It follows that the output side of the second inversion amplifier INV2 has the output voltage Vout given by the following equation (18).

$$Vout - Vb = -\left(\frac{Cc}{Cf_2}(Va - Vb) + \frac{C_3}{Cf_2}(V_3 - Vb) + \frac{C_4}{Cf_2}V_4 - Vb\right) \quad (18)$$

$$= -(Va - Vb) - \left(\frac{C_3}{Cf_2}(V_3 - Vb) + \frac{C_4}{Cf_2}(V_4 - Vb)\right)$$

$$= \frac{C_1}{Cf_2}(V_1 + V_2 - V_3 - V_4)$$

In other words, the output voltage (Vout–Vb) of this adder with respect to Vb is ($C_1/Cf_2$) times the value obtained by subtracting the input voltages $V_3$ and $V_4$ from the sum of the input voltages $V_1$ and $V_2$. The addition-subtraction circuit that is realized in this way functions with a high degree of accuracy and consumes little electric power. In the above, the case in which two positive input terminals and two negative input terminals are used has been explained. However, the numbers of positive and negative input terminals are not restricted to these numbers. Any number of positive input terminals and any number of negative input terminals may be used.

[2.1.1 Refreshment of the Analog Operation Circuit]

A high speed, low power consuming operation circuit can be realized using the above-explained neuro-operation circuit. However, in an analog-type operation circuit like this neuro-operation circuit, electric charge remains as a residue in the inverters and capacitors during operation. The residue electric charge induces the generation of an offset voltage, which reduces the output accuracy of the operation circuit. Therefore, this offset voltage needs to be eliminated. In other words, the operation circuit needs to be refreshed.

Figure 5:
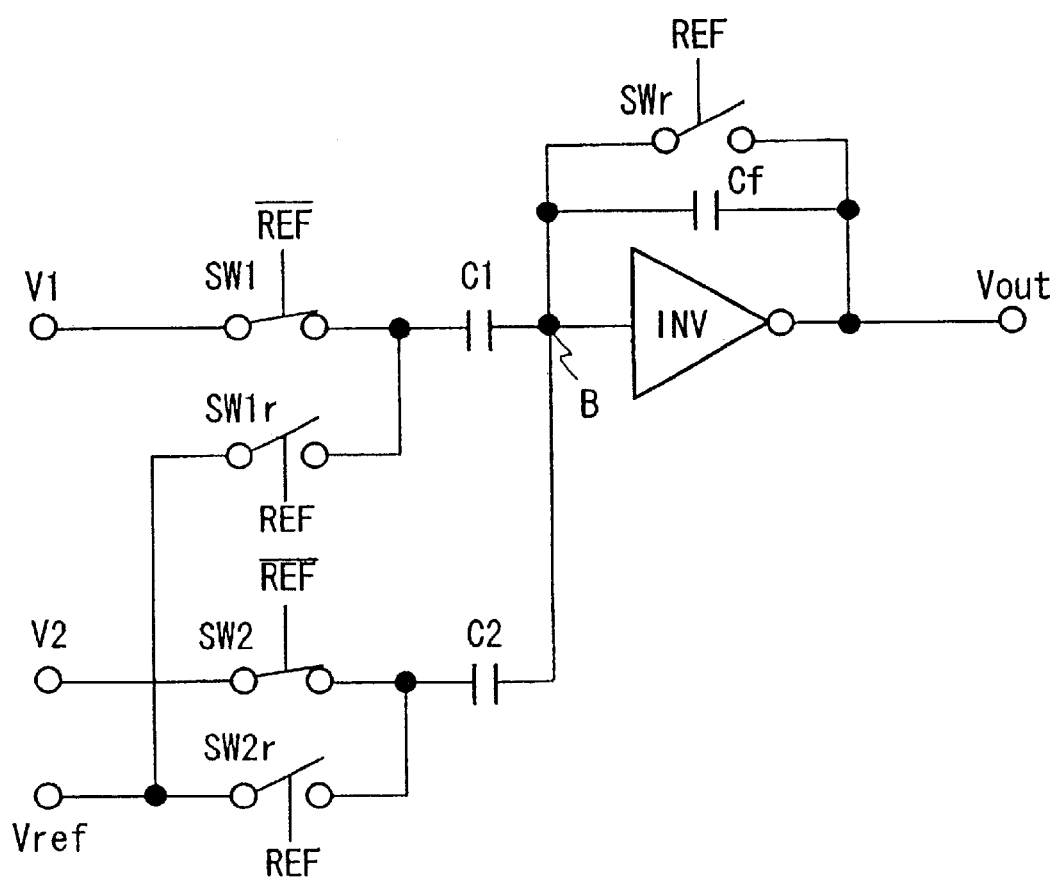
FIG. 5 shows an example of the configuration of the analog-type operation circuit having a refreshing component.

The afore-mentioned analog-type operation circuit, having such a refreshment means, will be explained with reference to FIG. 5. FIG. 5 shows the configuration of an example of the neuro-operation circuit, shown in FIG. 3a, in which a refreshing means is additionally installed. In this diagram, the same reference codes are used for the components identical to those shown in FIG. 3a. Thus, these identical components will not be explained here. As shown in the diagram, this analog-type operation circuit has switches SW1r and SW2r, which supply the reference voltage Vref (Vb) to the input capacitors $C_1$ and $C_2$, and a switch SWr which shorts the feedback capacitor Cf. A refreshing signal REF controls the conduction and non-conduction of the switches SW1r, SW2r and SWr. These switches are set to become conductive, for example, when the refreshing signal REF is at a high level. In addition, a switch SW1 is installed between the input capacitor C1 and the corresponding voltage input terminal. Similarly, a switch SW2 is installed between the input capacitor $C_2$ and the corresponding voltage input terminal. The inverted signal (inverted REF) of the refreshing signal REF is used as a control signal and is supplied to the switches SW1 and SW2.

In the analog-type operation circuit that is structured in this way, during the normal operation mode in which the control signal REF is at a low level, the switches SW1r and SW2r are turned off, switches SW1 and SW2 are turned on, and the analog-type operation circuit shown in FIG. 5 operates in the same way as the analog-type operation circuit shown in FIG. 3*a*.

During the refreshing mode, in which the control signal REF is at a high level, the switches SW1r and SW2r are turned on and the switches SW1 and SW2 are turned off. As a result, the reference voltage Vref is supplied to the input sides of the capacitors $C_1$ and $C_2$, and the feedback capacitor Cf is shorted. In this way, the residue electric charge stored in the input capacitors $C_1$ and $C_2$, and the feedback capacitor Cf can be eliminated.

In the above, the case in which the analog-type circuit shown in FIG. 3*a* is refreshable has been explained. However, all of the circuits shown in FIGS. 4*a*, 4*b*, and 4*c* can be similarly structured and made refreshable.

In what follows, the configuration of the phase correction block 14 of the signal reception apparatus according to the present invention will be explained in detail.

[2.2 Phase Error Calculation Blocks 31 Through 34]

Figure 6A:
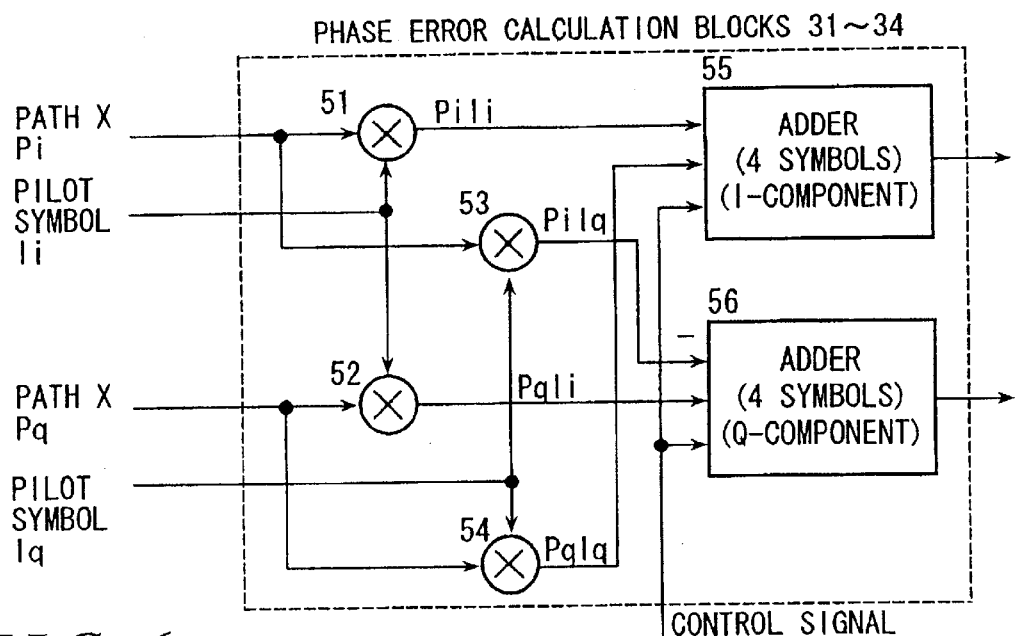
FIGS. 6a, 6b, and 6c show the configuration of the phase error calculation block of the embodiment of the signal reception apparatus according to the present invention.

As has been explained before, each of the identically structured phase error calculation blocks 31 through 34 calculates the phase errors contained in the received signals of the pilot symbols supplied through the corresponding paths in accordance with equation (1), and calculates the average of the phase errors in accordance with equation (2). FIG. 6*a* shows the schematic functional configuration of each of the identically structured phase error calculation blocks 31 through 34. In FIG. 6*a*, the reference codes 51, 52, 53, and 54 denote multipliers.

The multiplier 51 multiplies the I-component Pi of the analog received signal of the base band of the corresponding path that is supplied from the input terminal 19 by the I-component Ii of the digital transmission signal that corresponds to the transmission data of the pilot symbol that is supplied from the pilot symbol storage register 39, and outputs the product PiIi. Similarly, the multiplier 52 multiplies the Q-component Pq of the analog received signal of the base band of the corresponding path that is supplied from the input terminal 19 by the I-component Ii of the digital transmission signal, and outputs the product PqIi. The multiplier 53 multiplies the I-component Pi of the analog received signal by the Q-component Iq of the digital transmission signal, and outputs the product PiIq. The multiplier 54 multiplies the Q-component Pq of the analog received signal by the Q-component Iq of the digital transmission signal, and outputs the product PqIq.

As has been explained above, the information contained in each symbol is modulated by the QPSK modulation system. Therefore, each of the transmission data Ii and Iq assumes a value of either +1 or −1. It follows that the multipliers 51 and 53 multiply the received signal Pi by either +1 or −1. Similarly, it follows that the multipliers 52 and 54 multiply the received signal Pq by either +1 or −1. As will be explained later, these multipliers can be installed in the subsequent adders 55 and 56.

The adder 55 receives the output PiIi of the multiplier 51 and the output PqIq of the multiplier 54, and adds the outputs PiIi and PqIq, resulting in four pilot symbols (one pilot symbol block). In other words, this adder 55 integrates the I-components of the phase errors of the four pilot symbols contained in one pilot symbol block, and calculates the I-component of the average of the phase errors contained in the respective pilot symbols. Similarly, the adder 56 receives the inverted signal of the output PiIq of the multiplier 53 and the output PqIi of the multiplier 52, and adds the outputs PiIq and PqIi, resulting in four pilot symbols. Then, the adder 56 integrates the Q-components of the phase errors of the four pilot symbols contained in one pilot symbol block, and calculates the Q-component of the average of the phase errors contained in the respective pilot symbols.

Figure 6B:
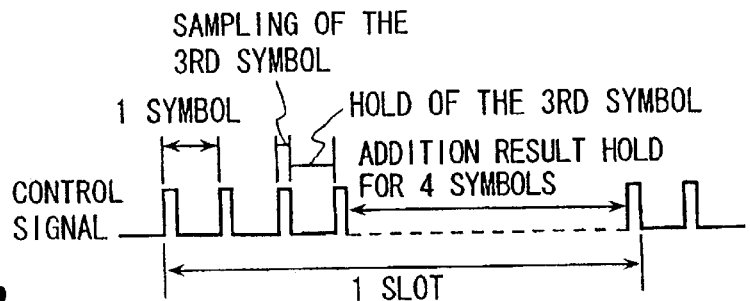
Figure 6C:
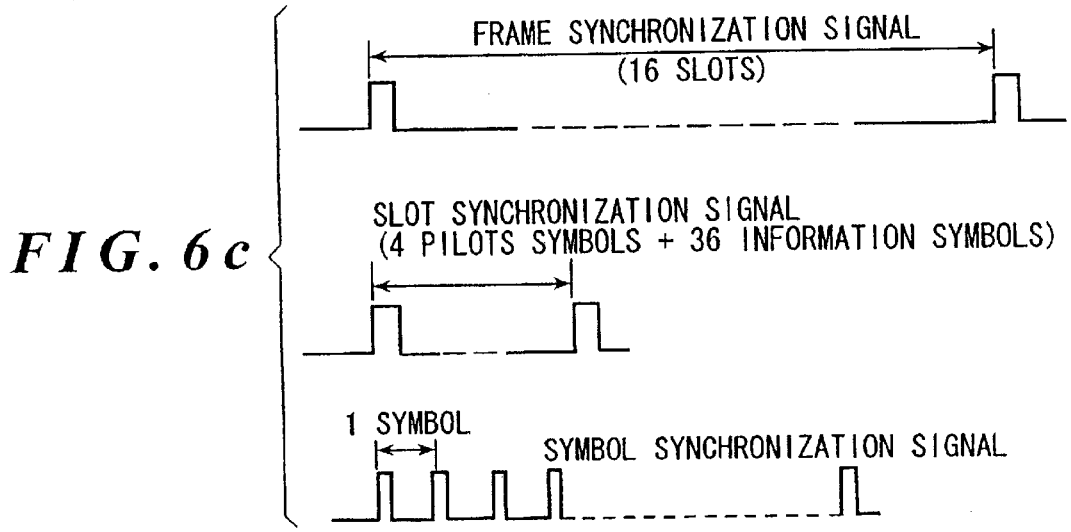

In order to perform the above-explained operations, as shown in FIG. 6*b*, a control signal (sampling clock) is supplied to each of the adders 55 and 56 during the 4-symbol interval in which each of the adders 55 and 56 receives the signals of the pilot symbol block for each slot. The control signal generator 41 generates this control signal (sampling clock) based on the frame synchronization signal, the slot synchronization signal, and the symbol synchronization signal, which are shown in FIG. 6*c*. Each of the adders 55 and 56 samples and receives the phase error signal of the pilot symbols when the control signal is at a high level, and holds the result of the addition when the control signal is at a low level. Therefore, as shown in FIG. 6*b*, after the control signal has become a low level signal for the fourth symbol, the result of the addition having the length of four symbols remains held until the control signal becomes a high level signal when the control signal synchronizes with the first symbol of the next slot.

Figure 7A:
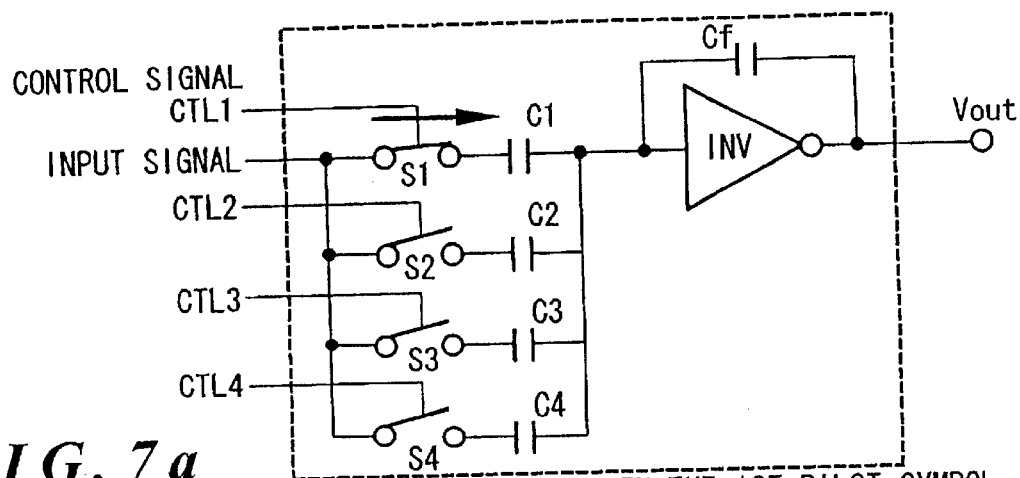
FIGS. 7a, 7b, and 7c explain the operation of the adders contained in the phase error calculation block of the embodiment of the signal reception apparatus according to the present invention.
Figure 7B:
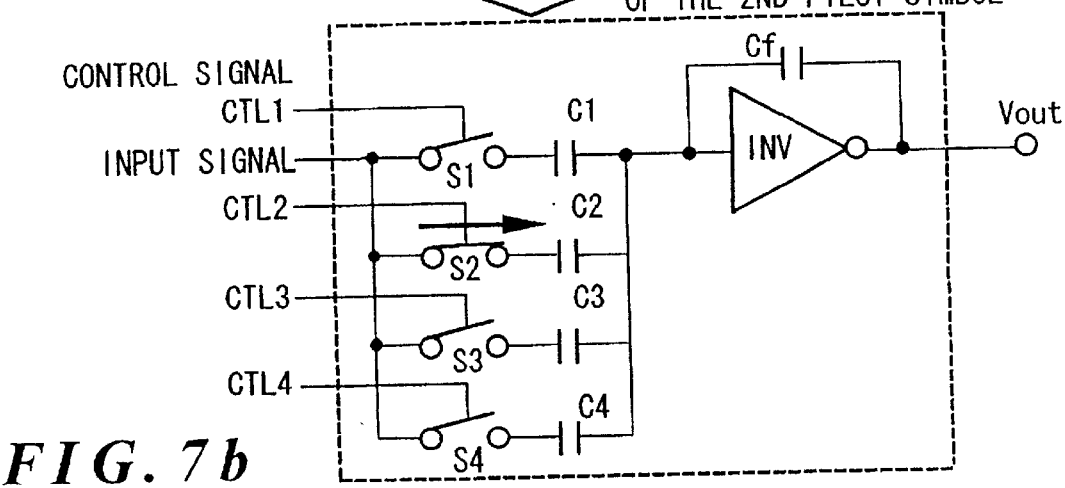
Figure 7C:
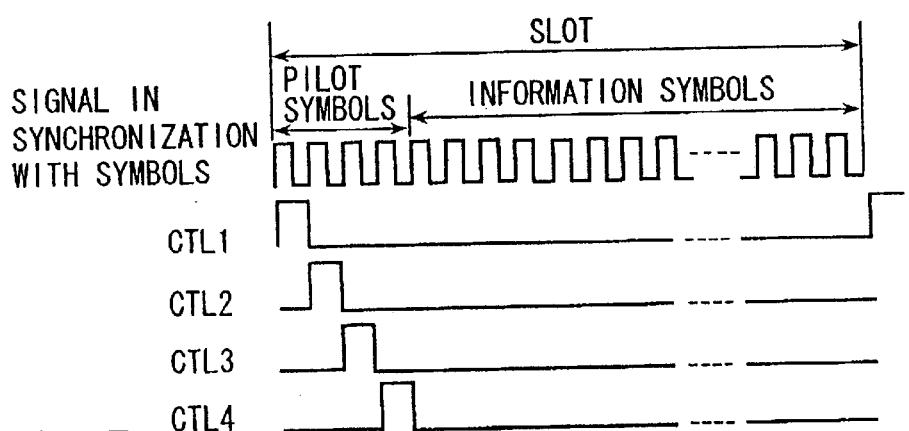

FIGS. 7*a* through 7*c* show the integration process of each of the adders 55 and 56 (in this case, the average calculation process). FIG. 7*a* shows the state of each of the adders 55 and 56 at the time when the input signal consisting of the first symbol of the pilot symbol block is being supplied to each of the adders 55 and 56. FIG. 7*b* shows the state of each of the adders 55 and 56 at the time when the input signal consisting of the second symbol of the pilot symbol block is being supplied to each of the adders 55 and 56. FIG. 7*c* shows the control signal in detail.

As shown in FIG. 7*a*, each of the adders 55 and 56 consists of the analog-type operation circuit shown in FIG. 3*a*. In FIG. 7*a*, the same reference codes are used for components identical to those of the analog-type operation circuit shown in FIG. 3*a*. These components will not be explained again. A control signal is supplied to the input capacitors C1, having capacitance C1, through C4, having capacitance C4 via the input switches S1 through S4. The input switches S1 through S4 are turned on or off by the control signals CTL1 through CTL4 (shown in FIG. 7*c*), respectively.

The capacitance of the input capacitors C1 through C4 are related to the capacitance of the feedback capacitor Cf by the following equation (19).

$$Cf = 4C1 = 4C2 = 4C3 = 4C4 \tag{19}$$

As shown in FIG. 7*a*, when the control signal CTL1, which is in synchronization with the input signal consisting of the first symbol of the pilot symbol block, is at a high level, the input switch S1 becomes conductive (is turned on), and the input signal at that point in time is supplied to the input capacitor C1 (the value of the input signal is denoted by V1). As a result, equation (12) yields the output voltage with respect to Vb, that is, Vout−Vb=−(V1−Vb)/4, which corresponds to the input signal (V1−Vb) at the output terminal of the inversion amplifier INV.

When the control signal CTL1 becomes a low level signal, and the control signal CTL2 becomes a high level signal, the input capacitor C1 is released, and the input capacitor C2 becomes conductive (is turned on). As a result, the input signal of the second symbol of the pilot symbol block (the input voltage of this signal is denoted by V2) is supplied to the input capacitor C2. FIG. 7b shows this state. In this case, it follows from equation (12) that the output voltage Vout of the inversion amplifier INV satisfies the equation below.

$$V\text{out}-Vb=-\{(V1-Vb)+(V2-Vb)\}/4$$

Similarly, when the control signal CTL3 turns on the input switch S3, the input voltage signal V3, consisting of the third symbol of the pilot symbol block at this point in time, is supplied to the input capacitor C3. When the control signal CTL4 turns on the input switch S4, the input voltage signal V4, consisting of the fourth symbol of the pilot symbol block at this point in time, is supplied to the input capacitor C4. In this case, in accordance with equation (12), the output voltage Vout of the inversion amplifier INV satisfies the equation below.

$$V\text{out}-Vb=-\{(V1+V2+V3+V4)/4-Vb\}$$

Then, each of the adders 55 and 56 outputs the average of the four input signals that have been supplied to the input capacitor C1 through C4 at respective points in time.

Here, one of the outputs PiIi, PiIq, PqIi, and PqIq of the multipliers 51 through 54, respectively, is supplied as an input signal to each of the adders 55 and 56. Thus, this adder can be installed in correspondence with each of the inputs in order to form each of the adders 55 and 56 shown in FIG. 6a.

[2.2.1 Adders 55 and 56 ]

Figure 8:
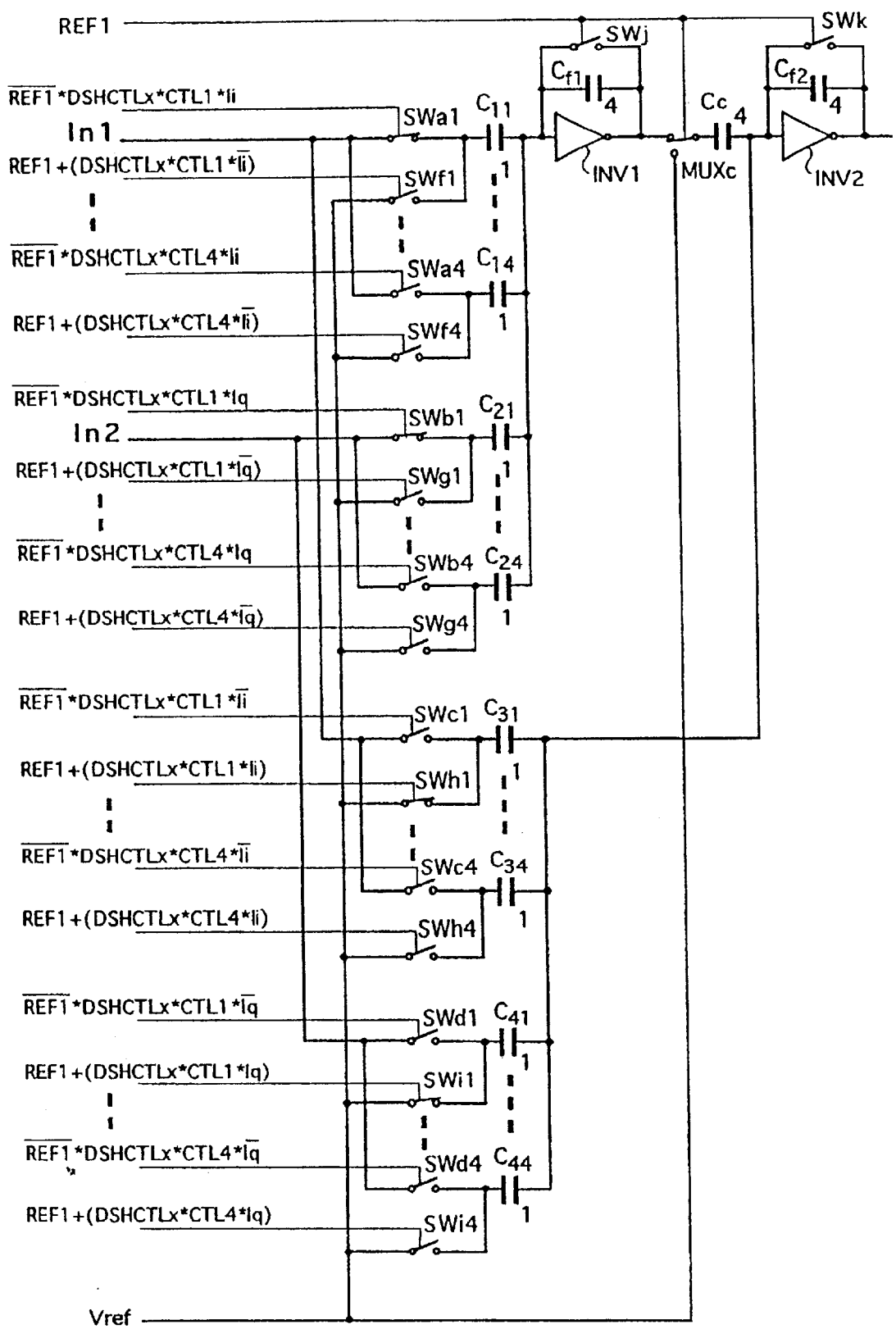
FIG. 8 shows the circuit configuration of the adders contained in the phase error calculation block of the embodiment of the signal reception apparatus according to the present invention.

FIG. 8 shows an example of the actual configuration of each of the adders 55 and 56 in each of the phase error calculation blocks 31 through 34. In FIG. 8, INV1 and INV2 denote the afore-mentioned inversion amplifiers. The first inversion amplifier INV1 and the second inversion amplifier INV2 are serially connected, forming the addition-subtraction circuit shown in FIG. 4c. The input capacitors $C_{11}$ through $C_{14}$ and $C_{21}$ through $C_{24}$ are connected to the input side of the first inversion amplifier INV1. The input capacitors $C_{31}$ through $C_{34}$ and $C_{41}$ through $C_{44}$ are connected to the input side of the second inversion amplifier INV2.

$Cf_1$ denotes the feedback capacitor of the first inversion amplifier INV1. $Cf_2$ denotes the feedback capacitor of the second inversion amplifier INV2. The coupling capacitor Cc is connected to the output side of the first inversion amplifier INV1 and to the input side of the second inversion amplifier INV2. The capacitance of these capacitors satisfy the following relations.

$$Cc=Cf_1=Cf_2=4C_{11}\ldots=4C_{14}=4C_{21}=\ldots=4C_{24}=4C_{31}=\ldots 4C_{44} \quad (20)$$

The refreshing switches SWj and SWk are connected in parallel with the feedback capacitors $Cf_1$ and $Cf_2$, respectively. The multiplexer MUXc selects the output side of the first inversion amplifier INV1 or the reference voltage Vref, and connects the input side of the coupling capacitor Cc to the output side of the first inversion amplifier INV1 or the reference voltage Vref. The refreshing signal REF1 that is supplied to the switches SWj and SWk and the multiplexer MUXc controls the refreshment operation of each of the phase error calculation blocks 31 through 34. Here, Vref=Vb.

The first signal input terminal In1 and the second signal input terminal In2 receive the outputs of the complex-type matched filter 10. If the phase error calculation block shown in FIG. 8 is an I-component adder, the I-component of the baseband received signal of the corresponding path (Pi+Vb) with respect to Vb is supplied to the first signal input terminal In1, and the Q-component (Pq+Vb) with respect to Vb of the base band received signal of the corresponding path is supplied to the second signal input terminal In2. On the other hand, if the phase error calculation block shown in FIG. 8 is a Q-component adder, the Q-component (Pq+Vb) with respect to Vb of the base band received signal of the corresponding path is supplied to the first signal input terminal In1, and the I-component (Pi+Vb) with respect to Vb of the base band received signal of the corresponding path is supplied to the second signal input terminal In2.

As shown in FIG. 8, the input switches SWak and SWfk are connected to the input capacitor $C_{1k}$, where k=1, 2, 3, 4, and the other end of the input switch SWak is connected to the first signal input terminal In1, and the other end of the input switch SWfk is connected to the reference voltage Vref. The other ends of the input capacitor $C_{1k}$, where k=1, 2, 3, 4, are connected to the input side of the first inversion amplifier INV1. Similarly, the input switches SWbk and SWgk are connected to the input capacitor $C_{2k}$, where k=1, 2, 3, 4, the other end of the input switch SWbk is connected to the second signal input terminal In2, and the other end of the input switch SWgk is connected to the reference voltage Vref. The other ends of the input capacitor $C_{2k}$, where k=1, 2, 3, 4, are connected to the input side of the first inversion amplifier INV1. The input switches SWck and SWhk are connected to the input capacitor $C_{3k}$, where k=1, 2, 3, 4, and the other end of the input switch Stack is connected to the first signal input terminal In1, and the other end of the input switch SWhk is connected to the reference voltage Vref. The other ends of the input capacitor $C_{3k}$, where k=1, 2, 3, 4, are connected to the input side of the second inversion amplifier INV2. The input switches SWdk and SWik are connected to the input capacitor $C_{4k}$, where k=1, 2, 3, 4, and the other end of the input switch SWdk is connected to the second signal input terminal In2, and the other end of the input switch SWik is connected to the reference voltage Vref. The other ends of the input capacitor $C_{4k}$, where k=1, 2, 3, 4, are connected to the input side of the second inversion amplifier INV2.

The control signal (inverted REF1)*DSHCTLx*CTL1*Ii is supplied to the switch SWa1. The control signal REF1+DSHCTLx*CTL1*(inverted Ii)) is supplied to the switch SWf1. Here, REF1 is a refreshing signal for refreshing this phase error calculation block. DSHCTLx (x=1 through 4) is a sampling signal that corresponds to the path x that is output from the path selection block 12. CTL1 is a control signal that corresponds to the first pilot symbol shown in FIG. 7c. Ii is the I-component of the corresponding transmission signal vector that is sequentially output from the pilot symbol storage register 39 shown in FIG. 2 in response to the reception timing of each pilot symbol. In FIG. 6, Ii and Iq assume a value of +1 or −1. However, here, Ii and Iq assume a logic value of 1 or 0. The logic value 1 here corresponds to +1 in FIG. 6, and the logic value 0 here corresponds to −1 in FIG. 6.

Similarly, corresponding control signals are supplied to the switches SWa2 through SWa4, and SWf2 through SWf4. Thus, for each k=1, 2, 3, 4, the control signal (inverted REF1)*DSHCTLx*CTLk*Ii is supplied to the switches SWak, and the control signal REF1+DSHCTLx*CTLk* (inverted Ii) is supplied to the switches SWfk.

Thus, during the normal operation mode in which the refreshing signal REF1 is 0 low level, the sampling signal DSHCTLx x=1, 2, 3, 4 that corresponds to the path x determines the reception timing of path x (x=1, 2, 3, 4). Then, for each k=1, 2, 3, 4, the switch SWak or SWfk for the input capacitor $C_{1k}$, which is connected to the input side of the first inversion amplifier INV1, is turned on at the timing determined by the control signal CTLk, and the signal consisting of the k-th pilot symbol of the pilot symbol block is supplied to the input capacitor $C_{1k}$.

If the transmission data Ii that corresponds to the pilot symbol is 1, the switch SWak (k=1, 2, 3, 4) that corresponds to the timing at which the signal consisting of the pilot symbol is received is turned on. As a result, the input signal is supplied from the first input signal terminal In1 to the input side of the first inversion amplifier INV1 via the input capacitor $C_{1k}$(k=1, 2, 3, 4). On the other hand, if the transmission data Ii that corresponds to the pilot symbol is 0, the switch SWfk (k=1, 2, 3, 4) that corresponds to the timing at which the signal consisting of the pilot symbol is received is turned on. As a result, the reference voltage Vref is supplied to the input side of the first inversion amplifier INV1 via the input capacitor $C_{1k}$ (k=1, 2, 3, 4).

During the refreshing operation mode in which the refreshing signal REF1 is 1 (high level), all the switches SWf1 through SWf4 are turned on, and the reference voltage Vref is supplied to the input capacitors $C_{11}$ through $C_{14}$ (the first input capacitor group).

For each k=1, 2, 3, 4, the control signal (inverted REF1) *DSHCTLx*CTLk*Iq is supplied to the switch SWbk that is connected to the input capacitor $C_{2k}$ that is connected to the input side of the first inversion amplifier INV1, where the input capacitors ($C_{2k}$: k=1, 2, 3, 4} form the second input capacitor group. Similarly, the control signal REF1+ (DSHCTLx*CTLk*(inverted Iq)) is supplied to the switch SWgk, k=1, 2, 3, 4.

As in the above-explained case, during the normal operation mode, if the Q-component Iq of the transmission data that corresponds to the pilot symbol is 1, the input voltage of the second input terminal IN2 is supplied to the input capacitor $C_{2k}$, where k=1, 2, 3, 4, via the switch SWbk that corresponds to the reception timing of the pilot symbol. On the other hand, if the Q-component Iq of the transmission data that corresponds to the pilot symbol is 0., the reference voltage Vref is supplied to the input capacitor $C_{2k}$, where k=1, 2, 3, 4, via the switch SWgk that corresponds to the reception timing of the pilot symbol.

The third capacitor group ($C_{3k}$: k=1, 2, 3, 4} and the fourth capacitor group ($C_{4k}$: k=1, 2, 3, 4} are connected to the input side of the second inversion amplifier INV2. Each of the input capacitors in the third and fourth capacitor groups has two switches.

For each k=1, 2, 3, 4, the control signal (inverted REF1) *DSHCTLx*CTLk*(inverted Ii) is supplied to the switch SWck of the third input capacitor group that is connected to the first signal input terminal IN1. For each k=1, 2, 3, 4, the control signal REF1+(DSHCTLx*CTLk*Ii) is supplied to the switch SWhk of the third input capacitor group that is connected to the reference voltage Vref.

Therefore, during the normal operation mode in which the refreshing signal REF1 is 0 (low level), if the I-component Ii of the transmission data that corresponds to the pilot symbol of the path is 0 (low level), the corresponding received signal is supplied from the first signal input terminal In1 to the third capacitor group {$C_{3k}$: k=1, 2, 3, 4} that is connected to the input side of the second inversion amplifier INV2. If the I-component Ii of the transmission data is 1 (high level), the reference voltage Vref is supplied to the third capacitor group {$C_{3k}$: k=1, 2, 3, 4}. During the refreshing operation mode in which the refreshing signal REF1 is 1 (high level), the reference voltage Vref is supplied to the third capacitor group {$C_{3k}$: k=1, 2, 3, 4}.

For each k=1, 2, 3, 4, the control signal (inverted REF1) *DSHCTLx*CTLk*(inverted Iq) is supplied to the switch SWdk of the fourth input capacitor group {$C_{4k}$: k=1, 2, 3, 4} that is connected to the input side of the second signal input terminal IN2, for each k=1, 2, 3, 4. The control signal REF1+(DSHCTLx*CTLk*Iq)) is supplied to the switch SWik, which is connected to the reference voltage Vref, for each k=1, 2, 3, 4, of the fourth input capacitor group.

During the normal operation mode, if the Q-component Iq of the transmission data that corresponds to the pilot symbol of the path is 0 (low level), for each k=1, 2, 3, 4, the input signal voltage of the second signal input terminal is supplied to the fourth input capacitor group {$C_{4k}$: k=1, 2, 3, 4} that is connected to the input side of the second signal input terminal In2. If the Q-component Iq is 1 (high level), the reference voltage Vref is supplied to the fourth capacitor group. During the refreshing operation mode in which the refreshing signal REF1 is 1 (high level), the reference voltage Vref is supplied to the fourth capacitor group.

As has been shown in equation (1), the quadrature component (Q-component) of the error vector is expressed by Pq·Ii−Pi·Iq. Since the second term of this expression has a negative sign, if the adder under discussion serves for the Q-side, the polarity of the Q-component Iq of the transmission data of the symbol that is supplied from the pilot symbol storage register 39 is inverted, that is, the Q-component Iq becomes inverted Iq, and the inverted Iq serves as a control signal for this adder.

[2.2.1.1 Normal Mode Operation]

The normal mode operation during which the refreshing signal REF1 is 0 (low level) will now be explained. As has been explained before with reference to FIG. 6, the phase error calculation block shown in FIG. 8 is used either as a block for calculating the I-components of the phase errors, in which case the phase error calculation block is comprised of the multipliers 51 and 54 and the adder 55, or as a block for calculating the Q-components of the phase errors, in which case the phase error calculation block is comprised of the multiplier 52 and 53 and the adder 56.

If the phase error calculation block shown in FIG. 8 is used as a block for calculating the I-components of the phase errors, the phase error calculation block calculates the I-components of the received signals of four pilot symbols contained in a given pilot symbol block, that is, the real part Pi·Ii+Pq·Iq of equation (1), and calculates the average of the I-components of the phase errors of the four pilot symbols contained in the pilot symbol block, that is, the real part of equation (2).

On the other hand, if the phase error calculation block shown in FIG. 8 is used as a block for calculating the Q-components of the phase errors, the phase error calculation block calculates the Q-component of the received signal of the given pilot symbol, that is, the imaginary part Pq·Ii−Pi·Iq of equation (1), and calculates the average of the Q-components of the phase errors of the four pilot symbols contained in the pilot symbol block, that is, the imaginary part of equation (2).

[2.2.1.1a When the Phase Error Calculation Block Calculates the I-Components of the Phase Errors]

First, the case in which the phase error calculation block shown in FIG. 8 is used as a block for calculating the I-components of the phase errors will be explained. The control signal DSHCTLx (x=1 through 4: x is the path number) is supplied from the multi-path selector 12 shown in FIG. 1 when the de-spread signal that corresponds to the respective path is output from the complex-type matched filter 10. The control signals DSHCTL1 through DSHCTL4 are supplied to the phase error calculation blocks 31 through 34 shown in FIG. 2, respectively.

As shown in FIG. 7c, the control signal CTLk (k=1 through 4: k is the pilot symbol number) is generated in synchronization with the corresponding pilot symbol contained in each slot.

If the control signal DSHCTLx, which determines the path that corresponds to the phase error calculation block, is 0, all the switches SWak, SWfk, SWbk, SWgk, SWck, SWhk, SWdk, and SWik, where k=1, 2, 3, 4, are turned off, and no signal voltage is supplied to any of the input capacitor groups. Similarly, if the control signal CTLk that is output while the signal of the pilot symbol is being received is 0, all the switches are turned off, and no signal voltage is supplied to any of the input capacitor groups. The voltage that is obtained in each of the output terminals of the inversion amplifier INV1 and INV2 immediately before the switch is turned off is held after the switch has been turned off.

When the signal of the pilot symbol is received and the control signal CTLk (k=1 through 4) has become 1 (high level), if the time has come for the complex-type matched filter 10 to output the de-spread signal of the corresponding path, and if the control signal DSHCTLx has become 1 (high level), each of the switches are controlled in the following manner in response to the value of the transmission data (Ii and Iq) that are output from the pilot symbol storage register 39. First, the operation in the case in which the control signal CTL1 is 1 (high level) and the control signals CTL2 through CTL4 are 0 (low level) will be explained.

(IF Ii=1 AND Iq=1)

If the I-component and the Q-component of the transmission data of the first pilot symbol in the slot are both 1 (high level), the switches SWa1, SWh1, SWb1, and SWi1 are turned on, and the switches SWc1, SWf1, SWd1, and SWg1, SWa2 through SWa4, SWc2 through SWc4, SWf2 through SWf4, SWb2 through SWb4, SWd2 through SWd4, SWg2 through SWg4, and SWi2 through SWi4 are turned off.

Therefore, this state corresponds to the switch configuration shown in FIG. 8. The I-component (Pi+Vb) containing Vb of the de-spread output of the received signal of the path is supplied from the first signal input terminal In1 to the first inversion amplifier INV1 via the input capacitor $C_{11}$. At the same time, the Q-component (Pq+Vb) containing Vb of the de-spread output of the received signal of the path is supplied from the second signal input terminal In2 to the first inversion amplifier INV1 via the input capacitor $C_{21}$. Also at the same time, the reference voltage Vref is supplied to the second inversion amplifier INV2 via the input capacitors $C_{31}$ and $C_{41}$. Hence, equation (18) that has been explained with reference to FIG. 7, yields the following equation (21).

$$Vouti(11)-Vb=(Pi+Pq)/4 \quad (21)$$

This output (Vouti(11)−Vb) equals ¼ of the real part of equation (1) when Ii=1 and Iq=1.

(IF Ii=1 AND Iq=0)

If the I-component and the Q-component of the transmission data of the first pilot symbol in the slot are 1 (high level) and 0 (low level), respectively, the switches SWa1, SWh1, SWd1, and SWg1 are turned on, and the switches SWc1, SWfi, SWb1, SWi1, SWa2 through SWa4, SWc2 through SWc4, SWf2 through SWf4, SWb2 through SWb4, SWd2 through SWd4, SWg2 through SWg4, and SWi2 through SWi4 are turned off.

Therefore, the I-component (Pi+Vb) containing Vb of the de-spread output of the received signal of the path is supplied from the first signal input terminal In1 to the first inversion amplifier INV1 via the input capacitor $C_{11}$. At the same time, the reference voltage Vref is supplied to the first inversion amplifier INV1 via the input capacitors $C_{21}$. At the same time, the Q-component (Pq+Vb) containing Vb of the de-spread output of the received signal of the path is supplied to the second inversion amplifier INV2 via the input capacitor $C_{41}$. Also at the same time, the reference voltage Vref is supplied to the second inversion amplifier INV2 via the input capacitors $C_{31}$. Thus, the output shown by the following equation (22) is obtained.

$$Vouti(10)-Vb=(Pi-Pq)/4 \quad (22)$$

This output (Vouti(10)−Vb) equals ¼ of the real part of equation (1) when Ii=1 and Iq=−1.

Similarly, if Ii=0, and Iq=1, the output shown by the following equation (23) is obtained. If Ii=0, and Iq=0, the output shown by the following equation (24) is obtained.

$$Vouti(O1)-Vb=(-Pi+Pq)/4 \quad (23)$$

$$Vouti(00)-Vb=(-Pi-Pq)/4 \quad (24)$$

In this way, when the control signal CTL1 is at a high level, the block for calculating the I-components of the phase errors outputs ¼ of the product of the received signal consisting of the first pilot symbol of the slot and the complex conjugate of the corresponding transmission data.

When the second pilot symbol of the path is received and the control signal CTL2 has become 1, the control signals CTL1; CTL3, and CTL4 have become 0, the switches SWa2 through-SWi2 are turned on in response to the value of the transmission data of the second pilot symbol. Subsequently, the second inversion amplifier INV2 outputs ¼ of the sum of the I-component of the phase error that has been calculated from the first pilot symbol and the I-component of the phase error that has been calculated from the second pilot symbol.

Similarly, when the third pilot symbol of the path is received, the control signal CTL3 becomes 1, and the switches SWa3 through SWi3 that correspond to the transmission data are turned on. As a result, as has been explained with reference to FIG. 7, ¼ the sum of the I-components of the phase errors that have been calculated from the received signals of the first through third pilot symbols is obtained.

When the fourth pilot symbol of the path is received, the control signal CTL4 becomes 1, and the switches SWa4 through SWi4 that correspond to the transmission data are turned on. As a result, the average of the I-components of the phase errors that have been calculated from the received signals of the first through fourth pilot symbols, that is, the pilot symbol block contained in the slot, is output. In this way, the phase error calculation block outputs the average of the I-components of the phase errors that have been calculated from the received signals of the first through fourth pilot symbols contained in the slot, that is, the real part of equation (2).

[2.2.1.1b When the Phase Error Calculation Block Calculates the Q-Components of the Phase Errors]

In the case in which the phase error calculation block calculates the Q-components of the phase errors, Pq+Vb is supplied to the first input signal terminal Ini, and Pi+Vb is supplied to the second input signal terminal In2.

When the control signal CTL1 is 1 and the control signals CTL2 through CTL4 are 0, if the I-component Ii of the transmission data of the first pilot symbol of the path is 1, and the Q-component Iq is 1 (inverted Iq=0), and the control signals CTL2 through CTL4 are 0, then the switches SWa1, SWh1, SWd1, and SWg1 are turned on, and the switches SWc1, SWf1, SWb1, SWi1, SWa2 through SWa4, SWc2 through SWc4, SWf2 through SWf4, SWb2 through SWb4, SWd2 through SWd4, SWg2 through SWg4, and SWi2 through SWi4 are turned off.

Thus, the Q-component (Pq+Vb) containing Vb of the de-spread output of the received signal of the path is supplied from the first signal input terminal In1 to the first inversion amplifier INV1 via the input capacitor $C_{11}$. At the same time, the reference voltage Vref is supplied to the first inversion amplifier INV1 via the input capacitor $C_{21}$. Also at the same time, the reference voltage Vref is supplied to the second inversion amplifier INV2 via the input capacitors $C_{31}$. Still, at the same time, the I-component (Pi+Vb) containing Vb of the de-spread output of the received signal of the path is supplied from the second signal input terminal In2 to the second inversion amplifier INV2 via the input capacitor $C_{41}$.

Thus, in the same way as in the afore-explained cases, the second inversion amplifier INV2 outputs the output voltage (Voutq(11)−Vb) shown by the following equation (25).

$$Voutq(11)-Vb=(Pq-Pi)/4 \qquad (25)$$

This output is equal to ¼ the imaginary part of the phase error shown in equation (1) in the case in which Ii=1 and Iq=1.

Similarly, when Ii=1, and Iq=0, the output shown by the following equation (26) is obtained. When Ii=0, and Iq=1, the output shown by the following equation (27) is obtained. When Ii=0, and Iq=0, the output shown by the following equation (28) is obtained.

$$Voutq(10)-Vb=(Pq+Pi)/4 \qquad (26)$$

$$Voutq(O1)-Vb=(-Pq-Pi)/4 \qquad (27)$$

$$Voutq(00)-Vb=(-Pq+Pi)/4 \qquad (28)$$

In this way, when the control signal CTL1 is 1, ¼ the Q-component of the phase error that has been calculated from the first pilot symbol is output.

As the control signals CTL2, CTL3, and CTL4 become 1, sequentially, the Q-component of the phase error contained in the received signal consisting of the corresponding pilot symbol is calculated. After the control signal CTL4 has become 1, the average of these Q-components is output from the second inversion amplifier INV2.

Thus, as has been shown in FIG. 6b, after the control signal CTL4 has become 1, the phase error calculation block outputs the average of the I-components or Q-components of the phase errors with respect to Vb that has been calculated from the pilot symbols contained in the slot.

[2.2.1.2 Refreshing Operation]

When the refreshing signal REF1 that controls the refreshing operation of this adder is 1 (high level), the switches SWak and Stack (k=1 through 4; k is the pilot symbol number) are turned off, and the switches SWfk and SWhk (k=1 through 4) are turned on. As a result, the reference voltage Vref is supplied to the input sides of the input capacitors $C_{11}$ through $C_{14}$, and $C_{31}$ through $C_{34}$. At the same time, the switches SWbk and SWdk (k=1 through 4) are turned off, and the switches SWgk and SWik (k=1 through 4) are turned on. As a result, the reference voltage Vref is supplied to the input sides of the input capacitors $C_{21}$ through $C_{24}$, and $C_{41}$ through $C_{44}$.

In addition, the switches SWj and SWk (this k is not a dummy variable that ranges from 1 to 4) that are connected in parallel to the feedback capacitors $Cf_1$, and $Cf_2$, respectively, are turned on. As a result, the multiplexer MUXc is connected to the Vref side. In this way, the residue electric charge in each capacitor is eliminated, and this adder is refreshed, enabling this phase error calculation block to operate with a high degree of accuracy.

The timing at which this phase error calculation block is to be refreshed will be explained in detail later, since it is closely related to the refreshing operation of the phase correction vector generation block to be explained later.

[2.3 Phase Correction Vector Generation Block 35 Through 38]

Next, the structure of the (identically structured) phase correction vector generation blocks 35 through 38 will be explained. These phase correction vector generation blocks 35 through 38 are installed in correspondence with the selected paths. When the phase error calculation blocks 31 through 34 calculate the I-components and Q-components of the received signals consisting of the phase errors of the pilot symbols contained in the pilot symbol block, and supply the (I-components and Q-components to the phase correction vector generation blocks 35 through 38, respectively, each of the phase correction vector generation blocks 35 through 38 calculates the correction vector M shown by equation (5) through (7).

Figure 9A:
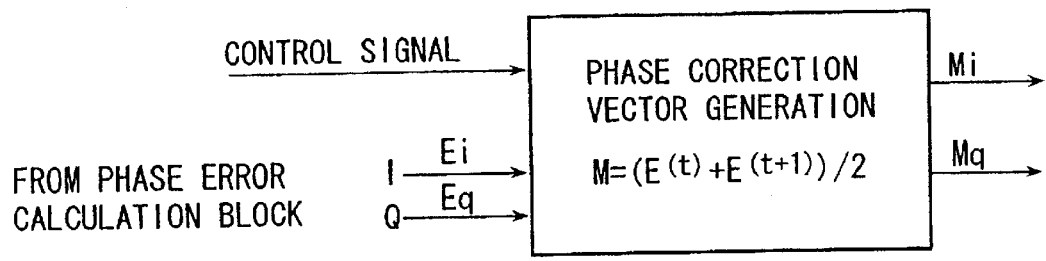
FIGS. 9a and 9b show the configuration of the phase correction vector generation block of the embodiment of the signal reception apparatus according to the present invention.
Figure 9B:
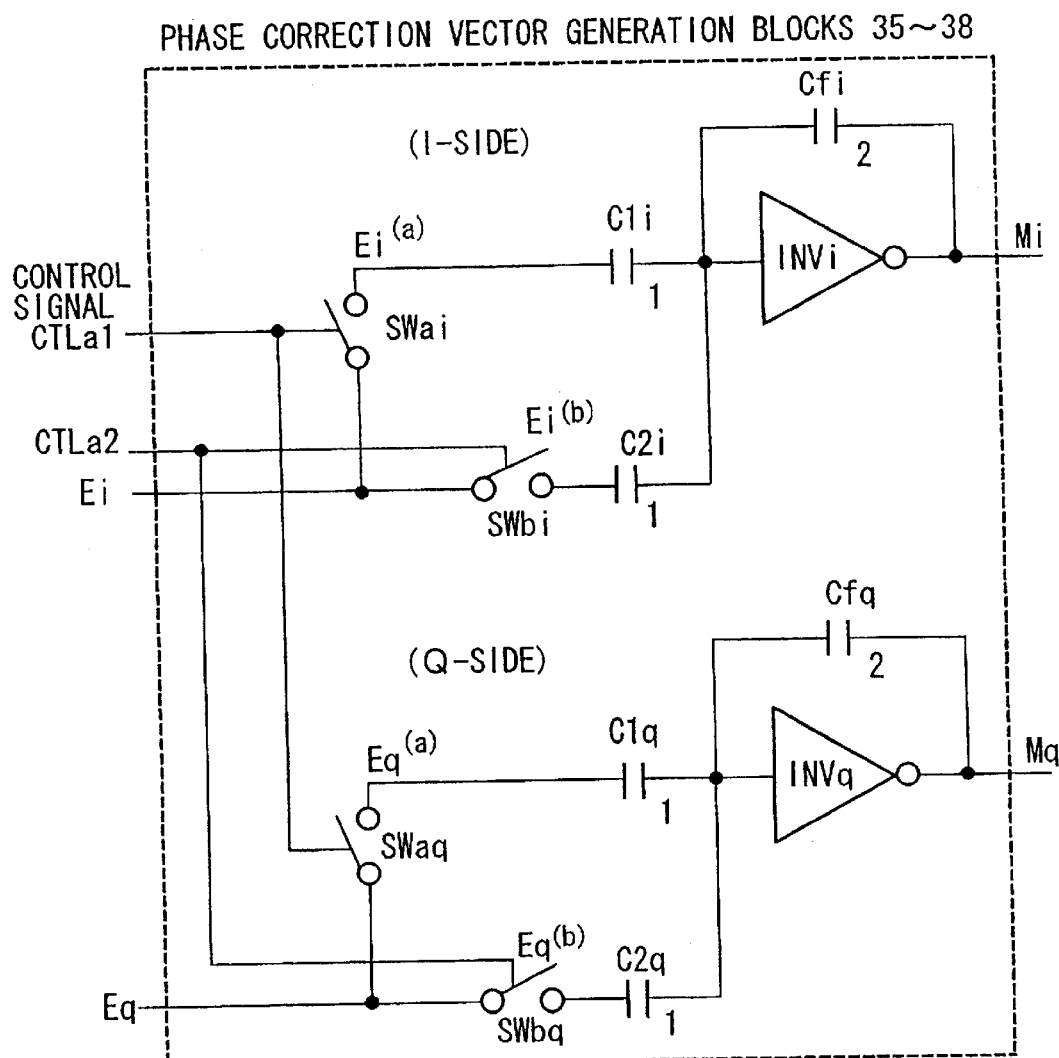

FIGS. 9a and 9b show the configuration of each of the identically structured phase correction vector generation blocks 35 through 38. FIG. 9a shows the input and output signals of each of the phase correction vector generation blocks 35 through 38. FIG. 9b shows the internal structure of each of the phase correction vector generation blocks 35 through 38. As shown in FIG. 9a, the phase correction vector generation blocks 35 through 38 receive the average Ei of the I-component phase errors and the average Eq of the Q-component phase errors from the corresponding phase error calculation blocks 31 through 34, respectively, for each slot. When each of the phase correction vector generation blocks 35 through 38 receives a control signal, each of the phase correction vector generation blocks 35 through 38 generates the I-component Mi and Q-component Mq of the correction vector M for the corresponding path as given by equations (5) through (7).

As shown in FIG. 9b, each of the phase correction vector generation blocks 35 through 38 is comprised of an I-component block for calculating the I-component Mi of the phase correction vector M and a Q-component block for calculating the Q-component Mq of the phase correction vector M. The I-component block is comprised of the switches SWai and SWbi, the first input capacitor C1i, the second input capacitor C2i, the inversion amplifier INVi, and the feedback capacitor Cfi. The switch SWai is installed between the input terminal for the I-component Ei of the phase error and the first input capacitor C1i. The switch SWbi is installed between the input terminal for Ei and the second input capacitor C2i.

The control signals CTLa1 and CTLa2 control the switches SWai and SWbi, respectively. The capacitance ratio among the feedback capacitor Cfi, the first input capacitor C1i, and the second input capacitor C2i are given by the relation Cfi=2C1i=2C2i.

The Q-component block for calculating the Q-component-Mq is structured in the same manner as the I-component block, and is connected to the input terminal Eq for the Q-component phase error output of the corresponding phase error calculation block. That is, the Q-component block is comprised of the switches SWaq and SWbq, the first input capacitor C1q, the second input capacitor C2q, the inversion amplifier INVq, and the feedback capacitor Cfq. The control signals CTLa1 and CTLa2 control the switches SWaq and SWbq, respectively.

FIGS. 10a through 10d show the operation of each of the phase correction vector generation blocks 35 through 38. FIG. 10a is a timing chart showing the timings of the control signals CTLa1 and CTLa2. FIGS. 10a through 10d show the successive stages of the operation of each of the phase correction vector generation blocks 35 through 38.

As shown in FIG. 10a, the control signals CTLa1 and CTLa2 are supplied alternately, one each for every two slots in synchronization with the last (fourth) pilot symbol of the pilot symbol block. The signals indicated in the drawing by the broken lines will be explained later. If the control signal CTLa1 is supplied to the first slot, the control signal CTLa2 is supplied to the second slot, and the control signal CTLa1 is supplied to the third slot. The control signal generator 41 shown in FIG. 2 generates the control signals CTLa1 and CTLa2 based on the frame synchronization signal, the slot synchronization signal, the symbol synchronization signal and the like.

FIG. 10b shows the state of each of the phase correction vector generation blocks 35 through 38 when the interval of the last pilot symbol in a given slot has ended. If the control signal CTLa1 is at a high level at this point in time, as shown in the diagram, the switches SWai and SWaq are turned on. Subsequently, the I-component ($Ei^{(1)}$+Vb) of the average of the phase error vector containing Vb that has been output from the corresponding phase error calculation block is supplied to the inversion amplifier INVi via the first input capacitor C1i. As in the case of the afore-mentioned FIG. 7a, the inversion amplifier INVi outputs the voltage $Ei^{(1)}/2$+Vb.

Similarly, the Q-component ($Eq^{(1)}$+Vb) of the average of the phase error vector containing Vb that has been output from the corresponding phase error calculation block is supplied to the inversion amplifier INVq via the first input capacitor C1q. Then the inversion amplifier INVq outputs the voltage $Eq^{(1)}/2$+Vb.

At the beginning of the interval corresponding to the first through 36th information symbols, the control signals CTLa1 and CTLa2 become low level signals. Thus, as shown in FIG. 10c, all of the four switches are turned off. At this stage, each of the input capacitors retains its electric charge.

When the interval corresponding to the last pilot symbol block of the second slot ends, the control signal CTLa2 becomes a high level signal. As a result, as shown in FIG. 10 d, the switches SWbi and SWbq are turned on. Then, the I-component ($Ei^{(2)}$+Vb) of the average of the phase error vector containing Vb of the pilot symbol of this slot is supplied to the inversion amplifier INVi via the second input capacitor C2i. At the same time, the Q-component ($Eq^{(2)}$+Vb) of the average of the phase error vector containing Vb of the pilot symbol of this slot is supplied to the inversion amplifier INVq via the second input capacitor C2q. Subsequently, as in the above-explained case, the inversion amplifier INVi outputs the voltage ($Ei^{(1)}$+$Ei^{(2)}$)/2+Vb=Mi+Vb. Similarly, the inversion amplifier INVq outputs the voltage ($Eq^{(1)}$+$Eq^{(2)}$)/2+Vb=Mq+Vb.

When the interval corresponding to the last pilot symbol block of the third slot ends, the control signal CTLa1 becomes a high level signal again. As a result, the switches SWai and SWaq are turned on. Then, the I-component ($Ei^{(3)}$+Vb) of the average of the phase error vector containing Vb of the pilot symbol of this slot is supplied to the inversion amplifier INVi via the input capacitor C1i. At the same time, the Q-component ($Eq^{(3)}$+Vb) of the average of the phase error vector containing Vb of the pilot symbol of this slot is supplied to the inversion amplifier INVq via the input capacitor C1q. Subsequently, the inversion amplifier INVi outputs the voltage ($Ei^{(2)}$+$Ei^{(3)}$)/2+Vb=Mi+Vb. Similarly, the inversion amplifier INVq outputs the voltage ($Eq^{(2)}$+$Eq^{(3)}$)/2+Vb=Mq+Vb. In this way, the phase correction vectors Mi+Vb and Mq+Vb based on Vb as given by equations (5) through (7) are sequentially calculated and generated.

Figure 11:
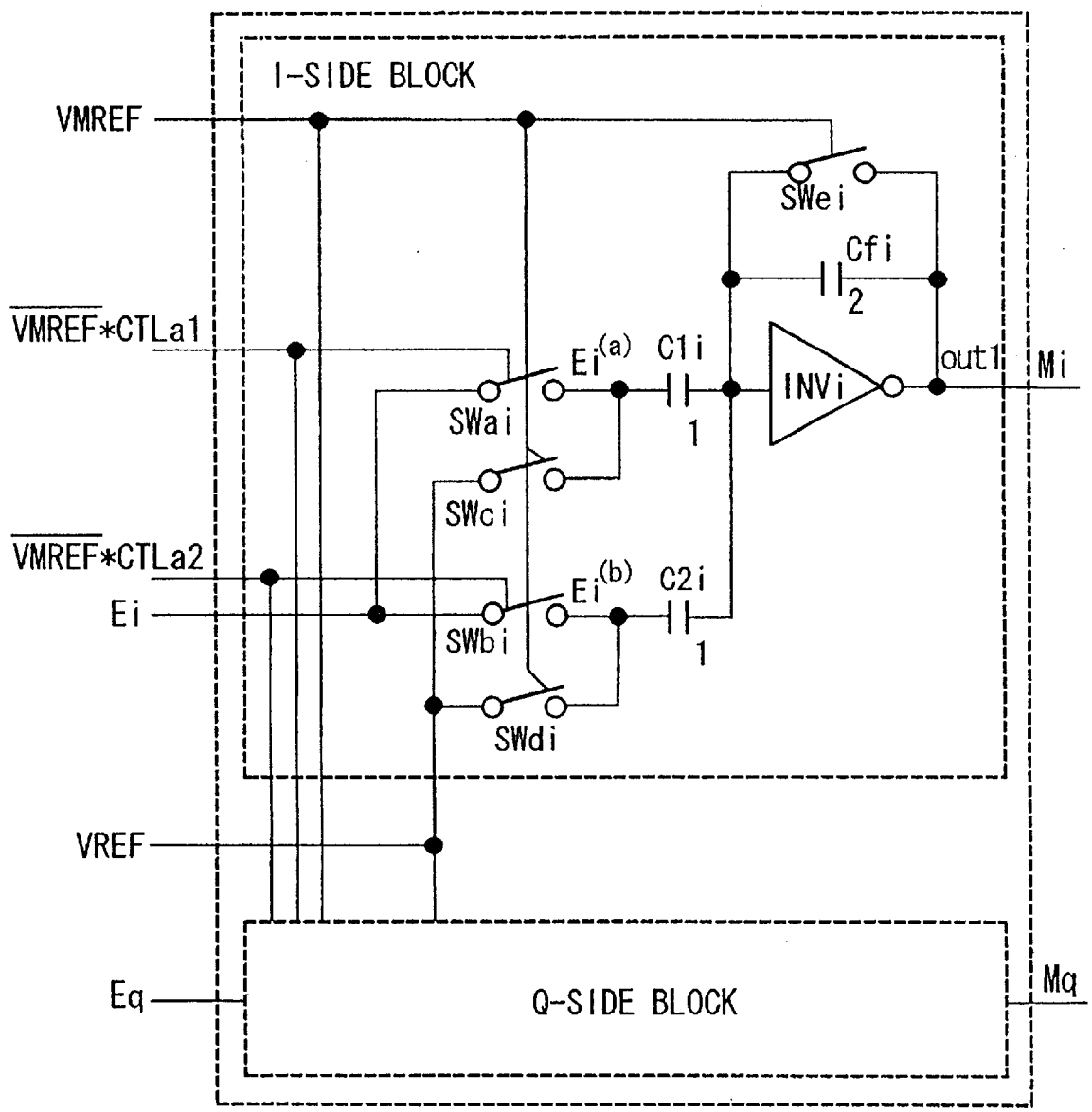
FIG. 11 shows an example of the configuration of the refreshable phase correction vector generation block of the embodiment of the signal reception apparatus according to the present invention.

This phase correction vector generation block also needs to be refreshed in order to operate with a high degree of accuracy. FIG. 11 shows an example of the configuration of a phase correction vector generation block having a refreshing means. In FIG. 11, only the I-component block is shown in detail and the structure of the Q-component block is omitted in order to avoid complexity since the structure of the Q-component block is identical to that of the I-component block. In FIG. 11, the same reference codes used in FIGS. 9a and 9b are used for components identical to those used in FIG. 9b, and such components will not be explained here.

As shown in FIG. 11, the refreshing switches SWci and SWdi that are installed on the input sides of the input capacitors C1i and C2i, respectively, are used to supply the reference voltage Vref to the input capacitors C1i and C2i, respectively. The switch SWei is installed in order to short the feedback capacitor Cfi. The refreshing signal VMREF turns these switches on or off. Thus, when the refreshing signal VMREF is at a high level, the residue electric charge stored in each capacitor can be eliminated as in the afore-explained cases.

[2.4 Timing for Refreshing Operations]

The timing for the refreshing operations of each of the phase error calculation blocks 31 through 34 and each of the phase error correction vector generation blocks 35 through 38 will be explained with reference to the timing chart shown in FIGS. 12a and 12b. FIG. 12a shows the refreshing signal REF1, the received signal of one slot length, and the control signals CTL1 through CTL4. FIG. 12b magnifies and shows the detail of the last (36th) information symbol of the information symbol block.

As shown in FIGS. 12a and 12b, each of the phase error calculation blocks 31 through 34 and each of the phase error correction vector generation blocks 35 through 38 are refreshed in synchronization with the last information symbol of the information symbol block. However, each of the phase error calculation blocks 31 through 34 and each of the phase error correction vector generation blocks 35 through 38 are not refreshed for every slot, but are refreshed periodically for every prescribed time interval (for example, in the frequency interval from 100 to 1000 Hz) in synchronization with the 36th information symbol.

As has been explained before, the de-spread signals, which are output from the complex-type matched filter 10, are sampled by the sample holders 21 through 24 at the times that correspond to the respective paths and are sent to the A/D converter 25. After the A/D converter 25 converts the de-spread analog signals into digital signals, the digitized de-spread signals are sent to the delay RAM 26. The delay RAM 26 stores and delays the digitized de-spread signals for a period that corresponds to 40 symbols, and sends the digitized de-spread signals to the information symbol phase corrector 40. The de-spread output signals consisting of the information symbols of each path, which serve as data, do not change during the interval of one information symbol. The information symbol phase corrector 40 corrects the phases of the information symbols by multiplying the phase correction vectors Mi and Mq, which are output from each of the phase correction vector generation blocks 35 through 38, by the de-spread outputs of the information symbols, which are output from the delay RAM 26. This multiplication is completed within the first half of the time interval that corresponds to one information symbol. Therefore, the phase correction vectors become unnecessary during the last half of the time interval that corresponds to the last (36th) information symbol of the slot. According to the present invention, the phase error calculation blocks 31 through 34 and the phase correction vector generation blocks 35 through 38 are refreshed during the latter half of the time interval that corresponds to the last (36th) information symbol of the slot.

Conventionally, when an analog-type operation circuit is refreshed, another large analog-type operation circuit is used in order to replace the operation of the original operation circuit while the original operation circuit is being refreshed. However, according to the present invention, the structure of the transmission data is used to refresh the phase error calculation blocks 31 through 34 and the phase correction vector generation blocks 35 through 38. Therefore, such a large replacement circuit is not needed. As a result, the circuitry and the amount of electric power consumption can be reduced.

Each of the phase correction vector generation blocks 35 through 38 stores the phase errors that have been calculated from the pilot symbol blocks contained in two consecutive slots, calculates the average of the phase errors, and calculates the phase correction vectors. If each of the phase correction vector generation blocks 35 through 38 performed the conventional refreshing operation, each of the phase correction vector generation blocks 35 through 38 would erase the phase error of the old slot to be used to calculate the next phase error vector. Hence, in order to refresh each of the phase correction vector generation blocks 35 through 38 according to the present invention, the phase error of the old slot needs to be saved. According to the present invention then, the output of each of the phase error calculation blocks 31 through 34 is re-loaded to the corresponding phase correction vector generation block after that phase correction vector generation block has been refreshed.

In FIG. 12b, as has been explained above, the multiplication operation for correcting the phase error of the de-spread signal consisting of the 36th information symbol is performed during the time interval that corresponds to the first half of the 36th information symbol. The refreshing signal VMREF for the respective phase correction vector generation block is at a high level during the time interval indicated by the reference code a in FIG. 12b. The respective phase correction vector generation block is refreshed during this time interval.

The control signals CTLa1 and CTLa2 are simultaneously at a high level during the subsequent time interval indicated by the reference code b in FIG. 12b. The output of the respective phase error calculation block is re-loaded to the corresponding phase correction vector generation block during this time interval. When the control signals CTLa1 and CTLa2 become high level signals simultaneously, the switches SWai and SWbi shown in FIG. 9b and FIG. 11 are turned on. As a result, the phase error output Ei is supplied from the respective phase error calculation block to the input capacitors C1i and C2i. Then the phase error Ei that has been erased by the refreshing operation is re-loaded. Similarly, the phase error output Eq is also re-loaded in the Q-component block.

During the time interval indicated by the reference code c in FIG. 12b, which occurs after the re-loading operation has been completed, the refreshing signal REF1 for the respective phase error calculation block is at a high level. Therefore, the respective phase error calculation block is refreshed. The length of the time interval c when the number N of chips per symbol is 128 differs from that when the number N of chips per symbol is 64.

With reference to FIGS. 13a–13d, the phase correction operation during the 36th information symbol will be explained in further detail. FIG. 13a shows the reception frame, where P1 through P4 denote pilot symbol blocks and D1 through D4 denote information symbol blocks. FIG. 13b shows the phase correction process for the information symbols contained in the information symbol block D1. The phase correction vector generation blocks 35 through 38 generate and output phase correction vectors Mi and Mq corresponding to each path. The phase corrector 40 multiplies the phase correction vectors Mi and Mq, by the de-spread signals of each path, that have been delayed by 40 symbols of each path which the delay RAM 26 outputs. At this stage, the delay RAM 26 is storing the de-spread signals of the information symbol block D1. At the same time, the phase error calculation blocks 31 through 34 are outputting the phase errors that they calculated from the pilot symbol block P2. Under these circumstances, the phase correction operation of the 36th information symbol of the information symbol block D1 is completed at the end of the first half of the 36th symbol.

As has been shown in FIG. 12b, the refreshing signal VMREF for the respective phase correction vector generation block remains at a high level during the time interval a. As shown in FIG. 13c, the phase correction vector generation blocks 35 through 38 are refreshed during the time interval a. As shown in FIG. 12b, after the phase correction vector generation blocks 35 through 38 have been refreshed, the control signals CTLa1 and CTLa2 remain at a high level during the time interval b. During this time interval, the phase error calculation blocks 31 through 34 continue to output the phase error E2 that has been detected from the pilot symbol block P2. As shown in FIG. 13d, the control signals CTLa1 and CTLa2 re-load the phase error E2 to the phase correction vector generation blocks 35 through 38.

The phase error calculation blocks 31 through 34 are refreshed during the time interval c that follows the time interval b shown in FIG. 12b. In this way, the phase error calculation blocks 31 through 34 and the phase correction vector generation blocks 35 through 38 are refreshed.

[2.5 Phase Corrector 40]

Figure 14:
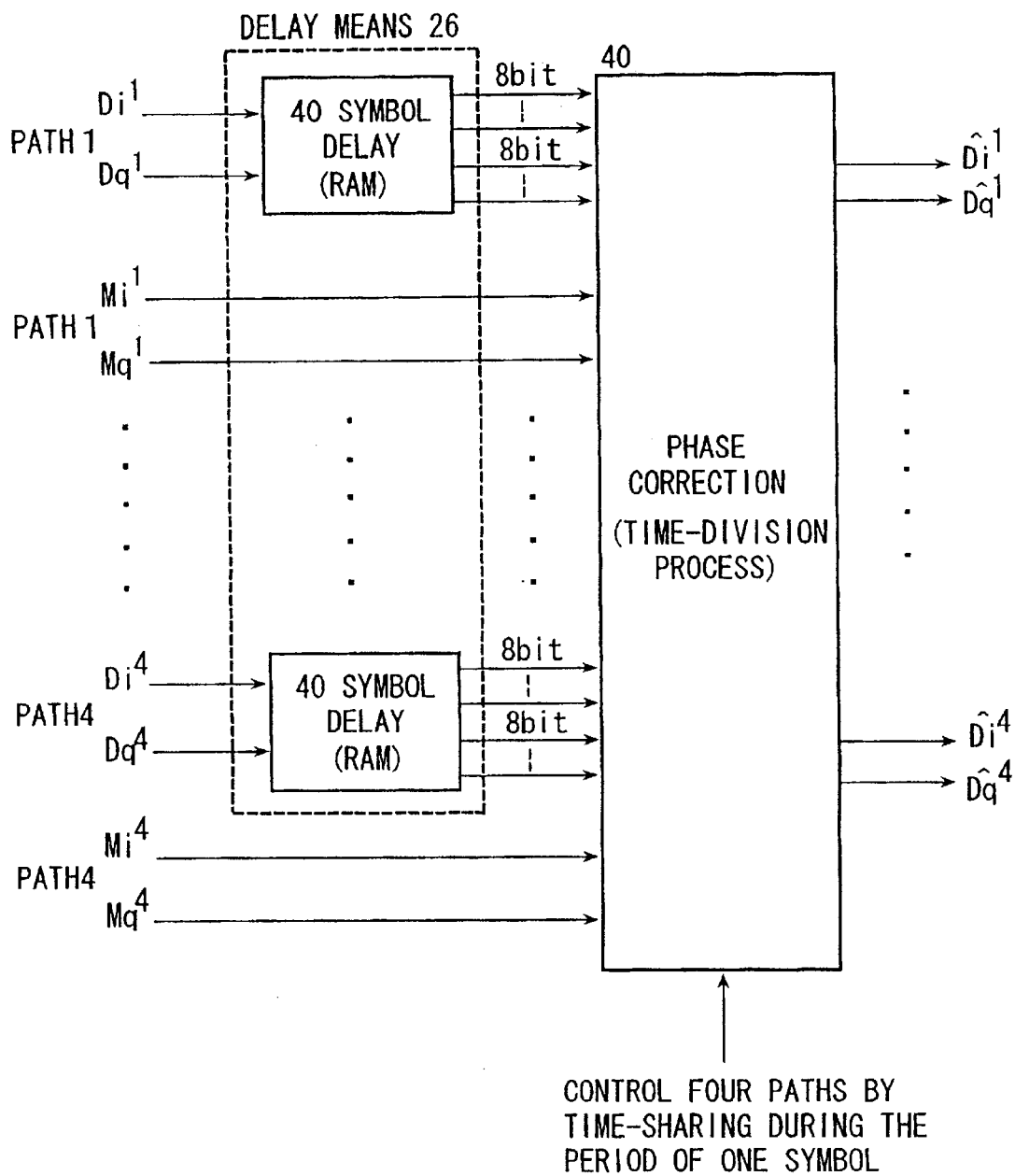
FIG. 14 explains the functions of the phase corrector of the signal reception apparatus according to the present invention.

As has been explained before, the phase corrector 40 performs the phase correction operation shown by equation (8) by multiplying the de-spread received signals Di and Dq of each path by the phase correction vectors Mi and Mq that have been calculated in the afore-explained manner. FIG. 14 shows the performance of this phase corrector 40. As has been explained with reference to FIG. 2, the A/D converter 25 sequentially converts the I-component de-spread signals $Di^1$, $Di^2$, $Di^3$, $Di^4$ and Q-component de-spread signals $Dq^1$, $Dq^2$, $Dq^3$, $Dq^4$, which are sampled and held in the sample holders 21 through 24, into, for example, 8-bit digital signals. Then the digital signals $Di^1$, $Dq^1$, $Di^2$, $Dq^2$, $Di^3$, $Dq^3$, $Di^4$, and $Dq^4$ are stored in the delay RAM 26, and are held for the duration of 40 symbols. Subsequently, the digital signals $Di^1$, $Di^2$, $Di^3$, $Di^4$, $Dq^1$, $Dq^2$, $Dq^3$, and $Dq^4$ are read out sequentially and are sent to the phase corrector 40.

The phase corrector 40 multiplies, by time-sharing the analog correction vector signals $(Mi^1, Mq^1), \ldots, (Mi^4, Mq^4)$, which are output from the phase correction vector generation blocks 35 through 38 that correspond to each path, by the de-spread signals $(D^1, Dq^1), \ldots, (Di^4, Dq^4)$, of each path, for example, of 8-bit length, which have been read out by the delay RAM 26, within the time interval corresponding to one symbol. Then, the phase corrector 40 sequentially outputs the I-components $\text{D-hati}^3$ through $\text{D-hati}^4$ and Q-components $\text{D-hatq}^1$ through $\text{D-hatq}^4$ of the phase corrected analog de-spread signals.

As has been shown in equation (8), (DiMi+DqMq) is the I-component D-hati of the phase-corrected de-spread signal (DiMi+DqMq) is obtained by adding the product of the de-spread signal Di and the phase correction vector Mi to the product of the de-spread signal Dq and the phase correction vector Mq. (DqMi−DiMq) is the Q-component D-hatq of the phase-corrected de-spread signal. (DqMi−DiMq) is obtained by subtracting the product of the de-spread signal Di and the phase correction vector Mq from the product of the de-spread signal Dq and the phase correction vector Mi. In this embodiment, the RAKE combiner 15 performs this addition and subtraction. Therefore, this phase corrector 40 performs only the multiplication of the de-spread signals by the phase correction vectors. As a result, the circuitry of the phase corrector 40 can be reduced. Here, a small number of multipliers are installed in order to carry out the four types of multiplication DiMi, DqMi, DiMq, and DqMq. These four types of multiplication DiMi, DqMq, DiMq, and DqMi, which correspond to the received signals of the four paths, are performed by time-sharing.

Figure 15:
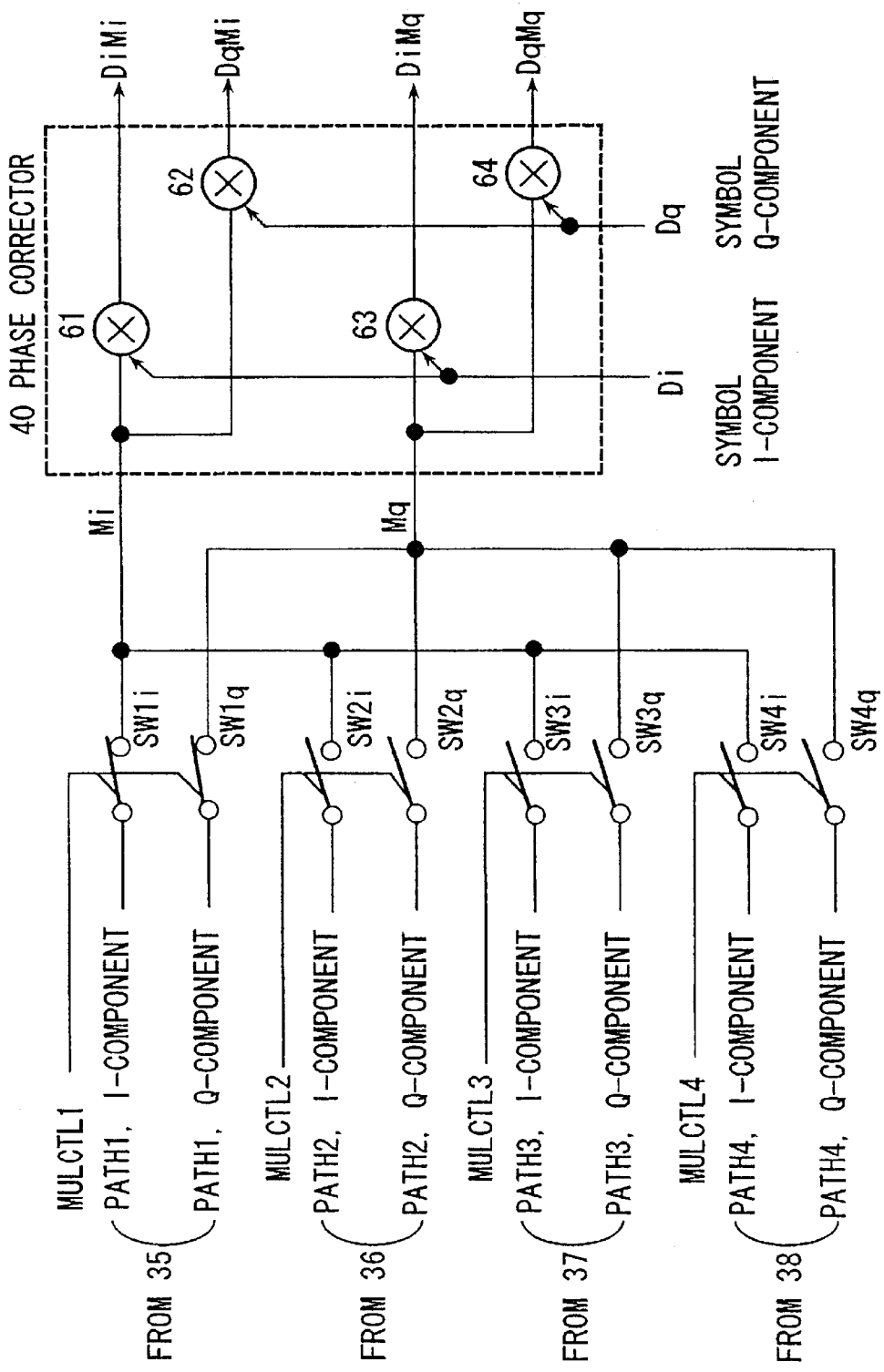
FIG. 15 shows an example of the configuration of the phase corrector of the signal reception apparatus according to the present invention.

FIG. 15 shows the configuration of the phase corrector 40 according to this embodiment. As shown in FIG. 15, the four multipliers 61 through 64 comprise the phase corrector 40. The multiplier 61 multiplies the I-component Mi of the phase correction vector M by the I-component Di of the information symbol. The multiplier 62 multiplies the I-component Mi of the phase correction vector M by the Q-component Dq of the information symbol. The multiplier 63 multiplies the Q-component Mq of the phase correction vector M by the I-component Di of the information symbol. The multiplier 64 multiplies the Q-component Mq of the phase correction vector M by the Q-component Dq of the information symbol. The I-component Di and Q-component Dq of the information symbol are digital data of, for example, 8-bit length. The multipliers 61 through 64, each of which is identical to the multiplier shown in FIG. 4b, multiply the digital data and the analog signals and output the results of the multiplication as analog signals.

The switches SW1i and SW1q are turned on in order to supply the outputs $Mi^1$ and $Mq^1$ of the phase correction vector generation block 35, which corresponds to path 1, to the phase corrector 40. The switches SW2i and SW2q are turned on in order to supply the outputs $Mi^2$ and $Mq^2$ of the phase correction vector generation block 36, which corresponds to path 2, to the phase corrector 40. The switches SW3i and SW3q are turned on in order to supply the outputs $Mi^3$ and $Mq^3$ of the phase correction vector generation block 37, which corresponds to path 3 to the phase corrector 40. The switches SW4i and SW4q are turned on in order to supply the outputs $Mi^4$ and $Mq^4$ of the phase correction vector generation block 38, which corresponds to path 4, to the phase corrector 40. The control signal MULCTLk, for each k=1 through 4, turns on or off the switches SWki and SWkq. When the control signal MULCTLk (k=1 through 4) turns on the switch SWki, the phase corrector 40 reads out the information symbol $Di^k$, which correspond to path k, that is supplied from the delay RAM 26. Similarly, when the control signal MULCTLk (k=1 through 4) turns on the switch SWkq, the phase corrector 40 reads out the information symbol $Dq^k$, which corresponds to path k, that is supplied from the delay RAM 26.

Therefore, during the time interval in which the control signal MULCTL1 is at a high level, the switches SW1i and SW1q are turned on. As a result, the I-component $Mi^1$ of the phase correction vector M that corresponds to path 1 is supplied to the multipliers 61 and 62. At the same time, the Q-component $Mq^1$ of the phase correction vector M that corresponds to path 1 is supplied to the multipliers 63 and 64. Also at the same time, the delay means 26 outputs the received de-spread signals $Di^1$ and $Dq^1$ that correspond to path 1. Then the delay RAM 26 sends the I-component $Di^1$ to the multipliers 61 and 63, and the Q-component $Dq^1$ to the multipliers 62 and 64. In this way, the multiplier 61 multiplies the received signal $Di^1$ of path 1 by $Mi^1$. The multiplier 62 multiplies the received signal $Dq^1$ by $Mi^1$. The multiplier 63 multiplies the received signal $Di^1$ by $Mq^1$. The multiplier 64 multiplies the received signal $Dq^1$ by $Mq^1$. The results of these multiplication operations are supplied to the RAKE combiner 15 shown in FIG. 19 Note: the original document refers to FIG. 23, which is an error. The RAKE combiner 15 samples and holds the results of these multiplication operations.

When the RAKE combiner 15 holds the phase-corrected output signal of path 1, the control signal MULCTL2 becomes a high level signal. As a result, the switches SW2i and SW2q are turned on. Then the phase correction vectors $Mi^2$ and $Mq^2$ of path 2 are supplied from the phase correction vector generation block 36 to the multipliers 61 through 64. In addition the delay RAM 26 outputs the de-spread received signals $Di^2$ and $Dq^2$ of path 2, and supplies $Di^2$ and $Dq^2$ to the multipliers 61 through 64. In this way, the phases of the received signals of path 2 are corrected. The corrected phases of the received signals of path 2 are supplied to the RAKE combiner 15. Then the RAKE combiner 15 samples and holds the corrected phases of the received signals of path 2. Similarly, when the control signal MULCTLk (k=3, 4) becomes a high level signal, the phases of the received signals of path k are corrected, and the phase corrected received signals of path k are supplied to the RAKE combiner 15. Then the RAKE combiner 15 samples and holds the corrected phases of the received signals of path k (k=3, 4). In this way, the phase corrector 40 corrects, by time-sharing the phases of the information symbols of each path during the time interval of one symbol.

[2.5.1 Correction of A/D Conversion Outputs]

As has been explained in the above, the multipliers 61 through 64 multiply the phase correction vectors Mi and Mq, which are supplied as analog signals, by the de-spread received signals Di and Dq, which are supplied as digital signals of, for example, 8-bit length. In this embodiment, the digital-analog multiplier shown in FIG. 4b is used for each of the multipliers 61 through 64. As is clear from the above explanation, this digital-analog multiplier multiplies the absolute value of the digital data by the analog data. It should be noted that the de-spread received signals Di and Dq have a positive or negative sign. Therefore, the signs of the de-spread received signals Di and Dq need to be taken into consideration in this way in using the digital-analog multiplier.

Figures 16, 17:
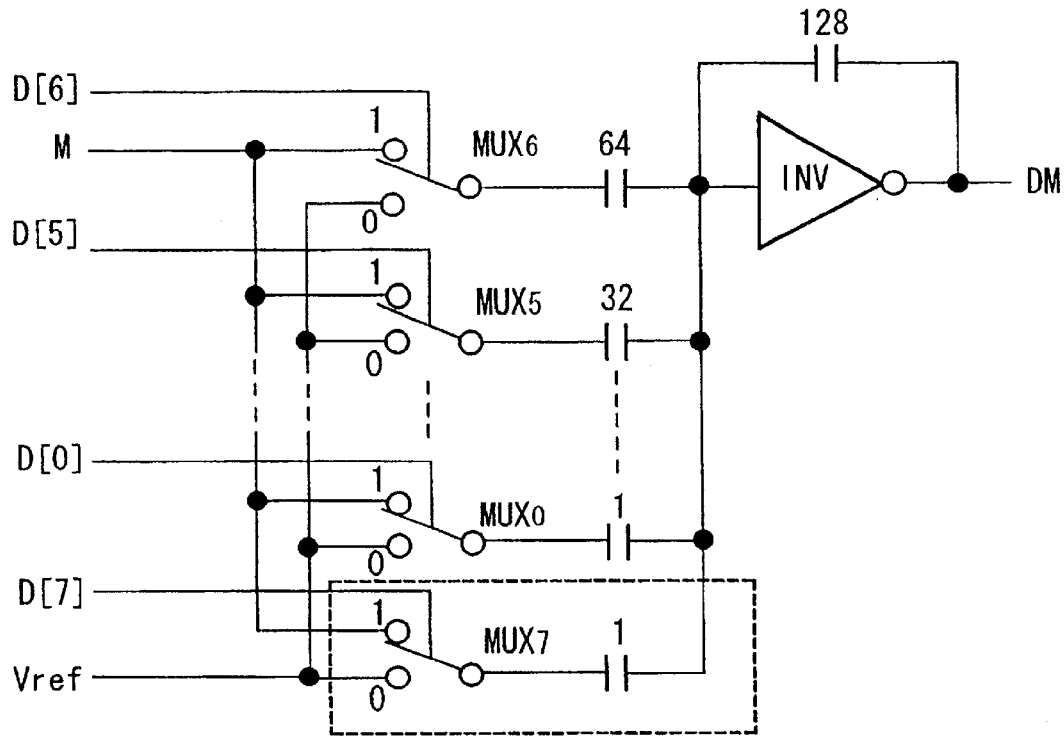
FIG. 16 explains the correction operation for the A/D converted output values.
FIG. 17 shows the configuration of the multiplier for correcting the A/D converted output values.

With reference to FIG. 16, the A/D conversion output process will be explained. In this diagram, in order to simplify the explanation, it is assumed that the input signals can be converted into 3-bit data. However, the input signals may by converted into n-bit data where n is any positive integer. The complex-type matched filter 10 outputs the de-spread received signals Di and Dq, which also indicate the voltage difference between the ground voltage (GND) and the power source voltage (Vdd). The mid-point Vdd/2 between the ground voltage (GND) and the power source voltage (Vdd) is the value assigned to the reference voltage. When the A/D converter 25 receives the de-spread received signal voltages Di and Dq, the A/D converter 25 decomposes the full range (from the ground voltage GND to the power source voltage Vdd) of the input signal (each of Di and Dq) into eight sub-ranges of equal length. In this way, the AID converter 25 converts these de-spread received signal voltages Di and Dq into the 3-bit digital data shown in the column labeled "A/D conversion output" in FIG. 16.

The multipliers 61 through 64 multiply the absolute values of the digital data by the analog signals. Therefore, if the digitized de-spread received signals that are output from the A/D converter 25 have the same magnitude but different signs, the same multiplication result must be produced for both except for the sign. In other words, as shown in the column under the label "Values usable in Multipliers" of FIG. 16, the positive digitized de-spread received signals and the negative digitized de-spread received signals need to be converted into data having the same bit structure, except for their signs.

"The A/D conversion outputs" are converted into "Values usable in Multipliers" as follows. If the digital value is positive, the value usable in multiplier is made by inverting the most significant bit (MSB) of the A/D conversion output from 1 to 0. If the digital value is negative, the value usable in multiplier is made by inverting all the bits from 0 to 1 and then adding 1 to the inverted results.

A digital logic circuit alone could be used to convert "The AID conversion outputs" into "Values usable in Multipliers". However, according to the present embodiment, the bits of the data that has been read out from the delay RAM 26 are inverted using a digital logic circuit. A digital-analog multiplier, which is structured in the same manner as each of the multipliers 61 through 64, adds 1 to the inverted binary number of the negative AID conversion output. As a result, the structure of the digital logic circuit is simplified.

FIG. 17 shows the configuration of the digital-analog multiplier which adds 1 to the inverted binary number of the negative A/D conversion output. In the example shown in FIG. 17, as in the case of the embodiment of the present invention, the A/D converter 25 converts the outputs of the sample holders 21 through 24 into 8-bit digital data. Then, the above-mentioned digital logic circuit performs the above-explained bit-inversion process. Then, the bit-inverted 8-bit data D[0] through D[7] are supplied to this digital-analog multiplier. The most significant bit (MSB) D[7] indicates the sign of the data. If the value of D[7] is 0, the data is positive. If the value of D [7] is 1, the data is negative.

In FIG. 17, all the components except for those enclosed by the broken line are identical to the components of the digital-analog multiplier shown in FIG. 4b. These components multiply the analog input signal M by the digital data D[0] through D[6] excluding the signs of the data.

The portion enclosed by the broken line in FIG. 17 adds 1 to the bit-inverted negative A/D conversion output. This portion is comprised of the multiplexer MUX$_7$, which is controlled by the sign code D[7], and the capacitor 1 having the capacitance of weight 1, which is connected between the multiplexer MUX$_7$, and the input side of the inversion amplifier INV. If the sign code D[7] is 1, indicating the data is negative, the multiplexer MUX$_7$ is switched to the side indicated by 1 in the diagram (upper side in the diagram), and the capacitor 1 is connected to the input signal M. Then the input signal M having a weight 1 is supplied to the input terminal of the inversion amplifier INV. Subsequently, the inversion amplifier INV adds 1 to the bit-inverted negative AID conversion output. If D[7] is 0, indicating the data is positive, the multiplexer MUX$_7$ is switched to the side indicated by 0 in the diagram (lower side in the diagram), and the capacitor 1 is connected to the reference voltage Vref. In this case, the inversion amplifier INV does not add 1 to the bit-inverted negative A/D conversion output. In this way, this digital-analog multiplier adds 1 only to the bit-inverted negative A/D conversion output.

[2.5.2 Multipliers 61 Through 64]

Figure 18:
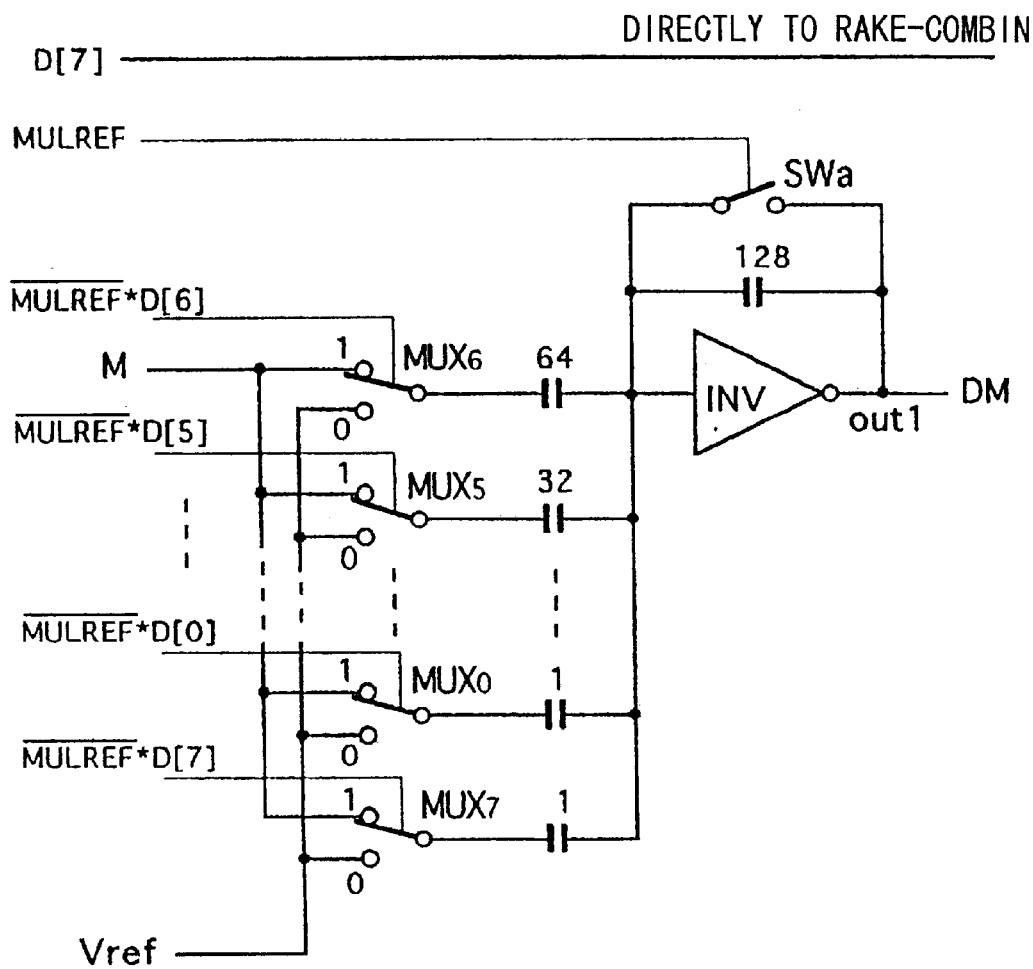
FIG. 18 shows an example of the configuration of the-multiplier of the phase corrector of the signal reception apparatus according to the present invention.

FIG. 18 shows an example of the structure of each of the identically structured multipliers 61 through 64. As shown in FIG. 18, each of the multipliers 61 through 64 is constructed by attaching a refreshing means to the digital-analog multiplier shown in FIG. 17. During the normal operation mode in which the refreshing signal MULREF is 0, each of the multipliers 61 through 64 operates in the same manner as the digital-analog multiplier shown in FIG. 17. In this case, the inversion amplifier INV outputs the phase-corrected received signal DM. The phase-corrected received signal DM is to be multiplied by the first bit D[0] through sixth bit D[6] which indicate the absolute value of the A/D-converted received signal. The sign code D[7] indicating the sign of the received signal is supplied directly to the RAKE combiner 15.

If the refreshing signal MULREF is 1, each of the multiplexers MUX$_0$ through MUX$_7$ is switched to the 0-side (lower side in FIG. 18). As a result, the reference voltage Vref is supplied to all the input capacitors. At the same time, the refreshing switch SWa for shorting the input side and output side of the inversion amplifier INV is turned on. As a result, the residue electric charge that has been stored in the input side of the inversion amplifier INV is eliminated. This refreshing operation is carried out in synchronization with the refreshing operation of the RAKE combiner 15. The detail of the synchronization timing will be explained later.

[3. Rake Combiner 15]

Figure 19:
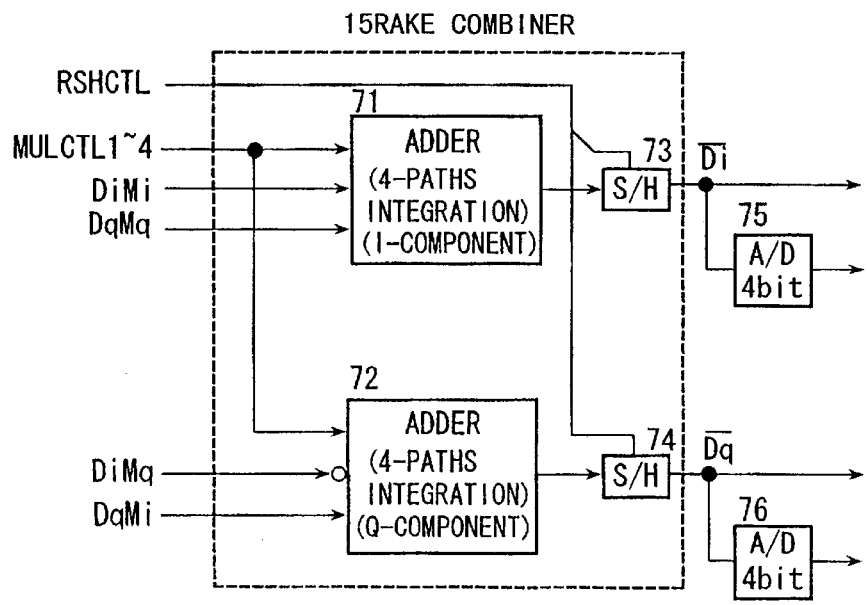
FIG. 19 shows the schematic configuration of the RAKE combiner of the signal reception apparatus according to the present invention.

FIG. 19 shows the schematic configuration of the RAKE combiner 15. As has been explained before, the phase correction block 14 corrects the phases of the received signals of each path, and supplies the phase-corrected received signals of each path to the RAKE combiner 15. Then, the RAKE combiner 15 adds and combines by the maximum ratio the phase-corrected received signals of each path at a synchronized timing, and outputs the combined signal. In FIG. 19, the I-component adder 71 first receives the phase corrected received signals DiMi and DqMq of each path from the information symbol phase corrector 40 inside the phase correction block 14. Then the I-component adder 71 samples and holds the phase corrected received signals DiMi and DqMq. Subsequently, the I-component adder 71 adds DiMi and DqMq, and calculates the sum of the I-components of the received signals of the four paths. The Q-component adder 72 first receives the phase corrected received signals DiMq and DqMi of each path from the information symbol phase corrector 40 inside the phase correction block 14. Then the Q-component adder 72 samples and holds the phase corrected received signals DiMq and DqMi. Subsequently, the Q-component adder 72 adds DiMq and DqMi, and calculates the sum of the Q-components of the received signals of the four paths.

As has been shown by equation (8), the Q-component of the phase-corrected received signal is given by Dq-hat= DqMi−DiMq containing a negative signal−DiMq. Therefore, the input terminal for DiMq of the Q-component adder 72 inverts the polarity of the input signal DiMq by inverting the sign code D[7] of the input signal Di.

The sample holder 73 samples and holds the RAKE combined output of the adder 71. Similarly, the sample holder 74 samples and holds the RAKE combined output of the adder 72. The sample holder 73 outputs the I-component Di-bar, given by equation (9), of the RAKE combined received signal. Similarly, the sample holder 74 outputs the Q-component Dq-bar, given by equation (10), of the RAKE combined received signal. The RAKE combined output Di-bar is either directly sent as analog data to the subsequent data judging circuit or first converted into digital data, for example, of 4-bit length, by the A/D converter 75, and then sent to the subsequent data judging circuit. Similarly, the RAKE combined output Dq-bar is either directly sent as analog data to the subsequent data judging circuit or first converted into digital data, for example, of 4-bit length, by the A/D converter 76, and then is sent to the subsequent data judging circuit.

The control signals MULCTL1 through MULCTL4, which correspond to the timing of each of the four paths, are supplied to the adders 71 and 72. The adders multiply the received signal of each path by the phase correction vector in response to the control signals MULCTL1 through MULCTL4. Further, the control signal RSHCTL, which is in synchronization with the symbol, is supplied to the sample holders 73 and 74. When the sample holder 73 receives this control signal RSHCTL, the sample holder 73 samples and holds the RAKE combined output from the adder 71. Similarly, when the sample holder 74 receives this control signal RSHCTL, the sample holder 74 samples and holds the RAKE combined output from the adder 72.

[3.1 Operation Timings]

Figure 20:
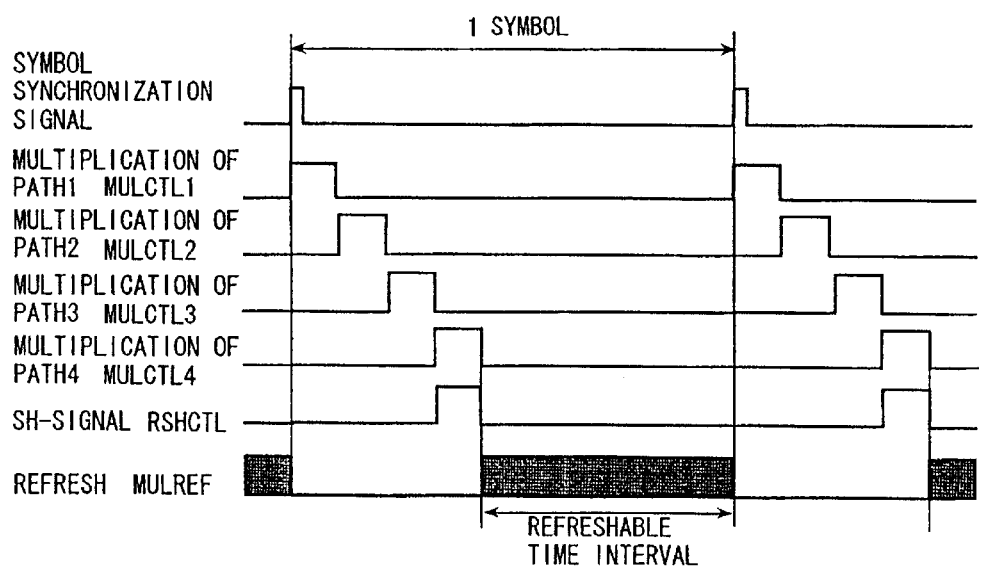
FIG. 20 is a timing chart showing the control signals for the phase corrector and the RAKE combiner of the signal reception apparatus according to the present invention.

FIG. 20 shows the timings of the control signals MULCTL1 through MULCTL4, and RSHCTL. Each of the multiplication control signals MULCTL1 through MULCTL4, which correspond to paths 1 through 4, respectively, has a width of multiple chips. During the time interval of the multiple chips, as shown in FIG. 15, the received signal of each path is supplied to the phase corrector 40. Then the phase corrector corrects the phase of the received signal of each path by multiplying the received signal of each path by the corresponding phase correction vector. The multiplication results DiMi and DqMq are supplied to the adder 71. The multiplication results DiMq, and DqMi are supplied to the adder 72. Then, the phase-corrected outputs of the corresponding path are sequentially supplied to the adders 71 and 72. When the last control signal MULCTL4 is supplied, the sample-and-hold signal RSHCTL becomes a high level signal. As a result, the phase corrected received signal of path 4, which corresponds to the last control signal MULCTL4, is supplied to the adders 71 and 72. The adders 71 and 72 send to the sample holders 73 and 74, respectively, the outputs that have been combined from the received signals of paths 1 through 4. The sample holders 73 and 74 sample and hold the received combined outputs.

FIG. 20 also shows the refreshing signal MULREF of the phase corrector 40. The time interval during which the phase corrector 40 is refreshable (refreshable time interval) is given by the period corresponding to the above-mentioned multiple chips, which begins when the sample-and-hold control signal RSHCTL becomes a low level signal and ends when the symbol interval ends. Therefore, the refreshing signal MULREF is set to a high level during this refreshable time interval. The refreshing signal MULREF causes the multipliers 61 through 64 to be refreshed. The refreshing signal MULREF is used to refresh the adders 71 and 72 inside the RAKE combiner 15 also.

[3.2 Process for Coping with Changes in the Numbers of Paths]

The number of paths that the multi-path selector 12 selects changes depending on the state of the received signal. As has been explained before, the signal level detector 11 detects those paths whose received electric power levels exceed a prescribed level, and sends those paths to the multi-path selector 12. Then, the multi-path selector 12 selects four paths corresponding to the four highest electric power levels, and outputs enabling signals that correspond to the four paths. According to this embodiment, the multi-path selector 12 selects four paths, and outputs new enabling signals for every two slots (80 symbols). On the other hand, the phase-corrected received signals are delayed by one slot (40 symbols). Therefore, the RAKE combiner 15 cannot use all the enabling signals that are supplied from the multi-path selector 12.

Figure 21A:
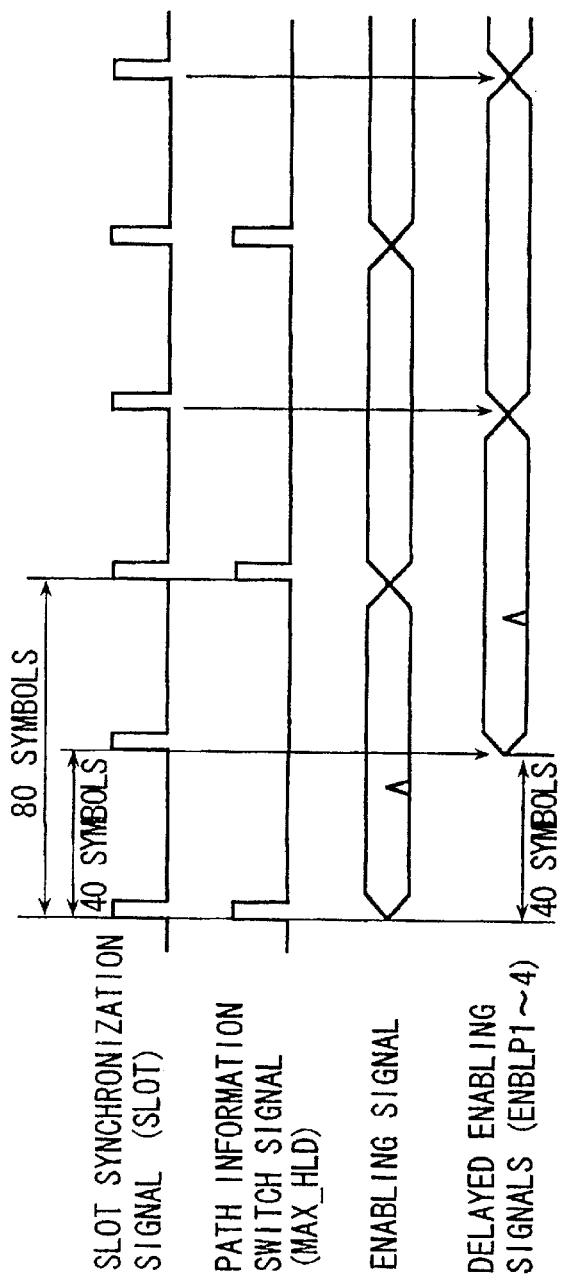
FIGS. 21a and 21b show the configuration of the RAKE combiner for delaying the enabling signals of the signal reception apparatus according to the present invention.
Figure 21B:
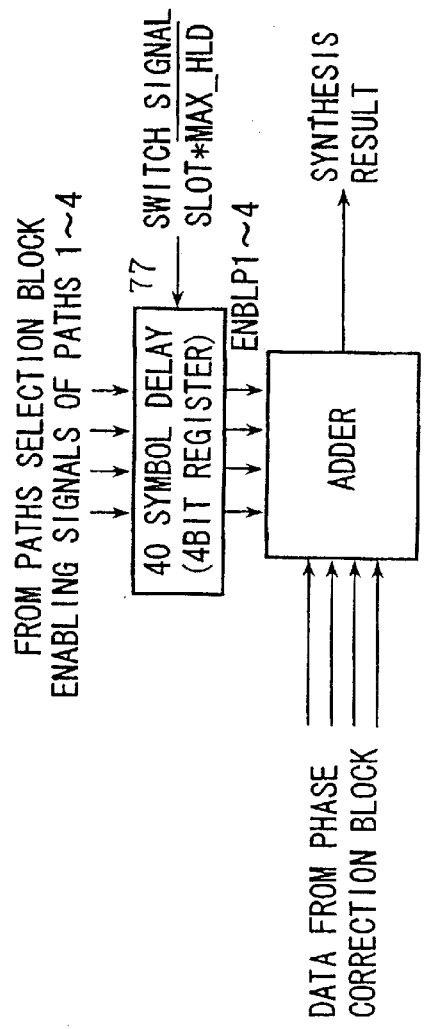

FIGS. 21a and 21b show the above-explained state. In FIG. 21a, the path information switching signal MAX_HLD indicates the timing for renewing the enabling signals, which the multi-path selector 12 renews. The path information switching signal MAX_HLD is output every two slots. Since the phase-corrected received signals are delayed by one slot, the RAKE combiner 15 needs to delay the enabling signals by 40 symbols (1 slot) before using the enabling signals.

FIG. 21b shows the configuration for using the delayed enabling signals ENBLPI through ENBLP4 shown in FIG. 21a. In this diagram, the 4-bit register 77 accepts the enabling signals of paths 1 through 4 from the multi-path selector 12 when the register 77 receives the switching signal (SLOT*(inverted MAX_HLD)), where SLOT is the slot synchronization signal, and MAX_HLD is the path information switching signal. As FIG. 21a shows, the switching signal (SLOT*(inverted MAX_HLD))is delayed by 40 symbols with respect to the path information switching signal MAX_HLD. Therefore, by using the enabling signals ENBLP1 through ENBLP4 that the register 77 outputs, the 1-slot delay for performing the phase correction can be achieved.

With reference to FIGS. 22a–22c, the operation for coping with the case in which the numbers of received paths have changed will be explained. FIG. 22a shows an example of a change in the number of received paths. In this example, the number of paths change as follows. The first and second slots have four paths. The third and fourth slots have two paths. The fifth and sixth slots have four paths. FIG. 22b explains the case in which the RAKE combiner 15 receives the information symbols of the second slot and RAKE combines the received signals when the numbers of paths have changed in the above-described manner. In particular, FIG. 22b explains the phase correction vectors $M_{12}$ through $M_{42}$ that are supplied from the phase correction vector generation blocks 35, corresponding to path 1, through 38, corresponding to path 4, respectively, and the corresponding enabling signals.

When the information symbol block D2 is RAKE combined, the complex-type matched filter 10 outputs the information symbol block D3 of the third slot, and the multi-path selector 12 outputs the enabling signal ENBL3 for the renewed two paths. However, at the same time, the register 77 outputs the enabling signal ENBL2 for the pre-renewal four paths, and the RAKE combiner 15 outputs an enabling signal for four paths. The phase correction vector generation blocks 35 through 38 receive the phase errors of the pilot symbols contained in the pilot symbol blocks P2 and P3 which are positioned, respectively, before and after the information symbol block D2. Then, the phase correction vector generation blocks 35 through 38 calculate the phase correction vectors $M_{12}$ through $M_{42}$, respectively, based on the phase errors. However, in this case, the received signals of the third and fourth paths of P3 are not detected. Therefore, as shown in FIG. 22b, the phase correction vector generator 37 and 38 calculate the phase correction vectors $M_{32}$ and $M_{42}$ using the reference voltage Vref in place of the phase error vectors corresponding to P3 of the third and fourth paths, respectively. Then, the phase correction vector generators 37 and 38 supply the phase correction vectors $M_{32}$ and $M_{42}$ to the phase corrector 40.

FIG. 22c explains the operation for RAKE combining the information symbol block D4 in the fourth slot. In this case, the enabling signal ENBL5 for four renewed paths is supplied from the multi-path selector 12. The enabling signal ENBL4 for two pre-renewal paths is supplied from the register 77. The phase correction vector generation blocks 35 and 36 supply the phase correction vectors $M_{14}$ and $M_{24}$, to the paths 1 and 2 of D4, respectively. The phases of the paths 1 and 2 of D4 are corrected using the phase correction vectors $M_{14}$ and $M_{24}$. Then the RAKE combiner 15 combines the phase-corrected paths 1 and 2 of D4. The phase correction vector generation blocks 37 and 38 do not calculate the phase correction vectors of the paths corresponding to the pilot symbol block P4 of the fourth slot. Therefore, the phase correction vector generation blocks 37 and 38 calculate and output the phase correction vectors $M_{34}$ and $M_{44}$ using the reference voltage Vref and the phase error E5 that corresponds to the pilot symbol block P5 of the fifth slot. However, these phase correction vectors $M_{34}$ and $M_{44}$ are not used for the phase correction operation. In this way, even if the numbers of paths of the received signals change, the RAKE combination operation can still be carried out in accordance with the change in the number of paths of the received signals.

[3.3 Adders 71 and 72]

Figure 23:
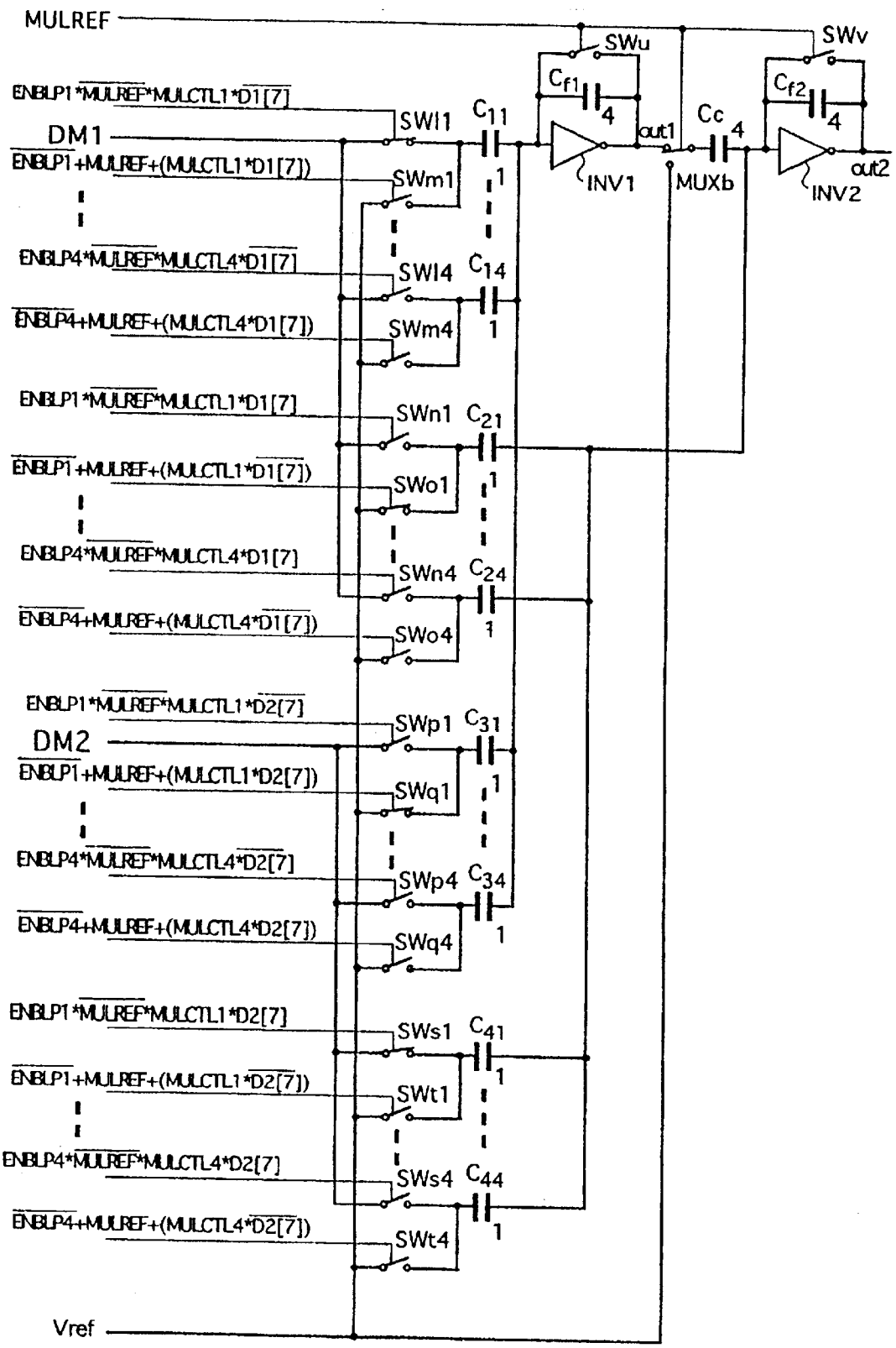
FIG. 23 shows a configuration example of the adders and of the RAKE combiner of the signal reception apparatus according to the present invention.

The I-component adder 71 and Q-component-adder 72 inside the RAKE combiner 15 will be explained in detail. FIG. 23 shows the configuration of the adders 71 and 72. Like the adders 55 and 56 contained in the phase error calculation blocks 31 through 34, these adders 71 and 72 perform integration operations.

In FIG. 23, the afore-mentioned first inversion amplifier INV1 and second inversion amplifier INV2 are serially connected and constitute the addition-subtraction circuit shown in FIG. 4c. The input capacitors $C_{11}$ through $C_{14}$ and $C_{31}$ through $C_{34}$ are connected to the input side of the first inversion amplifier INV1. The input capacitors $C_{21}$ through $C_{24}$ and $C_{41}$ through $C_{44}$ are connected to the input side of the second inversion amplifier INV2.

The capacitor $Cf_1$ serves as a feedback capacitor for the first inversion amplifier INV1. The capacitor $Cf_2$ serves as a feedback capacitor for the second inversion amplifier INV2.

The coupling capacitor Cc is connected between the output side of the first inversion amplifier INV1 and the input side of the second inversion amplifier INV2. The input capacitors $C_{11}$ through $C_{44}$ have the same capacitance. The feedback capacitors $Cf_1$ and $Cf_2$, and the coupling capacitor Cc all have the same capacitance, which is four times as large as that of the input capacitors $C_{11}$ through $C_{44}$.

The refreshing switch SWu is parallel-connected to the feedback capacitor $Cf_1$. Similarly, the refreshing switch SWv is parallel-connected to the feedback capacitor $Cf_2$. The multiplexer MUXb selects either the output side of the first inversion amplifier INV1 or the reference voltage Vref side and connect the input side of the coupling capacitor Cc to the selected side. The refreshing signal MULREF controls the refreshing operation of the RAKE combiner 15. The refreshing signal MULREF is supplied as a control signal to the switches SWu and SWv, and the multiplexer MUXb.

The first signal input terminal DM1 and the second signal input terminal DM2 are connected to the output terminal of the phase corrector 40. When the adder shown in FIG. 23 is the I-component adder 71, the output DiMi of the multiplier 61 contained in the phase corrector 40 is supplied to the first signal input terminal DM1, and the output DqMq of the multiplier 64 is supplied to the second signal input terminal DM2. When the adder shown in FIG. 23 is the Q-component adder 72, the output DqMi of the multiplier 62 is supplied to the first signal input terminal DM1, and the output DiMq of the multiplier 63 is supplied to the second signal input terminal DM2.

The switches SWlk and SWmk are connected to the input capacitor $C_{1k}$ for each k=1 through 4. The switches SWnk and SWok are connected to the input capacitor $C_{2k}$ for each k=1 through 4. The switches SWpk and SWqk are connected to the input capacitor $C_{3k}$ for each k=1 through 4. The switches SWsk and SWtk are connected to the input capacitor $C_{4k}$ for each k=1 through 4. The switches SWmk, SWok, SWqk, and SWtk, are connected to the reference voltage Vref for each k=1 through 4. The output sides of the switches SW11 through SW14 are connected to the input capacitors $C_{11}$ through $C_{14}$ (the first input capacitor group), respectively. The input sides of the switches SW11 through SW14 are connected to the first signal input terminal DM1. The output sides of the switches SWn1 through SWn4 are connected to the input capacitors $C_{21}$ through $C_{24}$ (the second input capacitor group), respectively. The input sides of the switches SWn1 through SWn4 are also connected to the first signal input terminal DM1. The output sides of the switches SWp1 through SWp4 are connected to the input capacitors $C_{31}$ through $C_{34}$ (the third input capacitor group), respectively. The input sides of the switches SWp1 through SWp4 are connected to the second signal input terminal DM2. The output sides of the switches SWs1 through SWs4 are connected to the input capacitors $C_{41}$ through $C_{44}$ (the fourth input capacitor group), respectively. The input sides of the switches SWs1 through SWs4 are connected to the second signal input terminal DM2. When these switches are turned off, the inversion amplifiers INV1 and INV2 retain their pre-switch-off output values. The control signal [ENBLP1*(inverted MULREF)*MULCTL1*(inverted D1[7])] is supplied to the switch SW11 that is connected to the input capacitor $C_{11}$. The control signal [ENBLP3*(inverted MULREF)*MULCTL3*(inverted D1[7])] is supplied to the switch SW13 that is connected to the input capacitor $C_{13}$. The control signal [ENBLP4*(inverted MULREF) *MULCTL4*(inverted D1[7])] is supplied to the switch SW14 that is connected to the input capacitor $C_{14}$. At the same time, the control signal [(inverted EVBLP1)+ MULREF+MULCTL1*D[7]] is supplied to the switch SWm1. Here, the enabling signal ENBLPx (x=1-through 4)

has been obtained from a signal for indicating the position of the selected path x, which is supplied from the multi-path selector 12, by delaying the signal by 40 symbols. The refreshing signal MULREF refreshes the adders 71 and 72 as well as the multipliers 61 through 64 contained in the phase corrector 40. The timing signal MULCTLx (x=1 through 4) is supplied in order to correct the phases of the received signals that correspond to the path x. The sign code D1[7] indicates the sign of the data that is supplied from the first signal input terminal DM1.

The control signal [ENBLP2*(inverted MULREF) *MULCTL2*(inverted D1[7])] is supplied to the switch SW12. The control signal [(inverted ENBLP2)+MULREF+ (MULCTL3*D1[7])] is supplied to the switch SWm2. The control signal (inverted ENBLP3)+MULREF+ (MULCTL3*D1[7]) is supplied to the switch SWm3. The control signal [(inverted ENBLP4+MULREF+ (MULCL4*D1[7])] is supplied to the switch SWm4.

The control signal ENBLP1, which corresponds to the first path, controls the switch SW11 that is connected to the input capacitor $C_{11}$. The control signal MULCTL1, which corresponds to the first path, controls the switch SWm1 that is connected to the input capacitor $C_{11}$. Similarly, for each k=2, 3, 4, the control signal ENBLPk, which corresponds to the k-th path, controls the switch SWlk that is connected to the input capacitor $C_{1k}$. For each k=2, 3, 4, the control signal MULCTLk, which corresponds to the k-th path, controls the switch SWmk that is connected to the input capacitor $C_{1k}$.

The input capacitors $C_{21}$ through $C_{24}$ of the second input capacitor group are connected to the input side of the second inversion amplifier INV2. For each k=1 through 4, the switches SWnk and SWok are connected to the input capacitor $C_{2k}$. For each k=1 through 4, the other end of the switch SWnk is connected to the first signal input terminal DM1, and the other end of the switch SWok is connected to the reference voltage Vref. For each k=1 through 4, the control signal [ENBLPk*(inverted MULREF)*MULCTLk*D1[7]] is supplied to the switch SWnk. Similarly, for each k=1 through 4, the control signal [(inverted ENBLPk)+ MULREF+(MULCTLK*(inverted D1[7]))] is supplied to the switch SWok.

The input capacitors $C_{31}$ through $C_{34}$ of the third input capacitor group are connected to the input side of the first inversion amplifier INV1. For each k=1 through 4, the switches SWpk and SWqk are connected to the input capacitor $C_{3k}$. For each k=1 through 4, the other end of the switch SWpk is connected to the second signal input terminal DM2, and the other end of the switch SWqk is connected to the reference voltage Vref. For each k=1 through 4, the control signal [ENBLPK*(inverted MULREF) *MULCTLk*(inverted D2[7])] is supplied to the switch SWpk. Similarly, for each k=1 through 4, the control signal [(inverted ENBLPK)+MULREF+(MULCTLk*D2[7])] is supplied to the switch SWqk. Here, the sign code D2[7] indicates the sign of the data that is supplied from the second signal input terminal DM2.

The input capacitors $C_{41}$ through $C_{44}$ of the fourth input capacitor group are connected to the input side of the second inversion amplifier INV2. For each k=1 through 4, the switches SWpk and SWqk are connected to the input capacitor $C_{3K}$. For each k=1 through 4, the other end of the switch SWsk is connected to the second signal input terminal DM2, and the other end of the switch SWtk is connected to the reference voltage Vref. For each k=1 through 4, the control signal [ENBLPk*(inverted MULREF)*MULCTLk* (inverted D2[7])] is supplied to the switch SWsk. Similarly, each k=1 through 4, the control signal [(inverted ENBLPk)= MULREF+(MULCTLk*(inverted D2[7]))] is supplied to the switch SWtk.

As has been explained before, the signals that are supplied to the first signal input terminal DM1 and the second signal input terminal DM2 of the I-component adder 71 are different from the signals that are supplied to the first signal input terminal DM1 and the second signal input terminal DM2 of the Q-component adder 72. Of the outputs of the phase corrector 40, DiMi is supplied to the first signal input terminal DM1 of the I-component adder 71, and DqMq is supplied to the second signal input terminal DM2 of the I-component adder 71. In addition, the most significant bit (MSB) Di[7] of the data that corresponds to Di is used as the sign code D1[7]. Similarly, the most significant bit (MSB) Dq[7] of the data that corresponds to Dq is used as the sign code D2[7].

Of the outputs of the phase corrector 40, DqMi is supplied to the first signal input terminal DM1 of the Q-component adder 72, and DiMq is supplied to the second signal input terminal DM2 of the Q-component adder 72. In addition, the most significant bit (MSB) Dq[7] of the data that corresponds to Dq is used as the sign code D1[7]. Similarly, the inverted data (inverted Di [7]) of the most significant bit (MSB) Di [7] of the data that corresponds to Di is used as the sign code D2[7]. As has been shown in equation (8), the quadrature component (Q-component) Dq-hat of the phase-corrected received signal is expressed by DqMi–DiMq, which contains a negative sign in front of the second term. Therefore, when the adder shown in FIG. 23 is used as the Q-component adder 72, as has been shown in FIG. 19, the polarity of the signal DiMq, which is supplied from the phase corrector 40, is inverted when the adder receives the signal DiMq. Therefore, (inverted Di[7]) is used as the sign code D2 [7].

[3.3.1 Normal Operation Mode]

The normal operation mode, during which the refreshing signal MULREF is 0, will now be explained. As has been explained with reference to FIG. 19, the adder shown in FIG. 23 is used either as the 1-component adder 71 or the Q-component adder 72.

The phase corrector 40 sequentially outputs the phase-corrected partial sums DiMi and DqMq that correspond to each path. When the adder shown in FIG. 23 is used as the I-component adder 71, the adder sequentially adds the phase-corrected partial sum DiMi and the phase-corrected partial sum DqMq, and calculates the RAKE combined I-component of the received signals shown in equation (9). On the other hand, when the adder shown in FIG. 23 is used as the Q-component adder 72, the adder sequentially adds the phase-corrected partial sum DiMq and the inverted phase-corrected partial sum DqMi, and calculates the RAKE combined Q-component of the received signals shown in equation (10).

[3.3.1a I-Component Adder 71]

The operation of this adder will be explained in detail for the case in which it is used as the 1-component adder 71 for adding I-components. As has been explained with reference to FIG. 20, the control signal MULCTLx (x=1 through 4; x indicates the path number) indicates the timing for correcting the phases of the received signals that correspond to the path x. During the first half of the one-symbol time interval, the control signals MULCTL1, MULCTL2, MULCTL3, and MULCTL4 are sequentially activated in this order. When the control signal MULCTLx is 0, the input switches SW11 through SWt4 are turned off.

When the control signal MULCTLx is 1 (high level), if the sign code D1[7] is 1, that is, if Di is negative (since the I-component adder 71 is being operated in this case), the switches SWlx and SWox are turned off, and the switches SWmx and SWnx are turned on. Therefore, if Di is negative, the signal DiMi, which is supplied from the first signal input terminal DM1, is supplied to the input side of the second inversion amplifier INV2 via the corresponding input capacitor $C_{2X}$ of the second input capacitor group $C_{21}$ through $C_{24}$. Then the signal DiMi is supplied as a negative input to the addition-subtraction circuit that is comprised of the first and second inversion amplifiers INV1 and INV2.

On the other hand, when the control signal MULCTLx is 1 (high level), if the sign code D1[7] is 0, that is, Di is positive (since the 1-component adder 71 is being operated in this case), the switches SWlx and SWox are turned on, and the switches SWmx and SWnx are turned off. Therefore, if Di is positive, the signal DiMi, which is supplied from the first signal input terminal DM1, is supplied to the input side of the first inversion amplifier INV1 via the corresponding input capacitor $C_{1X}$ of the first input capacitor group $C_{11}$ through $C_{14}$. Then, the signal DiMi is supplied as a positive input to the addition-subtraction circuit that is comprised of the first and second inversion amplifiers INV1 and INV2.

When the control signal MULCTLx is 1 (high level), if the sign code D2[7] is 1, that is, if Dq is negative (since the Q-component adder 72 is being operated in this case), the switches SWpx and SWtx are turned off, and the switches SWqx and SWsx are turned on. Therefore, if Dq is negative, the signal DqMq, which is supplied from the second signal input terminal DM2, is supplied to the input side of the second inversion amplifier INV2 via the corresponding input capacitor $C_{4X}$ of the fourth input capacitor group $C_{41}$ through $C_{44}$. Then the signal DqMq is supplied as a negative input to the addition-subtraction circuit that is comprised of the first and second inversion amplifiers INV1 and INV2.

When the control signal MULCTLx is 1, (high level), if the sign code D2[7] is 0, that is, if Dq is positive (since the Q-component adder 72 is being operated in this case), the switches SWpx and SWtx are turned on, and the switches SWqx and SWsx are turned off. Therefore, if Dq is positive, the signal DqMq, which is supplied from the second signal input terminal DM2, is supplied to the input side of the first inversion amplifier INV1 via the corresponding input capacitor $C_{3X}$ of the third input capacitor group $C_{31}$ through $C_{34}$. Then, the signal DqMq is supplied as a positive input to the addition- subtraction circuit that is comprised of the first and second inversion amplifiers INV1 and INV2.

In this way, as the control signals ENBLP1 through ENBLP4 are sequentially activated, the phase-corrected de-spread signal DiMi of the corresponding path is supplied to either the input capacitor $C_{1X}$ or $C_{2X}$, depending on the sign of Di. At the same time, the phase-corrected de-spread signal DqMq of the corresponding path is supplied to either the input capacitor $C_{3x}$ or $C_{4x}$ depending on the sign of Dq. In this way, when the control signal ENBLP4 becomes a high level, the second inversion amplifier INV2 outputs from the output terminal out2 the I-component Di-bar of the RAKE combined output shown in equation (9).

[3.3.1b Q-Component Adder 721]

When this adder is used as the Q-component adder 72 for combining Q-components, the first input signal terminal DM1 receives the signal DqMi, and the second input signal terminal DM2 receives the signal DiMq. The sign code Dq[7] of Dq is used for D1[7]. The sign code obtained by inverting the polarity of Di (inverted Di [7]) is used for D2[7]. As in the above-explained case, if the control signal MULCTLx is 0, all the input switches are turned off.

When the control signal MULCTLx becomes 1, if the sign code D1[7] is 1, that is, if the quadrature component Dq of the de-spread received data of the corresponding path is negative, the corresponding switches SWlx and Swox are turned off, and the switches SWmx and SWnx are turned on. Then the signal DqMi that is supplied from the first signal input terminal DM1 is supplied to the negative input terminal of the addition-subtraction circuit comprised of the inversion amplifiers INV1 and INN2. If the sign code D1[7] is 0, that is, positive, the switches SWlx and SWox are turned on, and the switches SWmx and SWnx are turned off. Then DqMi is supplied to the positive input terminal of the addition-subtraction circuit constituted of the inversion amplifiers INV1 and INV2.

If the sign code D2[7] (inverted Di[7]) is 1, that is, if the I-component Di of the de-spread received data of the corresponding path is positive, the corresponding switches SWpx and SWtx are turned off, and the switches SWqx and SWsx are turned on. Then the signal DiMq that is supplied from the second signal input terminal DM2 is supplied to the negative input terminal of the addition-subtraction circuit comprised of the inversion amplifiers INV1 and INV2. If the sign code D2[7] is 0, that is, Di is negative, the switches SWpx and SWtx are turned on, and the switches SWqx and SWsx are turned off. Then DqMi is supplied to the positive input terminal of the addition-subtraction circuit comprised of the inversion amplifiers INV1 and INV2.

In this way, as the control signals ENBLP1 through ENBLP4 are sequentially activated, the phase-corrected de-spread signal DqMi of the corresponding path is supplied to the corresponding input capacitor $C_{1x}$, or $C_{2x}$ depending on the sign of Dq, and the phase-corrected de-spread signal DiMq of the corresponding path is supplied to the corresponding input capacitor $C_{4x}$, or $C_{3x}$ depending on the sign of Di. Thus, when the control signal ENBLP4 has become a high level signal, the second inversion amplifier INV2 outputs the Q-component Dq-bar of the RAKE combined output shown in equation (10) from the output terminal out2.

[3.3.2 Refreshing Operation]

When the refreshing signal MULREF, which controls the refreshing operation of this adder, is 1 (high level), the switches SW1x and SWnx (x=1 through 4) are turned off, and the switches SWmx and SWox are turned on. Therefore, the reference voltage Vref is supplied to the input capacitors $C_{11}$ through $C_{14}$, and $C_{21}$ through $C_{24}$. At the same time, the switches SWpx and SWsx (x=1 through 4) are turned off, and the switches SWqx and SWtx are turned on. Therefore, the reference voltage Vref is supplied to the input capacitors $C_{31}$ through $C_{34}$ and $C_{41}$ through $C_{44}$.

In addition, the switch SWu that is parallel-connected to the feedback capacitor $Cf_1$ and, the switch SWv that is parallel-connected to the feedback capacitor $Cf_2$ are also turned on. As a result, the multiplexer MUXb is connected to the reference voltage Vref side. In this way, the residue electric charge remaining in each capacitor is eliminated, and each capacitor is refreshed. The timing for this refreshing operation is shown in FIG. 20.

[3.4 Sample Holders 73 and 74]

Figure 24:
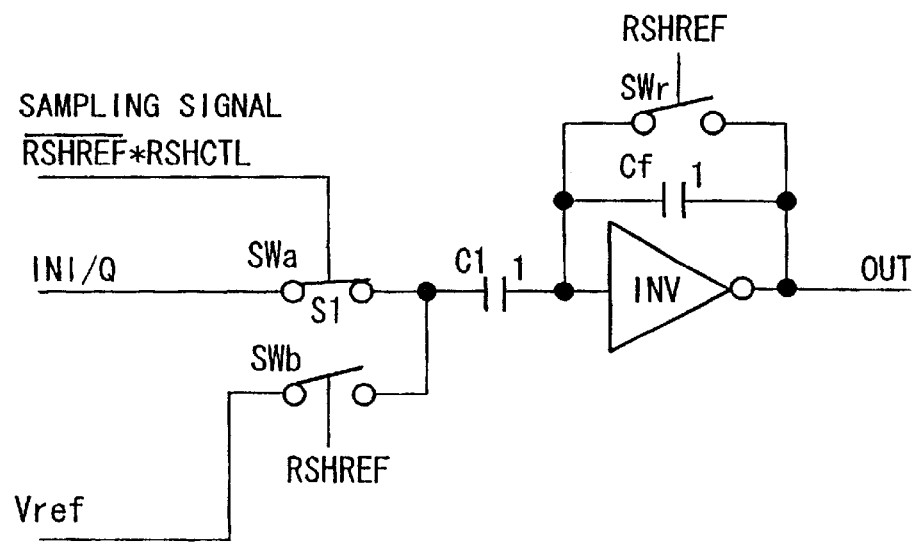
FIG. 24 shows an example of the configuration of the sample holders of the RAKE combiner of the signal reception apparatus according to the present invention.

FIG. 24 shows an example of the configuration of the sample holders 73 and 74. The sample holder shown in this diagram is obtained by attaching a refreshing component to the sample holder shown in FIG. 4a. In this diagram, the reference code INI/Q indicates a signal input terminal. When this sample holder is the sample holder 73 that is connected to the output terminal of the I-component adder 71, the I-component of the RAKE combined output is supplied to this signal input terminal INI/Q. When this sample holder is the sample holder 74 that is connected to the output terminal of the Q-component adder 72, the Q-component of the RAKE combined output is supplied to this signal input terminal INI/Q.

The control signal [(inverted RCHREF)*RCHCTL] is supplied to the sampling switch SWa that is installed between the signal input terminal INI/Q and the input capacitor $C_1$. Here, the sample holder refreshing signal RSHREF refreshes the sample holder. The reference code RSHCTL denotes a sample-and-hold signal. The switch SWb is installed between the input side of the input capacitor $C_1$ and the reference voltage Vref. The refreshing switch SWr is installed between the input side of the inversion amplifier INV and the output side of the inversion amplifier INV. The refreshing signal RSHREF is supplied to the switches SWr and SWb.

Figure 25:
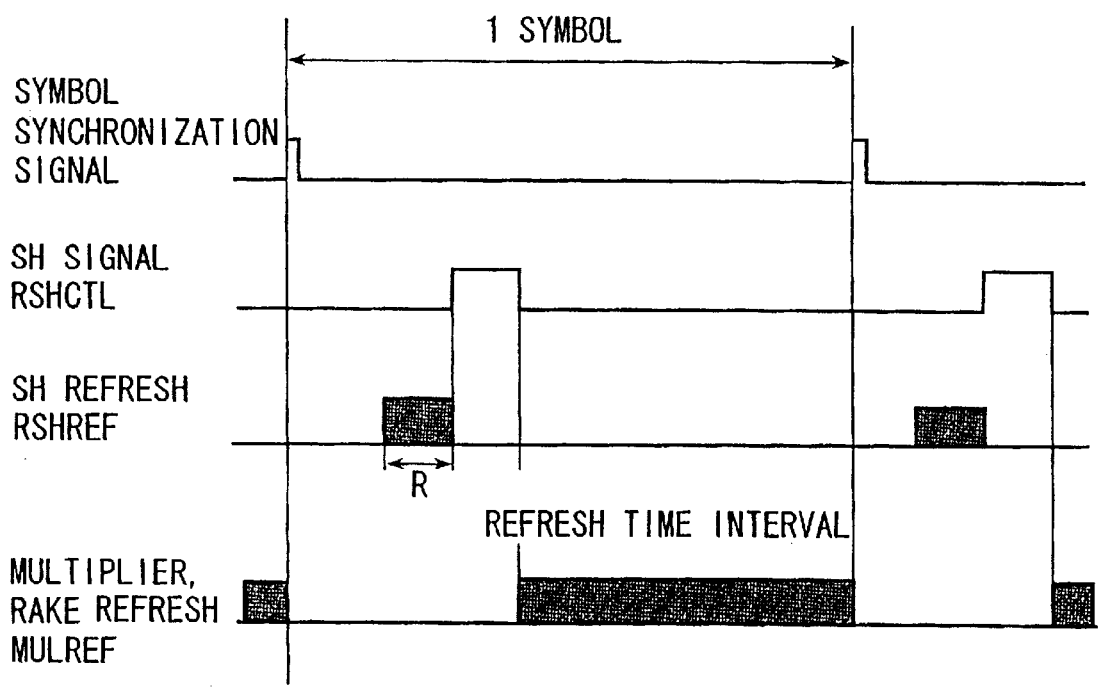
FIG. 25 explains the operation of the sample holder shown in FIG. 24.

FIG. 25 is a timing chart showing the operation of the sample holder shown in FIG. 24. The sample-and-hold signal RSHCTL synchronizes with a symbol. As has been shown in FIG. 20, the sample-and-hold signal RSHCTL is generated in synchronization with the multiplication control signal MULCTL4 that corresponds to path 4. The sample holder refreshing signal RSHREF remains at a high level during the time interval of multiple chips before the sample-and-hold signal RSHCTL becomes a high level signal. Therefore, the sample holder can be refreshed before the sample-and-hold operation. After the sample-and-hold signal RSHCTL has become a low level signal, the multiplier 61 and 62 contained in the phase corrector 40 and the RAKE combiner 15 are refreshed.

The analog output signals of the sample holders 73 and 74 are converted into digital data of, for example, 4-bit length, in the A/D converters 75 and 76. Then the A/D converters 75 and 76 send the digitized outputs to the subsequent circuits such as the data judging circuit and the like, in which the corresponding processes are performed.

In the above-explanation, the number of paths to be received is four, the number of bits contained in the A/D-converted digital data is eight, the number of pilot symbols contained in one slot is four, and the number of information symbols contained in one slot is 36. However, even if these numbers are changed, the signal reception apparatus according to the present invention can be used without changing its fundamental structure.

According to the present invention, the analog operation circuit of the signal reception apparatus calculates the average of the phase errors contained in the received signals consisting of the pilot symbol blocks that are transmitted before and after the information symbol block. The phase correction vector generator of the signal reception apparatus generates phase correction vectors using the average of the phase errors. The analog-type operation circuit of the signal reception apparatus multiplies the received signals of the information symbols, which have been converted into digital signals and delayed, by the phase correction vectors in order to correct the phases of the received signals. Therefore, the present invention uses analog-digital multipliers in place of the conventionally used digital multipliers. As a result, the phase correction block of the signal reception apparatus operates at a higher speed, and with a higher degree of accuracy, and consumes a smaller amount of electric power, in comparison with the conventional technology. In addition, according to the present invention, the refreshing operation is performed in synchronization with the frame structures of the received signals. As a result, the substitute lengthy operation circuit conventionally required for performing the operation of the components being refreshed is rendered unnecessary. Therefore, the signal reception apparatus according to the present invention can operate with a higher degree of accuracy without increasing the circuitry.

What is claimed is:

1. A signal reception apparatus for receiving spread spectrum signals, which alternately include pilot symbol blocks containing pilot symbols and information symbol blocks containing information symbols, the signal reception apparatus comprising:
   a matched filter for despreading the spread spectrum analog signals received through multiple paths;
   a multi-path selector for selecting paths from the multiple paths based on signal powers of despread analog signals output from the matched filter;
   a phase corrector for compensating fading effect of the despread analog signals received through the paths selected by the multi-path selector, wherein the phase corrector includes:
      an analog-to-digital converter for converting the despread analog signals received through the selected paths into digital signals;
      a memory for storing the digital signals output from the analog-to-digital converter and outputting the digital signals after a prescribed length of time;
      a plurality of phase error calculators, each for calculating analog phase errors of the pilot symbol blocks contained in the despread analog signal received through the selected path;
      a plurality of phase correction vector generators, each corresponding with one of the plurality of phase error calculators and generating an analog phase correction vector by calculating an average of the analog phase errors of two successive pilot symbol blocks; and
      a phase error corrector having a plurality of multipliers configured to multiply the analog phase correction vectors output from the phase correction vector generators by the digital signals output from the memory; and
   a rake combiner for receiving fading-compensated analog signals output from the phase corrector and combining the fading-compensated analog signals at a synchronized timing.

2. The signal reception apparatus according to claim 1, where in the phase error calculator further comprises a switch configured to refresh capacitors contained in the multipliers and adders of the phase error calculator.

3. The signal reception apparatus according to claim 2, wherein the switch refreshes the capacitors after the analog phase error is loaded to the phase correction vector generator.

4. The signal reception apparatus according to claim 3, wherein a time interval of the refreshing is variable in response to a spread factor adopted for making the spread spectrum signals.

5. The signal reception apparatus according to claim 3, wherein the switch refreshes the capacitors in synchronization with the spread spectrum signal.

6. The signal reception apparatus according to claim 5, wherein the switch refreshes the capacitor during a time interval of a last information symbol of the information symbol block.

7. The signal reception apparatus according to claim 1, wherein the phase correction vector generator further comprises a switch configured to refresh the capacitors of a multiplier contained in the phase correction vector generator.

8. The signal reception apparatus according to claim 7, wherein the phase correction vector generator loads the phase error after the capacitors are refreshed.

9. The signal reception apparatus according to claim 8, wherein a time interval of refreshing is variable in response to a spread factor adopted for making the spread spectrum signals.

10. The signal reception apparatus according to claim 8, wherein the switch refreshes the capacitors in synchronization with the spread spectrum signal.

11. The signal reception apparatus according to claim 10, wherein the switch refreshes the capacitors during a time interval of a last information symbol of the information symbol block.

12. The signal reception apparatus according to claim 1, wherein the analog-to-digital converter converts the despread analog signals received through the selected paths into the digital signals by time-sharing.

13. The signal reception apparatus according to claim 1, wherein the phase error corrector multiplies the analog phase correction vectors output from the phase correction vector generators by the digital signals output from the memory by time-sharing.

14. The signal reception apparatus according to claim 1, wherein the phase corrector has a converter for modifying the digital signal output from the memory, the converter comprising:

an inverter for inverting a most significant bit of the digital signal if the digital signal corresponds to a positive signal, and for inverting all bits of the digital signal if the digital signal corresponds to a negative signal; and an adder attached to the multiplier for adding "1" to data of the digital signal if the digital signal corresponds to a negative signal, so that the most significant bit of the modified digital signal represents a sign of the data, and other bits of the modified digital signal represents an absolute value of the data.

15. The signal reception apparatus according to claim 1, wherein at least one of the phase correction vector generators outputs a predetermined voltage if the number of selected paths is smaller than the number of the phase correction vector generators.

16. A signal reception method for receiving spread spectrum signals which alternately include pilot symbol blocks containing pilot symbols and information symbol blocks containing information symbols, the method comprising:

receiving the spread spectrum signals transmitted through multiple paths;

despreading the spread spectrum signals;

selecting paths from the multiple paths based on signal powers of despread analog signals;

compensating fading error of the despread analog signals received through the selected paths by:
converting the despread analog signals, corresponding to the selected paths, into digital signals;
storing the digital signals into memory and outputting the digital signals from the memory after a prescribed length of time;
calculating analog phase errors of the pilot symbol blocks contained in the despread analog signals corresponding to the selected paths;
generating analog phase correction vectors by calculating averages of two successive pilot symbol blocks analog phase errors; and
multiplying the analog phase correction vectors by the digital signals output from the memory; and combining the fading-compensated analog signals at a synchronized timing using a RAKE combiner.

17. The signal reception method according to claim 16 further comprising refreshing capacitors associated with the phase error calculating, at a given timing.

18. The signal reception method according to claim 17, wherein the refreshing is conducted after the analog phase error is provided for generating the phase correction vector.

19. The signal reception method according to claim 17, wherein a time interval of the refreshing is variable in response to a spread factor adopted for making the spread spectrum signals.

20. The signal reception method according to claim 19, wherein the refreshing is conducted during a time interval of a last information symbol of the information symbol block.

21. The signal reception method according to claim 16 further comprising refreshing capacitors associated with the generating of the phase correction vectors.

22. The signal reception method according to claim 21, wherein a time interval of refreshing is variable in response to a spread factor adopted for making the spread spectrum signals.

23. The signal reception method according to claim 21, wherein the refreshing is conducted in synchronization with the spread spectrum signal.

24. The signal reception method according to claim 23, wherein the refreshing is conducted during a time interval of a last information symbol of the information symbol block.

25. The signal reception method according to claim 16, wherein the converting is conducted by time-sharing for the plurality of despread analog signals received through the selected paths.

26. The signal reception method according to claim 16, wherein the multiplying is conducted by time-sharing for the analog phase correction vectors and the digital signals output from the memory.

27. The signal reception method according to claim 16, further comprising modifying the digital data output from the memory, the modifying including:

inverting a most significant bit of the digital signal if the digital signal corresponds to a positive sign, and inverting all bits of the digital signal if the digital signal corresponds to a negative signal; and adding "1" to data of the digital signal if the digital signal corresponds to a negative signal, so that the most significant bit of the modified digital signal represents a sign of the data, and other bits of the modified digital signal represents an absolute value of the data.

* * * * *